Figure 1:
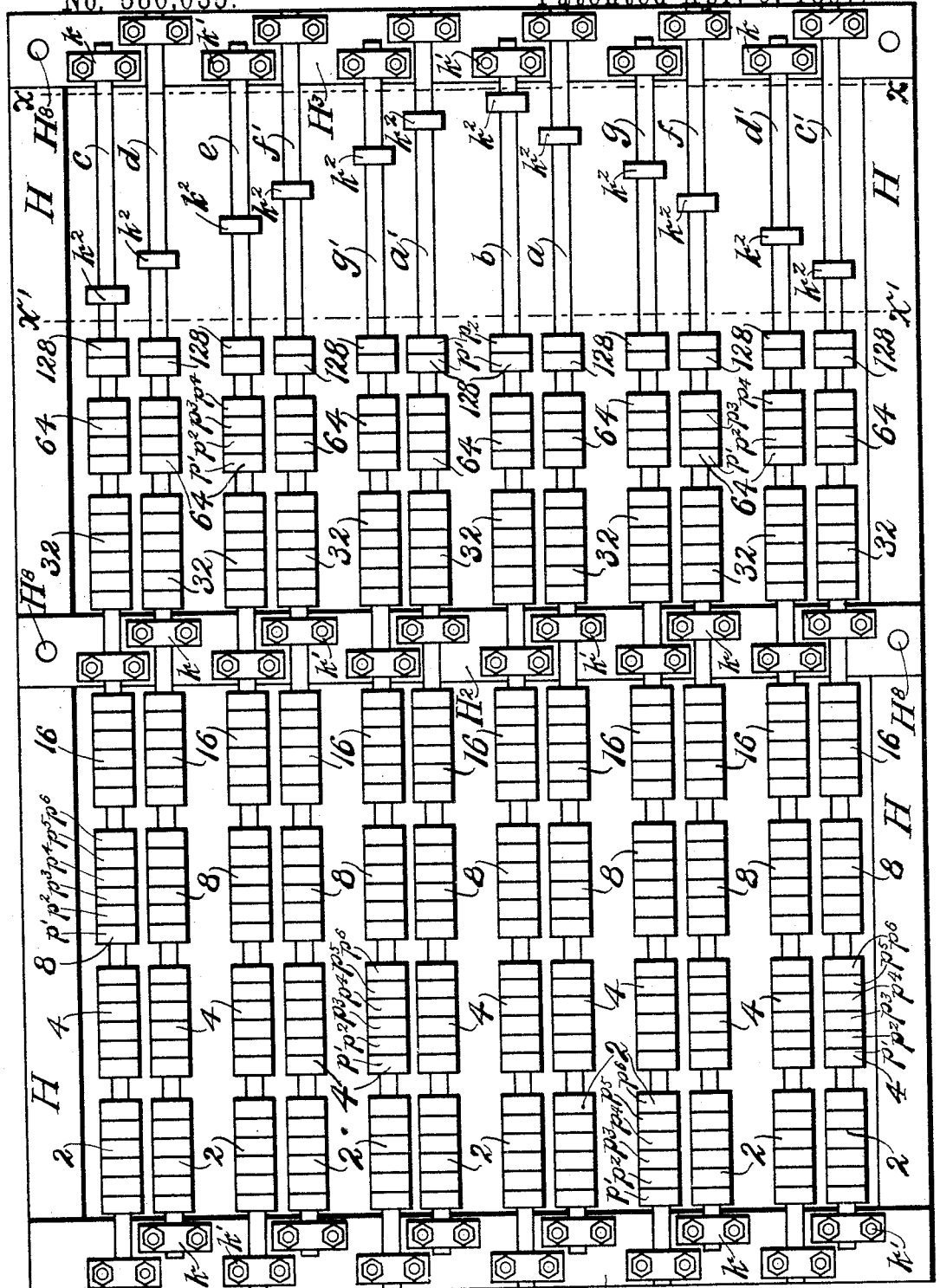

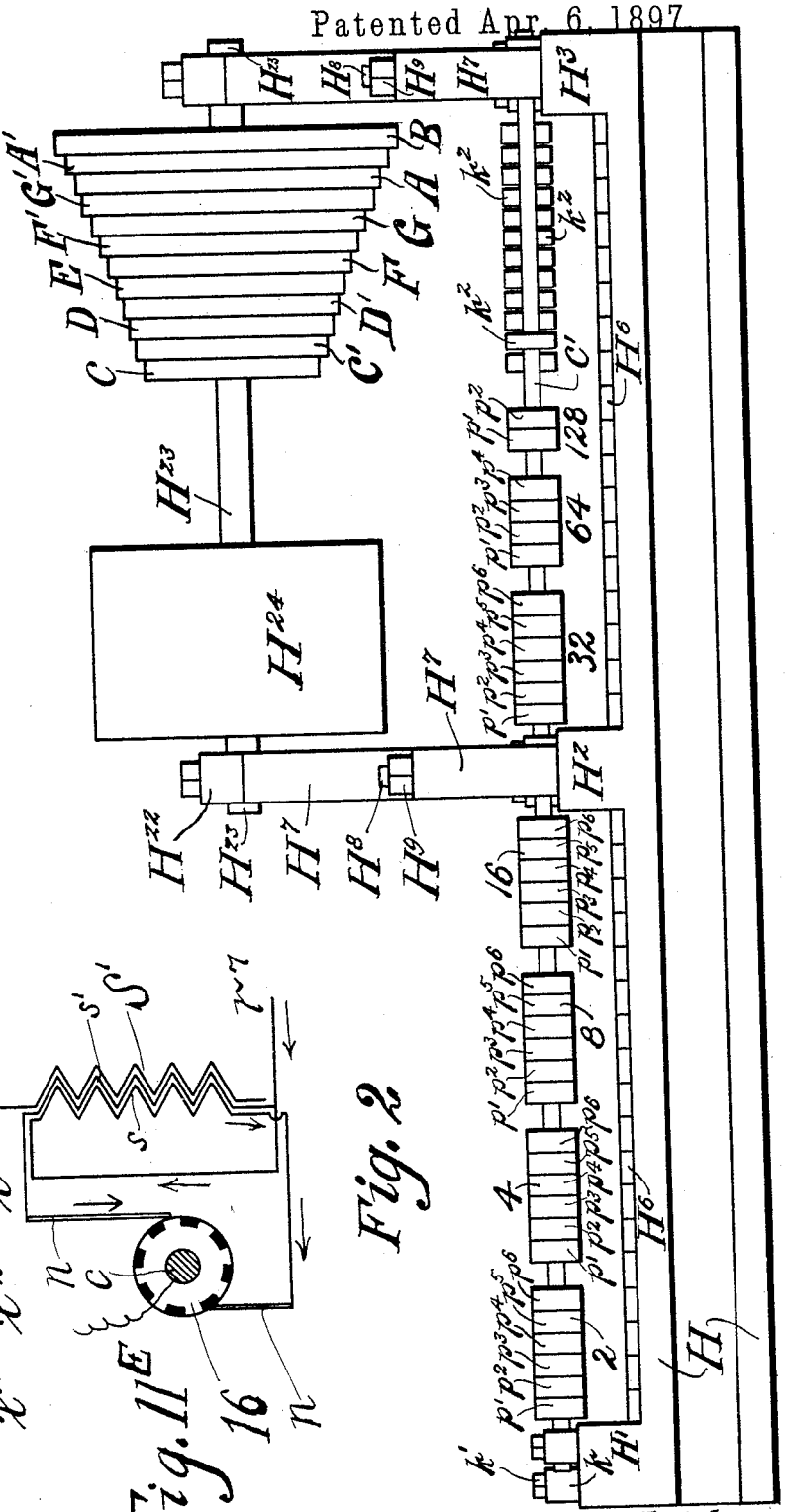
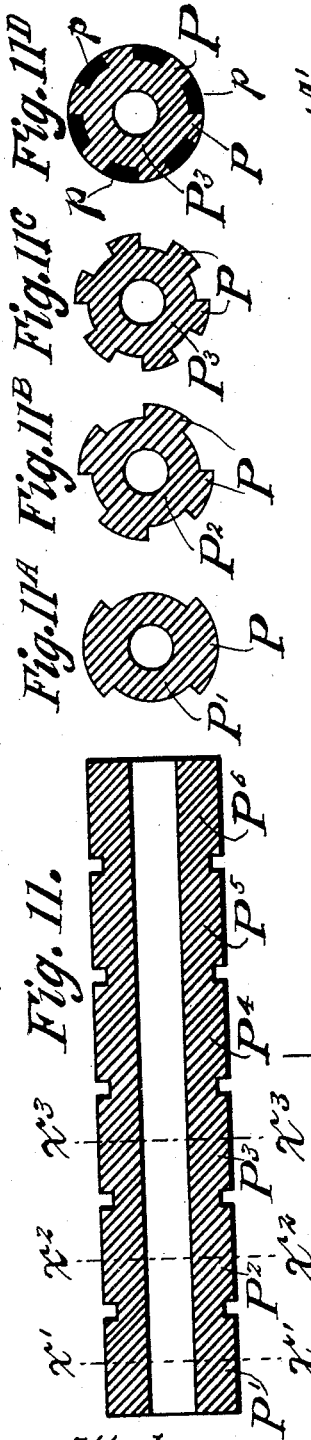

(No Model.) 10 Sheets—Sheet 3.
T. CAHILL.
ART OF AND APPARATUS FOR GENERATING AND DISTRIBUTING MUSIC ELECTRICALLY.
No. 580,035. Patented Apr. 6, 1897.
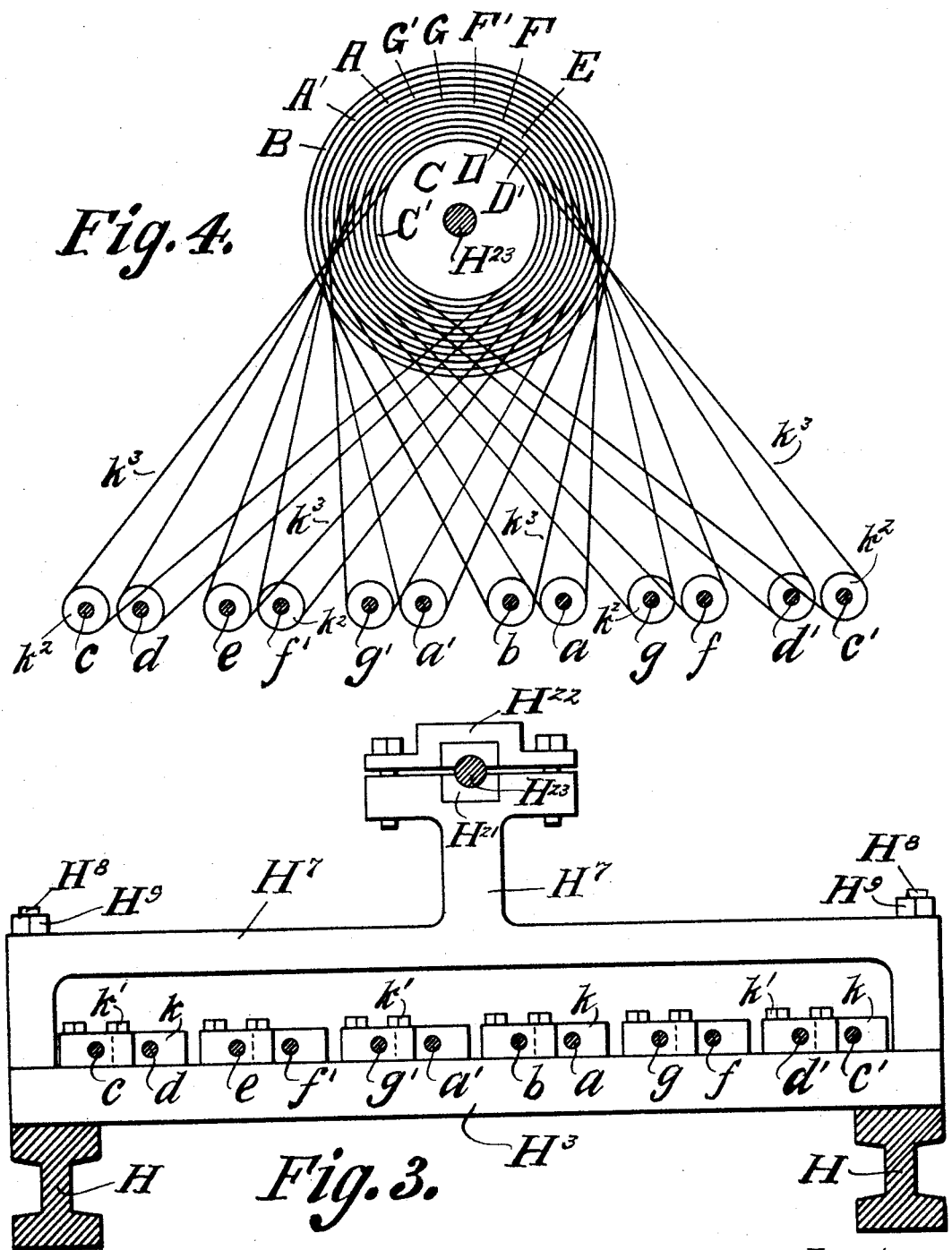

(No Model.)  10 Sheets—Sheet 4.

T. CAHILL.
ART OF AND APPARATUS FOR GENERATING AND DISTRIBUTING MUSIC ELECTRICALLY.

No. 580,035.  Patented Apr. 6, 1897.

Attest:
Arthur T. Cahill.
M. H. Cahill.

Inventor:
Thaddeus Cahill (No Model.) 10 Sheets—Sheet 5.

T. CAHILL.
ART OF AND APPARATUS FOR GENERATING AND DISTRIBUTING MUSIC ELECTRICALLY.

No. 580,035. Patented Apr. 6, 1897.

Attest:
Arthur T. Cahill.
M. H. Cahill.

Inventor:
Thaddeus Cahill.

(No Model.) 10 Sheets—Sheet 6.

T. CAHILL.
ART OF AND APPARATUS FOR GENERATING AND DISTRIBUTING MUSIC ELECTRICALLY.

No. 580,035. Patented Apr. 6, 1897.

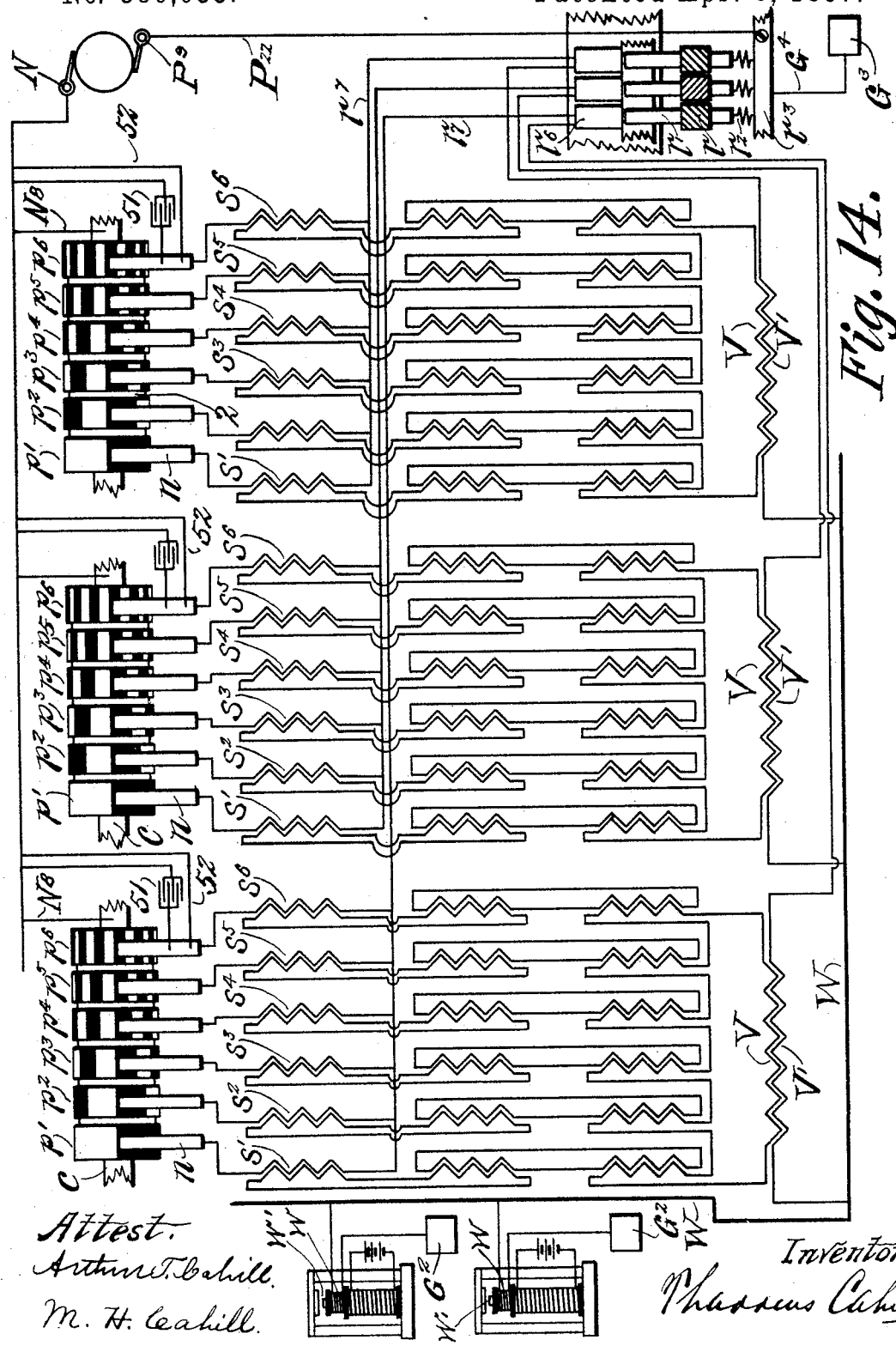

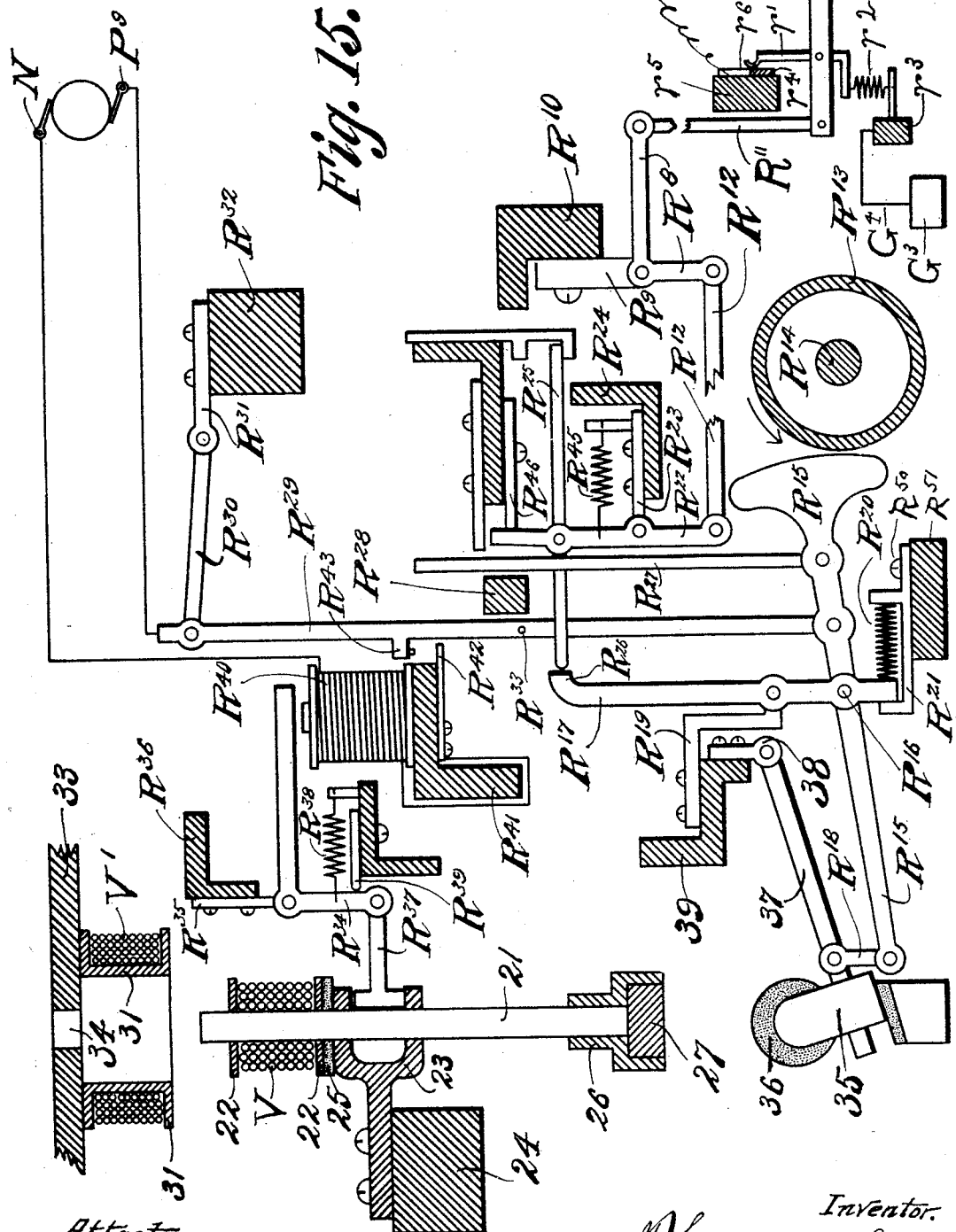

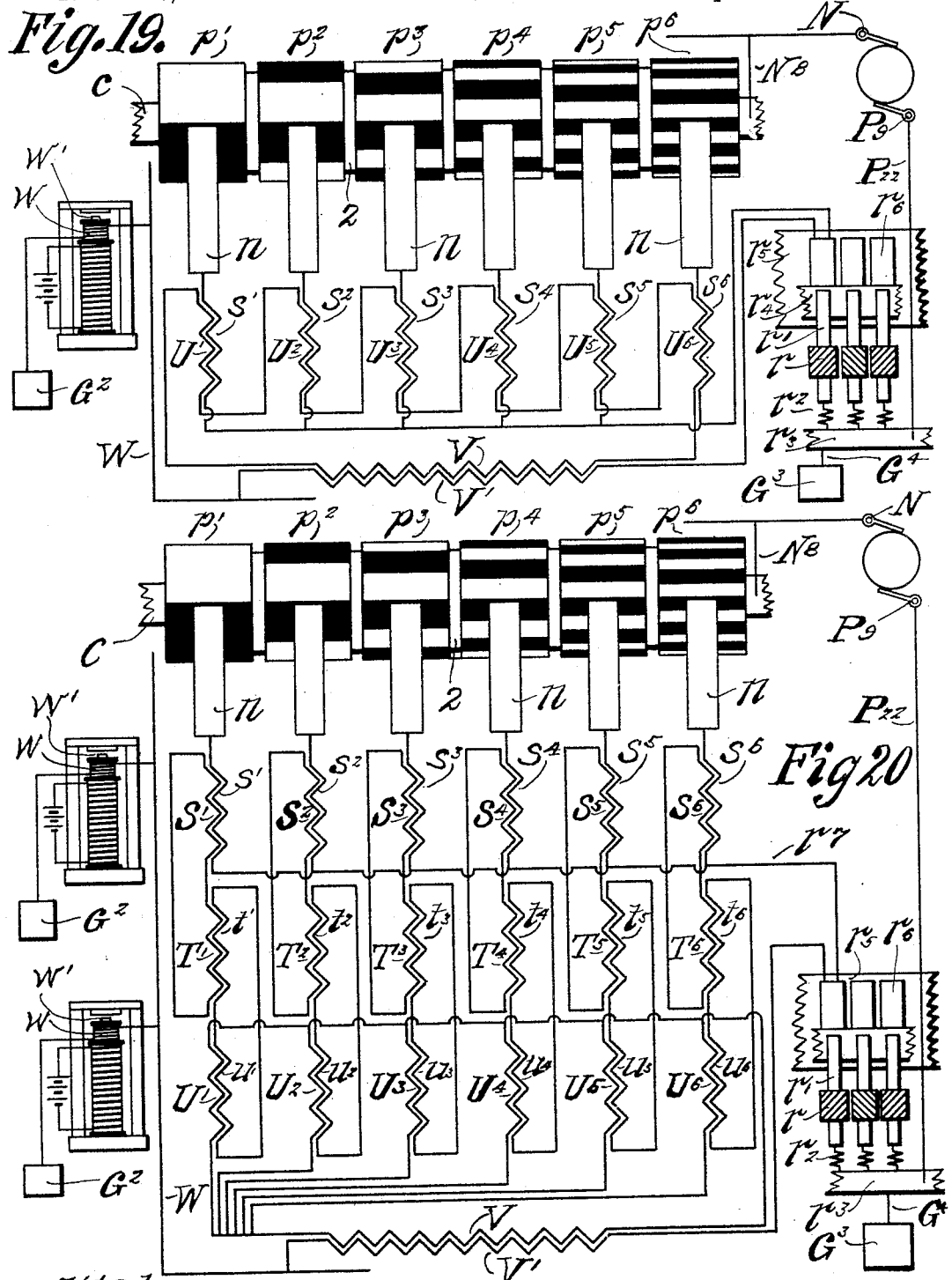

(No Model.) 10 Sheets—Sheet 10.

T. CAHILL.
ART OF AND APPARATUS FOR GENERATING AND DISTRIBUTING MUSIC ELECTRICALLY.

No. 580,035. Patented Apr. 6, 1897.

Attest.
Arthur T. Cahill.
M. H. Cahill.

Inventor.
Thaddeus Cahill.

UNITED STATES PATENT OFFICE.

THADDEUS CAHILL, OF NEW YORK, N. Y.

ART OF AND APPARATUS FOR GENERATING AND DISTRIBUTING MUSIC ELECTRICALLY.

SPECIFICATION forming part of Letters Patent No. 580,035, dated April 6, 1897.

Application filed February 4, 1896. Serial No. 578,046. (No model.)

*To all whom it may concern:*

Be it known that I, THADDEUS CAHILL, a citizen of the United States, and a resident of the city, county, and State of New York, (residing temporarily at Washington, in the District of Columbia,) have invented a new and useful Art of and Apparatus for Generating and Distributing Music Electrically, of which the following is a specification.

In a former application of mine, filed August 10, 1895, Serial No. 558,939, an art of and apparatus for generating and distributing music electrically is described. The art described in this application is the same art described in the application of August 10, 1895, before mentioned, or, more correctly, the art described in the present case is a part of the art described in the former case, for some processes are described in the former case which are not described in this case. So, also, the apparatus described in this application is in its most essential and fundamental features and combinations the same as the apparatus of the former case; but the apparatus of this application differs from the apparatus of the former application in being assimilated to a pianoforte, whereas the apparatus of the former case is assimilated to an organ. In each case, indeed, the apparatus is wholly electrical and bears little, if any, real likeness, either in structure or mode of operation, to the instruments now known in the musical art as "pianofortes" and "organs;" but in the sorts of music which they are adapted to produce the apparatus of the present case and the apparatus of the case of August 10, 1895, before mentioned, may be properly said to resemble, respectively, a pianoforte and an organ. The apparatus illustrated in the case of August 10, 1895, being assimilated to an organ, is much more elaborate than the apparatus which I describe in this case. The former case is indeed quite complicated. It shows most of the substance of this case and also much that, being peculiar to an organ, is not illustrated in this case. The two cases, it will be seen, with regard to what is shown and described in each, to a great extent overlap, and it becomes necessary to make a clear line of division between them. It is my intention to continue in this present application my claims to so much of the subject-matter of the original application, filed August 10, 1895, as is disclosed in the present case, and I have removed the claims for such subject-matter from the former case in order to prosecute them in this, and to prosecute in the original application, Serial No. 558,939, only that subject-matter which belongs peculiarly to it and which is not illustrated or described in this. In other words, the line of division which I draw between this case and the original application, Serial No. 558,939, filed August 10, 1895, is to cover in this case everything illustrated and described in it, asserting herein all claims for subject-matter disclosed alike in the original application and in this application, and claiming in the original application only that subject-matter which is peculiar to it, being disclosed in it alone.

The apparatus which I have figured in the accompanying drawings in illustration of my invention is, as above mentioned, in the nature of an electrical pianoforte, but the essential processes and combinations of my invention, set forth in the statement of claim at the end hereof, are equally applicable to electrical music-generating instruments, not being electrical pianofortes. They may be used, to mention one example only out of several, in an electrical music-generating apparatus assimilated to an organ. An apparatus of this sort, employing, as before said, the same essential processes and combinations described and claimed in this application, is fully described in the prior application above mentioned, Serial No. 558,939, filed August 10, 1895.

The grand objects of my invention are to generate music electrically with tones of good quality and great power and with perfect musical expression, and to distribute music electrically generated by what we may term "original electrical generation" from a central station to translating instruments located at different points and all receiving their music from the same central point; and my invention consists in the parts, improvements, combinations, and methods hereinafter described and claimed.

More particularly the objects of my invention are (*a*) to generate by a practical and simple apparatus different series of rhythmic electrical vibrations, answering to the different notes of music with great power; (b) to produce pure electrical elemental tones, or at all events elemental tones free from harshness; (c) to produce the notes and chords of a musical composition with any timbre desired out of their electrical elements; (d) to afford facility to the performer to govern the expression perfectly, and (e) to distribute music, produced as before mentioned, from one central station to many translating instruments located in different places, so that many persons, each in his own place, can enjoy the music produced by a distant performer.

Music as ordinarily generated exists first in the vibrations of tuned sounding-bodies. Thus in an organ the music exists first in the vibrations of the elastic columns of air confined in the pipes, from which it is communicated through the external atmosphere to the auditory apparatus of the listener. So the music of a pianoforte or violin exists first in the vibrations of the strings, then in the vibrations of the sound-board, and finally in the vibrations of the air. Such vibrations of material substances, cognizable by the sense of hearing when air is interposed between the sounding-body and the ear of the listener, constitute music in the ordinary sense of that word. Such musical vibrations of the air, it is well known, can be copied electrically by suitable telephonic apparatus and transmitted from one point to another; but the electrical vibrations thus produced by copying with telephones the musical vibrations of the air are, it is well known, almost infinitely weak. I produce by my system musical electrical vibrations of as good quality and of enormously greater power.

Mine is a system of producing what may be emphatically termed "electrical music," in contradistinction to the music produced mechanically by the vibrations of sounding-bodies, as above mentioned, for by my system I generate, in the first instance, electrical vibrations corresponding to the different elemental tones desired. These elemental electrical vibrations are readily made to be of great power. Out of them I synthesize composite electrical vibrations answering to the different notes and chords required. The amplitude of these electrical vibrations as electrical vibrations is governed at will by the performer, so that any expression desired is given to the music, and the electrical vibrations thus produced and governed, circulating through coils of wire surrounding magnets lying adjacent to sound-board-attached armatures, cause the magnets to pull upon the armatures and sound-board with a constantly-varying force, so that the soundboard and the surrounding air are set in vibration. The music, it will thus be seen, is by my invention first generated and controlled in the form of electrical vibrations, and these electrical vibrations, constituting, as we may say, electrical music, are then translated into audible aerial vibrations, or music, in the common sense of the word. The tones which I thus produce are of excellent quality; they are perfectly sustained; their power is completely controlled by the touch upon the keys, so that the performer has ample facility for expression, and—most important of all—the music is produced not only by an instrument or instruments at the place where the performer is, but also by other instruments at other places suitably connected with the central vibration-generating device, which constitutes the electrical pianoforte proper.

I generate, as before said, electrical tones corresponding to the various notes of music. By "electrical tones" I mean electrical undulations corresponding to those vibrations of the air which we call "tones." Various ways of producing electrical vibrations are known and any suitable mode may be used in carrying out my invention. Among the many suitable ways of generating electrical vibrations I will mention a few. The vibrations of a string or of a pipe actuating a telephonic or microphonic apparatus produce electrical vibrations which, when translated into aerial vibrations, are recognized by the ear as tones of good quality; but these tones, though of good quality, are weak. On the other hand, by rotating an electric circuit in the presence of a magnetic field, or a magnet or magnetic field in the presence of a circuit, or by interrupting an electric current wholly or partially, electrical vibrations are readily produced of great power; but the electrical tones produced in these ways, though powerful, are not well suited for musical purposes. They are apt to be either positively bad, musically considered—that is, harsh and disagreeable—or, when not harsh, poor and insipid.

It is a fact well known to physicists that the quality of a tone depends upon the particular tone partials entering into it and their strengths with relation to each other. A pure tone is a sine function. It is an elemental tone non-composite and irreducible. A pure tone, particularly in the lower and middle range, is always poor and insipid. It is wanting in color and effectiveness. It makes little impression upon the ear. Every tone, except a pure tone, is composed of or reducible to a plurality of pure tones or sine-function vibrations bearing certain mathematical relations to each other. The different pure tones or elemental tones entering into the composition of a single musical note, considered by the ear and by musicians as a single sound, are called its "partial tones," "tone-partials," or, more shortly, its "partials." The first partial by way of distinction is called the "fundamental" or "ground" tone and the other partials are called "overtones." A tone is agreeable when it is formed of accordant partials. It is disagreeable when formed of discordant partials. It is colorless and insipid when overtones are wanting. It is a known fact that the first, second, third, fourth, fifth, and sixth partials are harmonious, and in the tones of a good pianoforte, particularly in the middle and lower range, all these partials are strong. On the other hand, the seventh, ninth, and other odd-numbered upper partials are disagreeable and need to be eliminated or suppressed. For various reasons, which it is not necessary to enter upon here, the strings of a pianoforte are readily made to give good tones, in which the lower harmonious partials are strong and the discordant partials, such as the seventh, ninth, &c., are either very weak or entirely absent; but in producing electrical tones in a circuit by interrupting it in the ordinary manner with a vibrating fork or reed or a make-and-break wheel or other similar device the disagreeable overtones I have always found to be present in great force, so that the tone is harsh and unmusical. The same is true, but to a less degree, when electrical tones are produced by vibrating or rotating a circuit in the presence of a magnet or a magnet in the presence of a circuit. The tones thus produced, as before said, are in general either harsh and disagreeable or when not harsh insipid.

Now I have found a practical way by which electrical tones of the best quality and of great power can be produced, which is briefly as follows: I first produce in any suitable way (as, for example, by interrupting electric circuits) periodic electrical vibrations of frequencies corresponding to the fundamental tone and to certain agreeable overtones of the composite tone or note desired. I then purify these vibrations by suppressing their harsher components, (such as the seventh and ninth partials,) and I combine the vibrations thus purged of their disagreeable elements into composite vibrations answering to notes and chords. Thus I obtain electrical tones of good musical quality and of great power. The mechanical and electrical devices which I prefer to use for this purpose are described fully hereinafter.

The method and the mechanism by which I control the loudness of the tones at the will of the performer, according to the requirements of correct musical expression, will be more conveniently explained after the general scheme of the electric circuits has been made clear.

For converting or translating the electrical tones or electrical tone-undulations, produced in the manner above described, into audible aerial vibrations I employ preferably an apparatus having a sound-board with a bridge, one or more soft-iron armatures attached to or connected with the bridge, and one or more magnets (but preferably a plurality of them) lying in proximity to the armature attached to the bridge and pulling upon it, said magnets being wound with coils of insulated wire, through which the electrical undulations corresponding to music, and which I frequently term herein "electrical" music, circulate. The vibratory currents in the coils produce vibratory changes in the pull exerted by the coil-wound magnets upon the sound-board, and so set it in vibration. A number of these vibration-translating devices, situated in different places, are connected with the same electrical tone-producing arrangement, so that the music produced by one artist is distributed to many hearers in different places.

My invention may be carried out in various ways and by variously-modified devices. I shall first describe in detail the apparatus which I consider best, and after that will call attention, briefly, to some of the many modifications and alternative constructions that may be made use of in carrying out essential features of my invention.

Figure 5:
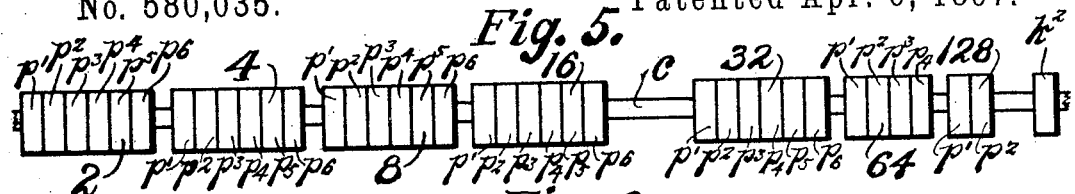
Figure 6:
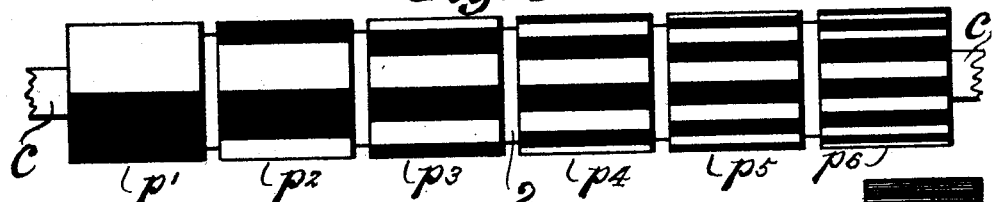
Figure 7:
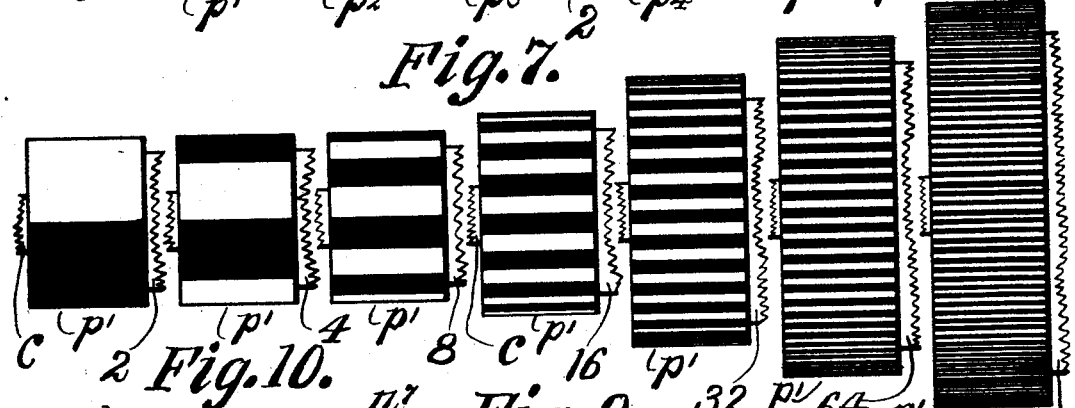
Figures 8, 9, 10:
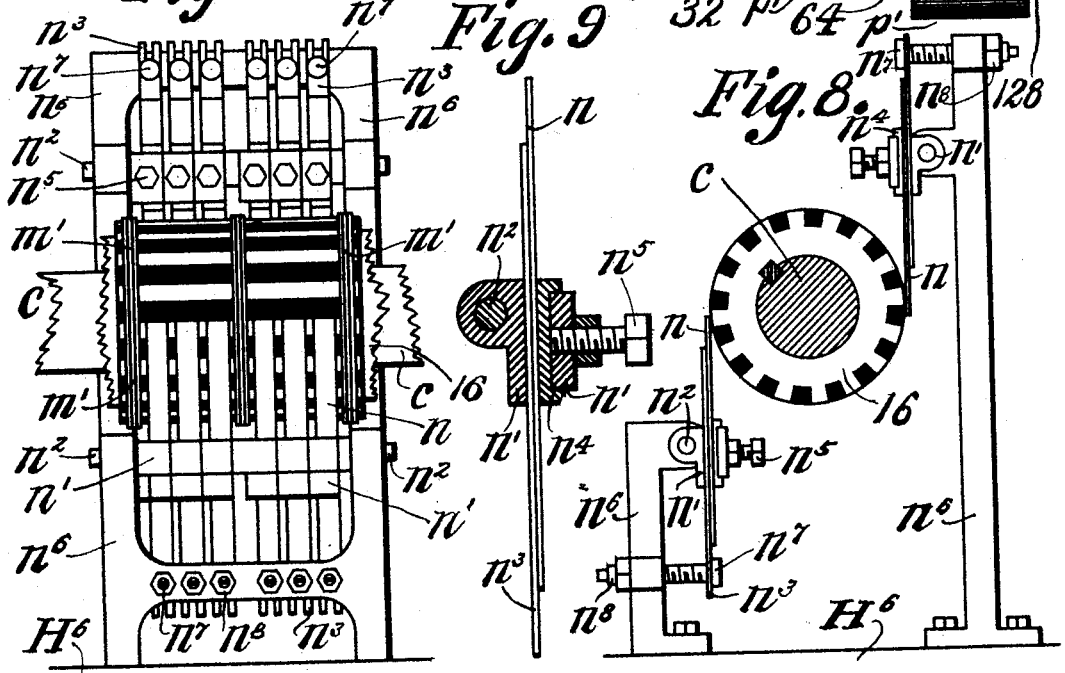
Figure 16:
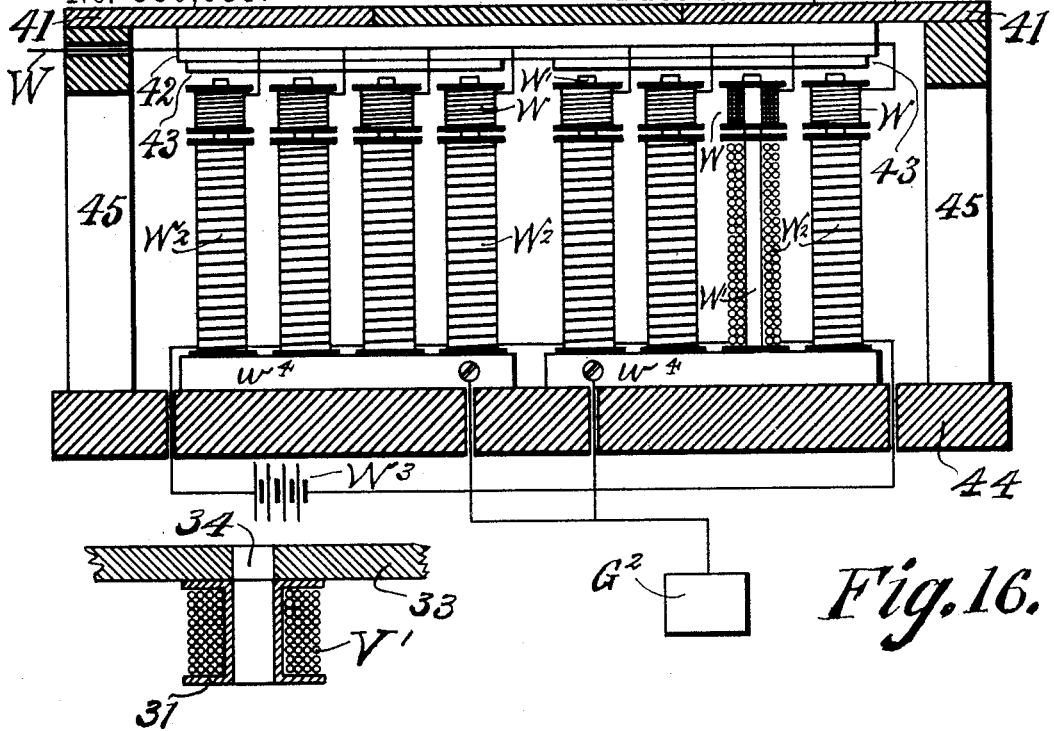
Figures 12, 17:
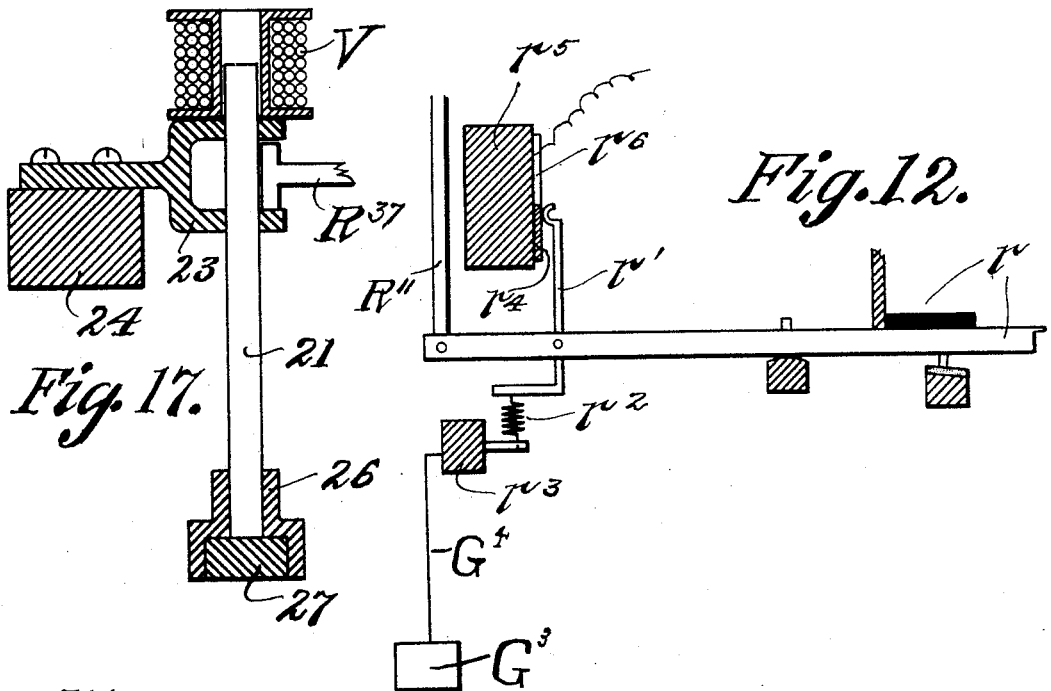
Figure 13:
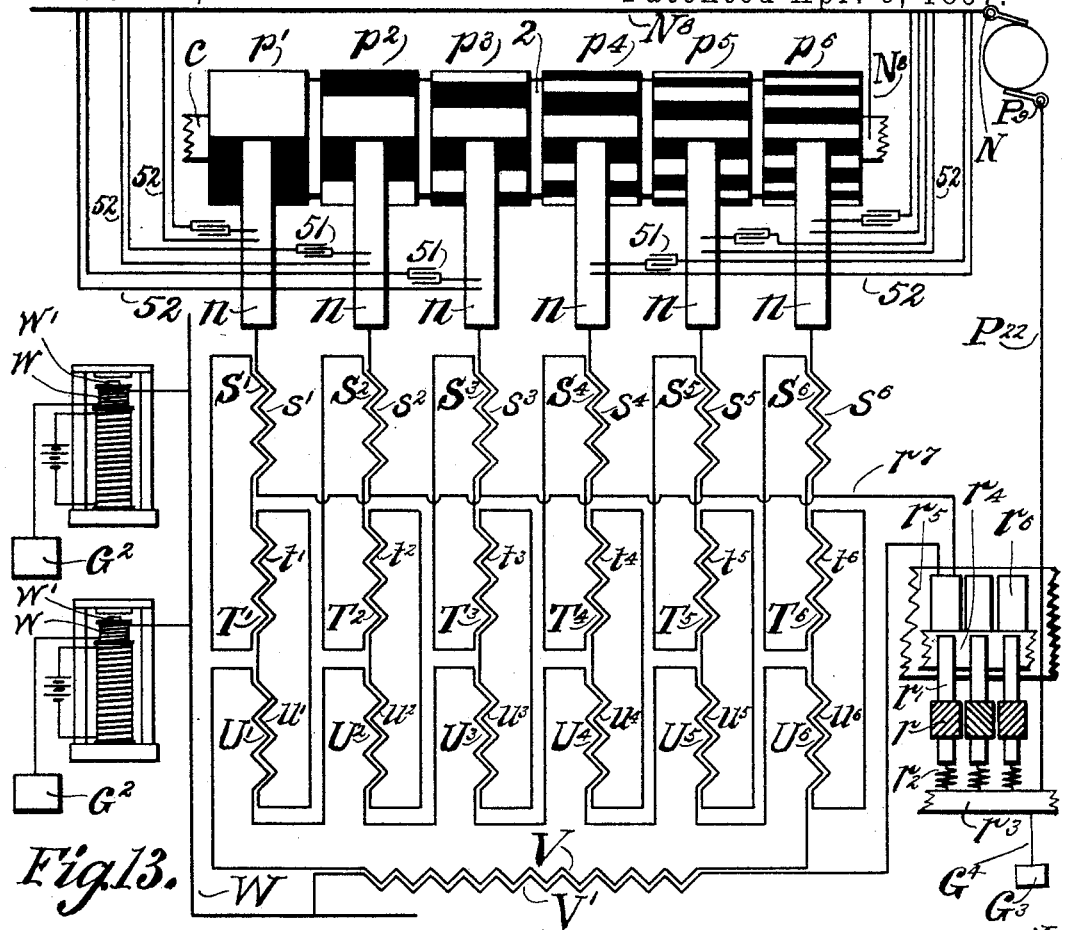
Figure 18:
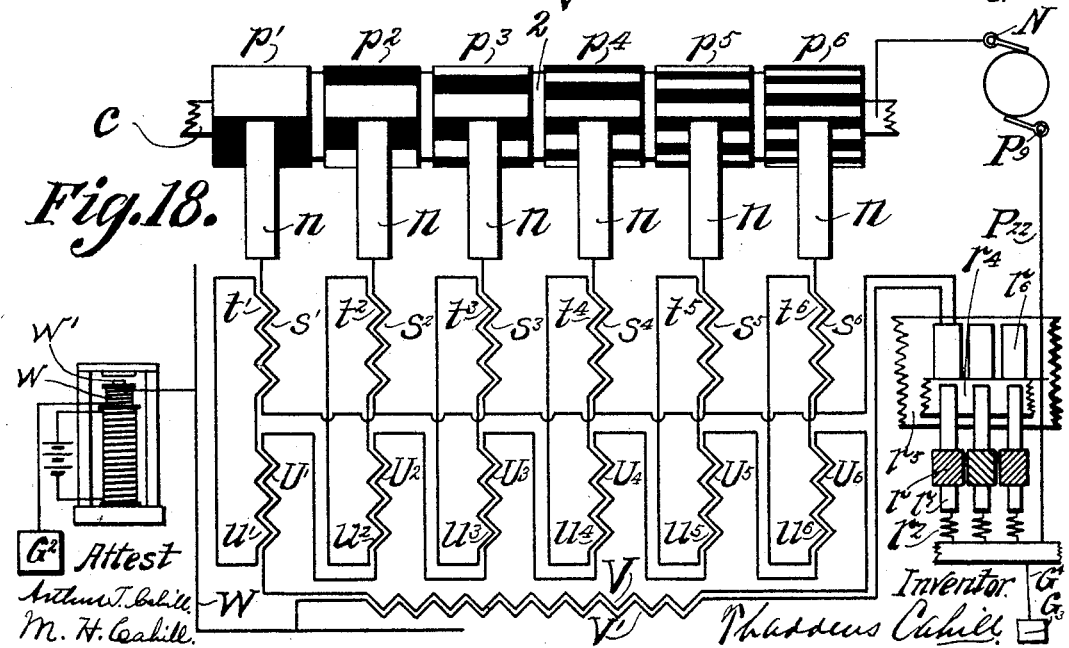

In the accompanying drawings, Figure 1 is a diagrammatic plan view illustrating the general scheme and arrangement of the pitch-shafts hereinafter described, corresponding to the twelve notes of the chromatic scale, and the rheotome-cylinders carried by said pitch-shafts and corresponding, respectively, to different octaves of the notes for which the pitch-shafts carrying them stand, and in this view the main driving-shaft, with its bearings, supports, &c., is removed. Fig. 2 is a side elevation of the device of Fig. 1. Fig. 3 is a sectional view, partly in elevation, on the line $x\ x$, Fig. 1. Fig. 4 is a diagrammatic sectional view on the line $x'\ x'$, Fig. 1, illustrating the arrangement of parts for driving the pitch-shafts each with the requisite velocity. Fig. 5 is a diagrammatic view of an individual pitch-shaft with its attached rheotome-cylinders, corresponding, respectively, to different octaves of the note for which such pitch-shaft stands. Fig. 6 is a similar view of an individual rheotome-cylinder with its different sets of insulating and conducting sections corresponding to different partials of the note for which such rheotome-cylinder stands. Fig. 7 is a similar view illustrating a portion—to wit, the portion corresponding to the first partial—of each of the rheotome-cylinders carried by an individual pitch-shaft and corresponding to the different octaves of the note for which such pitch-shaft stands, the remaining portions of each of said rheotome-cylinders, corresponding to the higher partials of such notes, being broken away. Fig. 8 is a detail section through one of the rheotome-cylinders, illustrating the arrangement of the brushes and related parts. Fig. 9 is a detail sectional view in a plane parallel to the plane of Fig. 8, illustrating one of the brush-holders. Fig. 10 is a detail side elevation of the device illustrated in Fig. 8. Fig. 11 is a detail, a longitudinal section, illustrating a rheotome-cylinder blank grooved. Figs. 11$^A$, 11$^B$, and 11$^C$ are cross-sections on the lines $x'\ x'$, $x^2\ x^2$, and $x^3\ x^3$, Fig. 11, illustrating the section of different portions of the rheotome-cylinder blank slotted to receive the insulating-sections; and Fig. 11$^D$ shows the same with the insulating-sections in place. Fig. 11ᴱ is a diagrammatic detail view illustrating the preferred arrangement of rheotome and inductorium, having two rheotome-controlled primaries connected in such a manner that the current circulates through them alternately and in opposite directions. Fig. 12 is a detail sectional elevation in a plane parallel to the length of one of the keys of the keyboard of the instrument, showing the arrangement of key-controlled electrical contacts. Fig. 13 is a diagrammatic view, partly in section and partly in elevation, illustrating the arrangement of circuits controlled by a key and serving to produce a composite tone. Fig. 14 is a similar view illustrating the arrangement of a plurality of sets of circuits, each controlled by its own key and all alike connected with the vibration-translating devices. Fig. 15 is a sectional view, partly in elevation, illustrating a key-controlled expression device whereby the loudness of the tones is governed according to the pressure upon the key. Fig. 16, which is a detail sectional elevation, illustrates my preferred form of vibration-translating device. Figs. 1 to 16 illustrate the preferred construction. The remaining figures illustrate various modifications. Fig. 17 is a detail view, partly in section and partly in elevation, illustrating an alternative construction for the expression device shown in Fig. 15. Figs. 18, 19, 20, 21, and 22 are diagrammatic views; in general similar to Fig. 13, illustrating various modifications of the circuits, each of which modifications is fully described in its proper place in the description following.

The drawings are for the most part diagrammatic. They are intended and adapted to make clear the essential principles and features of the invention; but they are not made to scale and they do not attempt to represent sizes and proportions of parts. In many of the figures parts varying greatly in size, such as the different rheotome-cylinders, are shown all of the same size, and things in fact small are in some cases shown large in order to render them clear. To attempt to show correct working proportions, or even relative sizes, in the small space afforded by the official sheet would lead only to a great increase in the number of sheets, and would tend rather to obscure than to assist the explanation of essential features; and generally in the drawings inductoriums, dynamos, batteries, condensers, &c., are represented in the usual diagrammatic mode rather than by geometric projection, as the former mode represents the arrangement of circuits more clearly than the latter and in less space.

I generate, it will be remembered, electrical undulations answering to the various notes ordinarily employed in music. I contemplate generating these undulations in at least two different ways—to wit, (a) by interrupting electric currents periodically, and (b) by rotating or vibrating circuits in the presence of magnets or magnetic or inductive bodies in the presence of circuits. I shall first describe the arrangement of current-interrupting devices that I have contrived. (See particularly Figs. 1, 2, 4, 6, 7, 8, and 13.)

The apparatus, as shown in the drawings, comprehends a multiplicity of rheotome devices, one complex or composite rheotome device for each note, each such rheotome device being in effect a plurality of rheotomes, having interruption frequencies corresponding to the vibration frequencies belonging to the ground tone and to certain harmonics of the note for which they serve. The form of rheotome device that I prefer to use is a rotating cylinder having a plurality of sets or series of conducting and insulating sections with brushes bearing upon it. Each of these cylinders in the preferred form of device illustrated in the drawings (subject to certain exceptions in the highest octaves, hereinafter pointed out) is furnished with six sets of alternate conducting and insulating sections. (See Figs. 1, 5, and 13.) The first set (marked $p'$) corresponds to the ground tone or first partial of the note for which the rheotome stands; the second set (marked $p^2$) corresponds to the second partial of the note, being the octave above the ground tone; the third set (marked $p^3$) corresponds to the third partial of the note, being the fifth above the octave of the ground tone; the fourth set (marked $p^4$) corresponds to the fourth partial of the note, being the fifteenth or double octave above the ground tone; the fifth set (marked $p^5$) corresponds to the fifth partial of the note, being the third above the double octave of the ground, and the sixth set (marked $p^6$) corresponds to the sixth partial of the note, being the fifth above the double octave of the ground tone. The vibration frequency of a rheotome is the number of current vibrations that it produces in unit time. In other words, pitch and vibration frequency are identical, the latter being simply the mathematical expression of the former. With a rheotome-cylinder rheotome the vibration frequency is equal to the angular velocity of the movement of the cylinder with relation to the brushes divided by the angle which a single pair of sections, one insulating and the other conducting, subtends. The six sets of alternate insulating and conducting sections $p'$, $p^2$, $p^3$, $p^4$, $p^5$, and $p^6$, constituting a single rheotome-cylinder with their brushes $n$ $n$, hereinafter described, are in effect, it will be seen, six simple rheotomes, having vibration frequencies standing to each other as one, two, three, four, five, and six, serving to furnish, respectively, the first, second, third, fourth, fifth, and sixth partials of the note for which they stand, and contrived in such a manner that they can never get out of tune in the least. Whatever number of vibrations the set of alternate conducting and insulating sections $p'$ produces in unit time the set marked $p^2$ produces twice as many, the set $p^3$ three times as many, the set $p^4$ four times as many, the set $p^5$ five times as many, and the set $p^6$ six times as many. Thus supposing the set marked $p'$ to have, as in Fig. 13, two insulating-sections and two conducting-sections the set $p^4$ would have four insulating-sections and four conducting-sections, the set $p^3$ would have six, $p^4$ eight, $p^5$ ten, and $p^6$ twelve. The brushes $n$ $n$, the arrangement of which is hereinafter more fully described, bear upon the sets of alternate conducting and insulating sections and make and break connection with them. The electrical connections and the arrangement of the circuits will be described hereinafter.

Having thus pointed out the distinguishing characteristics of one of my preferred rheotome devices, it will now be convenient to describe the whole series and arrangement of rheotomes, and in this connection the mechanism by which the rheotome-cylinders are mounted and by which they are driven, each at the proper speed, must be adverted to. There is (a) a bed-plate or main frame for supporting the various movable parts; (b) a main driving-shaft and suitable supports therefor; (c) twelve pitch-shafts corresponding, respectively, with the twelve notes of the chromatic scale and means whereby said pitch-shafts are connected with the main driving-shaft; (d) seven rheotome-cylinders attached to each of the twelve pitch-shafts and corresponding to the seven octaves of the note for which such shaft stands, each such rheotome-cylinder (except the two highest) having, as before explained, six sets of alternate conducting and insulating sections $p'$, $p^2$, $p^3$, $p^4$, $p^5$, and $p^6$, corresponding, respectively, with the first, second, third, fourth, fifth, and sixth partials of the note for which such rheotome-cylinder stands, and (e) suitable brushes which rub on the rheotome-cylinders and make and break connection with them as they revolve. There is also, as we shall see hereinafter, an inductorium or a plurality of inductoriums connected with each rheotome-cylinder and controlled thereby, and a tone-purifying device is also connected therewith. An action is provided, as before stated, whereby the power of the electrical tones is governed at will, each independently of the others, and means are provided for throwing vibrations from any of the rheotomes at will into the vibration-translating apparatus. Of these in their order.

*The bed-plate*, (see Figs. 1, 2, and 3.)—The bed-plate or main frame for the rheotomes consists, essentially, of heavy longitudinal ribs H H, each of which is a double T in cross-section, and heavy transverse connecting-ribs H', H², and H³, lying at right angles to the ribs H H and rising vertically some distance above said ribs H H. The top surfaces of the transverse ribs H', H², and H³ are planed true. The boxes $k$ $k$, which support the various pitch-shafts hereinafter described, are set upon and bolted to the top surfaces of these transverse ribs. Wooden planks H⁶ H⁶, well dried and lacquered and suitably braced, extend across from the ribs H H, transverse to such ribs and parallel with the ribs H', H², and H³, being supported by the ribs H H. They form a platform or floor, to which the brush-holding brackets $n^6$ $n^6$ (hereinafter described) are firmly attached.

*The main driving-shaft and its supports.*— Heavy hangers H⁷ H⁷ (see Figs. 2 and 3) are attached to the transverse ribs H² and H³, being each secured firmly to its supporting-rib by means of studs H⁸ and bolts H⁹. Each of the hangers H⁷ supports a split box H²¹, which is held in place by a cap-piece H²², which latter is held in place by suitable bolts. The main driving-shaft H²³ is set in the boxes H²¹ H²¹, supported by the castings H⁷ H⁷. The main driving-pulley H²⁴ is attached firmly to this shaft and is suitably connected by a belt or otherwise with a suitable driving-engine. The main driving-shaft H²³ carries in addition to the pulley H²⁴, before mentioned, twelve other pulleys C, C', D, D', E, F, F', G, G', A, A', and B, which serve, respectively, to drive the twelve pitch-shafts hereinafter described.

*The pitch-shafts.*—The twelve pitch-shafts (marked, respectively, $c$, $c'$, $d$, $d'$, $e$, $f$, $f'$, $g$, $g'$, $a$, $a'$, and $b$) are all exactly alike, as shown in the drawings. Each is mounted in boxes $k$ $k$ $k$, set upon the ribs H', H², and H³, as before mentioned, and held in place by studs and nuts $k'$ $k'$, and each carries a pulley $k^2$. Belts $k^3$ $k^3$ (omitted in most of the figures, but shown in Fig. 4) connect the pulleys $k^2$ $k^2$, belonging to the pitch-shafts, with the driving-pulleys C C', &c., carried by the main driving-shaft, the whole arrangement being such that the twelve pitch-shafts $c$, $c'$, $d$, $d'$, $e$, $f$, $f'$, $g$, $g'$, $a$, $a'$, and $b$ are connected, respectively, with the twelve driving-pulleys C, C', D, D', E, F, F', G, G', A, A', and B, so that said pulleys C, C', D, D', E, F, F', G, G', A, A', and B, respectively, drive the pitch-shafts, (marked, respectively, $c$, $c'$, $d$, $d'$, $e$, $f$, $f'$, $g$, $g'$, $a$, $a'$, and $b$.) The twelve pulleys $k^2$ $k^2$ $k^2$, &c., belonging to the twelve pitch-shafts, respectively, are made, preferably, all of exactly the same diameter, and the twelve driving-pulleys C, C', D, D', E, F, F', G, G', A, A', and B are made to differ in diameter in the same proportions in which the vibration frequencies of the twelve notes C, C♯, D, D♯, E, F, F♯, G, G♯, A, A♯, and B differ from each other in equal temperament; or the diameters of the different pulleys $k^2$ $k^2$ may be made to differ, as desired, the diameters of the corresponding driving-pulleys C, C', D, D', E, F, F', G, G', A, A', and B being made such that in the result said driving-pulleys C, C', D, D', E, F, F', G, G', A, A', and B give to the pitch-shafts $c$, $c'$, $d$, $d'$, $e$, $f$, $f'$, $g$, $g'$, $a$, $a'$, and $b$, driven, respectively, by them, angular velocities proportional to the vibration frequencies in equal temperament of the twelve notes C, C♯, D, D♯, E, F, F♯, G, G♯, A, A♯, and B, for which the twelve pitch-shafts, respectively, stand. Making the twelve pulleys $k^2 k^2$, &c., attached, respectively, to the twelve pitch-shafts all of the same diameter, however, and making the differences in pitch by the different diameters given to the driving-pulleys C, C', D, D', E, F, F', G, G', A, A', and B, the diameters of the twelve pulleys last mentioned expressed in units (for example, eighths of an inch) may be made substantially as follows, to wit: diameter of pulley C, 258.7; of pulley C', 273.9; of pulley D, 290.3; of pulley D', 307.4; of pulley E, 325.9; of pulley F, 345.3; of pulley F', 365.8; of pulley G, 387.6; of pulley G', 410.4; of pulley A, 435.0; of pulley A', 460.7; of pulley B, 488.2. After the twelve pulleys C C', &c., have been thus made of diameters corresponding to the vibration frequencies of the pitch-shafts driven by them any want of perfection in tuning can be readily corrected by filing a little either the proper pulley on the main driving-shaft $H^{23}$, which will flatten the notes of the pitch-shaft driven by the pulley filed, or the pulley $k^2$ of the pitch-shaft may be filed, which will sharpen the pitch of the notes controlled by such pitch-shaft. The pitch-shafts should of course be well mounted and well lubricated, so that they will run with as little friction as may be, and the belts connecting the pitch-shaft pulleys $k^2 k^2$, &c., with the driving-pulleys C C' D D', &c., should be drawn taut, so that the slip or at least the difference in rate of slip of the belts aforesaid will be negligible, for any material difference in the rate of slip of the said belts $k^3 k^3$, &c., would tend to throw the instrument out of tune, and, finally, the main driving-shaft $H^{23}$, which carries the pulleys C C' D D', &c., must be given such a velocity that it will bring the whole set of pitch-shafts, with the rheotomes carried by them, up to the pitch desired.

When the rheotome-cylinders are made exactly like those illustrated in the accompanying drawings with respect to the number of insulating and conducting sections in each, giving the driving-shaft $H^{23}$ such a velocity that the pitch-shaft $c$ will make nine hundred and sixty revolutions a minute will bring the whole up very close to concert pitch—that is to say, middle $c$ will have two hundred and fifty-six vibrations.

*The arrangement of rheotomes.*—The different rheotome-cylinders correspond in the preferred construction illustrated in the drawings each to one of the notes which the apparatus is adapted to produce. The twelve pitch-shafts $c\ c'\ d\ d'$, &c., it will be remembered, which correspond, respectively, to the twelve notes of the chromatic scale, carry each seven rheotome-cylinders (marked, respectively, 2, 4, 8, 16, 32, 64, and 128) which serve to give the different octaves of the note for which the pitch-shaft carrying them stands. Each rheotome-cylinder, as we have seen, consists of a plurality of sets of insulating and conducting sections, as $p'$ and $p^2$, &c., having vibration frequencies corresponding to different partials of the note which their rheotome-cylinder serves to produce. Each rheotome-cylinder, as represented in the drawings, in fact constitutes with its brushes a plurality of rheotomes.

In the device figured in the drawings each of the rheotome-cylinders has in its first partial set $p'$ a number of insulating-sections and also a number of conducting-sections equal to the number expressed by the figure or figures with which the cylinder is marked in the drawings, to wit: The cylinder 2 has in its first partial set of insulating and conducting sections $p'$ two insulating-sections and two conducting-sections, the cylinder 4 has four, the cylinder 8 has eight, the cylinder 16 has sixteen, the cylinder 32 has thirty-two, the cylinder 64 has sixty-four, and the cylinder 128 has one hundred and twenty-eight. In its second partial set $p^2$ each of these cylinders has just twice as many insulating and conducting sections as it has in its first partial set, in its third partial set $p^3$ it has three times as many as it has in its first partial set, in its fourth partial set $p^4$ four times as many, in its fifth partial set $p^5$ five times as many, and in its sixth partial set $p^6$ it has six times as many insulating and conducting sections as it has in its first partial set $p'$. Whether the cylinders 2, 4, 8, 16, 32, 64, and 128 shall have, respectively, two, four, eight, sixteen, thirty-two, sixty-four, and a hundred and twenty-eight insulating and conducting sections each in its first partial set is of course unimportant. The important point is that their vibration frequencies shall stand to each other as two, four, eight, sixteen, thirty-two, sixty-four, and one hundred and twenty-eight.

It will now be understood that the eighty-four rheotome-cylinders illustrated in Fig. 1 correspond to the eighty-four notes of a seven-octave pianoforte, the seven carried by the pitch-shaft $c$ correspond to the seven C's, the seven carried by the pitch-shaft $c'$ correspond to the seven C-sharps, the seven carried by the pitch-shaft $d$ correspond to the seven D's, the seven carried by the pitch-shaft $d'$ correspond to the seven D-sharps, the seven carried by the pitch-shaft $e$ correspond to the seven E's, the seven carried by the pitch-shaft $f$ correspond to the seven F's, the seven carried by the pitch-shaft $f'$ correspond to the seven F-sharps, the seven carried by the pitch-shaft $g$ correspond to the seven G's, the seven carried by the pitch-shaft $g'$ correspond to the seven G-sharps, the seven carried by the pitch-shaft $a$ correspond to the seven A's, the seven carried by the pitch-shaft $a'$ correspond to the seven A-sharps, and the seven carried by the pitch-shaft $b$ correspond to the seven B's. The twelve rheotome-cylinders marked 2, carried by the twelve pitch-shafts, give the twelve notes of the chromatic scale in the lowest octave, the twelve cylinders marked 4 give the second octave, the twelve marked 8 give the third octave, the twelve marked 16 the fourth octave, the twelve marked 32 the fifth octave, the twelve marked 64 the sixth octave, and the twelve marked 128 give the twelve notes of the chromatic scale in the seventh octave, and the sets of insulating and conducting sections $p'$, $p^2$, $p^3$, $p^4$, $p^5$, and $p^6$, belonging to the different rheotome-cylinders, serve to give, respectively, the first, second, third, fourth, fifth, and sixth partials of the note for which the cylinder to which they belong stands.

The general scheme of the rheotome-cylinders having been made clear, it will be convenient before explaining the electrical connections to describe briefly the mechanical construction of a rheotome-cylinder. The rheotome-cylinders may be made in other ways than that which I am about to describe. No very special importance is attached to the particular mode of construction which I follow. Nevertheless, it may be best to describe it. The rheotome-cylinder is first bored to admit the pitch-shaft. It is then turned true. Annular grooves are then cut in it, dividing it into longitudinal sections $P'$, $P^2$, $P^3$, $P^4$, $P^5$, and $P^6$, corresponding to the sets of insulating and conducting sections $p'$, $p^2$, $p^3$, $p^4$, $p^5$, and $p^6$, making the blank, as in Fig. 11. The purpose of these annular grooves is to render the operation of slotting easier. The different lengthwise portions $P'$, $P^2$, $P^3$, &c., are then slotted or milled out, so as to make spaces sufficient to admit the insulating-sections $p\ p$, giving the blank the form illustrated in the detail sections Figs. 11$^A$, 11$^B$, and 11$^C$, in which P P are the conducting-sections. Then the insulating-sections $p\ p$ are filled in between the conducting-sections as in Fig. 11$^D$. The whole is made cylindrical. The insulating-sections $p\ p$ are fastened firmly in place by strong binding-wires $m'\ m'$, (omitted in most of the figures, but shown in Fig. 10,) wrapped tightly around the whole.

The insulating-sections $p\ p$ may be made of any suitable material. They may be made cheaply of hard tough wood well oiled and seasoned. A somewhat more expensive but much more enduring construction is to employ metal sections insulated from the adjacent conducting parts of the rheotome-cylinder. Brushes $n\ n$ (omitted from Figs. 1 and 2, and shown diagrammatically only in some of the other views, but clearly illustrated in Figs. 8, 9, and 10) lie on each side of the rheotome-cylinders and bear against said cylinders, as shown in the drawings. The brushes $n\ n$ are supported each by a brush-holder, which consists essentially of a casting $n'$, shaped as shown and mounted upon a conducting-rod $n^2$. The casting $n'$ is channeled out, so that it admits ($a$) the brush $n$, ($b$) a flat tension-adjusting spring $n^3$, and ($c$) a clamp-piece or clamp $n^4$. A clamping-screw $n^5$, furnished with a lock-nut, holds the clamp $n^4$ up tight against the brush $n$ and flat spring $n^3$. By loosening the screw $n^5$ the brush $n$ may be slipped up and down, as required, for adjusting. The center rod $n^2$ is supported by a metal bracket $n^6$, which is itself bolted fast to one of the planks H$^6$, before mentioned. Bolts $n^7\ n^7$, furnished with lock-nuts $n^8\ n^8$, serve to hold the springs $n^3\ n^3$ at any tension that may be necessary to give the brushes the required closeness of contact. No special importance, however, is attached to these details of construction. A skilled electrician can vary them to any extent.

*The arrangement of the electrical circuits.*— We are now in a position to explain the arrangement of the electrical circuits. I shall first explain the arrangement of circuits for a single rheotome-cylinder and will show how a rheotome-cylinder is made to produce electrical undulations equivalent to a rich and incisive musical tone, and after the arrangement of circuits by which this is done for a single note has been made clear we will be in a position to follow the arrangement by which the different notes are produced as desired and with the power desired and at a multiplicity of places simultaneously.

As stated in the introductory part of this specification, I first generate electrical vibrations corresponding in periodicity to different partial tones of the musical note desired. I purify these vibrations corresponding to the different sets of partials, purging them of their harsher components by successive inductive transfers. I then combine the vibrations answering to tone-partials of the note desired and purified in the manner described into one series or set of composite electrical undulations. I then transfer these composite electrical undulations by induction to a circuit, which we may for convenience sake term the "line-circuit," and with this line-circuit I connect the receiving-magnets of the vibration-translating devices. This is the preferred mode of carrying out my invention, but it may be varied greatly.

Fig. 13, which is a diagrammatic view, shows the arrangement of circuits which I prefer to use. P$^9$ N is a large dynamo which supplies current to all the rheotome devices. $p'$, $p^2$, $p^3$, $p^4$, $p^5$, and $p^6$ are the different sets of insulating and conducting sections belonging to a rheotome-cylinder and serving to give, respectively, the first, second, third, fourth, fifth, and sixth partials of the note for which such cylinder stands, as before fully explained. $n\ n$, &c., are the brushes bearing on these different sets of insulating and conducting sections. The keys are marked $r\ r$. These keys are preferably made and arranged like the keys of a pianoforte; but they may be arranged in any suitable way whatever. The part of a key $r$ (seen in section in Fig. 13) is the part behind the fulcrum. When the part in front of the fulcrum which the operator touches is depressed, the part seen in section in Fig. 13 rises. Each key $r$ controls a sliding circuit-closer $r'$, made of suitable metal and shaped as illustrated in Fig. 12. The horizontal limb of the sliding circuit-closer $r'$ is connected by a conducting contractile spring $r^2$ with a metal bar $r^3$, and with this bar one pole $P^9$ of the dynamo is connected by a wire $P^{22}$. The upper ends of the sliding circuit-closers $r'$ $r'$ lie when their keys are in their normal positions in contact with the non-conducting strip $r^4$, which is attached to the non-conducting bar $r^5$. Contact-pieces $r^6$ $r^6$, having their front surfaces in the same plane with the front surface of the non-conducting strip $r^4$, lie immediately above the different sliding circuit-closers $r'$ $r'$, and each key when depressed raises its sliding circuit-closer $r'$ from its normal position of contact with the non-conducting strip $r^4$ to a position of contact with the corresponding contact-piece $r^6$. $s'$, $s^2$, $s^3$, $s^4$, $s^5$, and $s^6$ are coils of insulated wire corresponding to the sets of insulating and conducting sections $p'$, $p^2$, $p^3$, $p^4$, $p^5$, and $p^6$ before mentioned of a rheotome-cylinder. Each of such coils has one end connected with the proper brush $n$, and each of them has its non-brush-connected end connected by a wire $r^7$ with the contact-piece $r^6$, which corresponds with the key that stands for the note which the rheotome-cylinder produces. One pole of the dynamo $P^9$ N, we have already seen, is connected with the bar $r^3$. The other pole of said dynamo is connected with all the rheotome-cylinders. A convenient way of making the connection practically is to connect one pole of the dynamo with the main frame formed of parts H, H, H', H², and H³, as before described. From the main frame the current will conduct through the boxes $k^2$ $k^2$ to the pitch-shafts and rheotome-cylinders. The connection, however, may be made in any suitable way whatever. In the diagrammatic view Fig. 13 the connection between the dynamo and the rheotome-cylinder is represented as made by a wire $N^8$. The connections being as described, it will be seen that when any key $r$ is depressed the circuit is closed from the pole $P^9$ of the dynamo through the wire $P^{22}$ to the bar $r^3$, and from this bar through the spring $r^2$ and sliding circuit-closer $r'$ belonging to the particular key $r$ depressed to the contact-piece $r^6$ belonging to the such key, and from this contact-piece through the wire $r^7$ and coils $s'$, $s^2$, $s^3$, $s^4$, $s^5$, and $s^6$ to the brushes $n$ $n$, &c., and from these brushes through the various sets of insulating and conducting sections $p'$, $p^2$, $p^3$, $p^4$, $p^5$, and $p^6$ belonging to the rheotome-cylinder which gives the note for which the key depressed stands, and through such rheotome-cylinder to the pitch-shaft which carries it, and thence by the wire $N^8$ back to the other pole N of the dynamo.

The different sets of insulating and conducting sections $p'$, $p^2$, $p^3$, $p^4$, $p^5$, and $p^6$ have, as before fully explained, interruption frequencies standing to each other as the numbers one, two, three, four, five, and six, and the set $p'$ has an interruption frequency corresponding to the vibration frequency of the note for which the key $r$ controlling it stands, so that the effect of depressing a key is to cause powerful electrical vibrations in the coils $s'$, $s^2$, $s^3$, $s^4$, $s^5$, and $s^6$ corresponding in periodicity, respectively, to the first, second, third, fourth, fifth, and sixth partials of the note for which the key controlling them stands. Proximate to the several coils $s'$, $s^2$, $s^3$, $s^4$, $s^5$, and $s^6$ are other coils $S'$, $S^2$, $S^3$, $S^4$, $S^5$, and $S^6$, respectively, the coil $S'$ being in the inductive field of coil $s'$, $S^2$ in the field of $s^2$, $S^3$ in the field of $s^3$, $S^4$ in the field of $s^4$, $S^5$ in the field of $s^5$, and $S^6$ in the field of $s^6$. The several coils $S'$, $S^2$, $S^3$, $S^4$, $S^5$, and $S^6$ respectively form closed circuits with other coils marked, respectively, $T'$, $T^2$, $T^3$, $T^4$, $T^5$, and $T^6$. Proximate to the several coils $T'$, $T^2$, $T^3$, $T^4$, $T^5$, and $T^6$ and within their respective fields are other coils $t'$, $t^2$, $t^3$, $t^4$, $t^5$, and $t^6$, respectively, and the several coils $t'$, $t^2$, $t^3$, $t^4$, $t^5$, and $t^6$ respectively form closed circuits with other coils marked $u'$, $u^2$, $u^3$, $u^4$, $u^5$, and $u^6$, respectively. Proximate to the several coils $u'$, $u^2$, $u^3$, $u^4$, $u^5$, and $u^6$ last mentioned and within their respective inductive fields are other coils $U'$, $U^2$, $U^3$, $U^4$, $U^5$, and $U^6$, which are connected together in series and form a closed circuit with another coil V.

The electrical vibrations in the coils $s'$, $s^2$, $s^3$, $s^4$, $s^5$, and $s^6$, having vibration frequencies corresponding, respectively, to the first, second, third, fourth, fifth, and sixth partials of the note for which the key controlling them stands, are abrupt, harsh, and disagreeable. They generate, however, by induction electrical undulations less abrupt and less harsh in the closed circuits $S'$ $T'$, $S^2$ $T^2$, $S^3$ $T^3$, $S^4$ $T^4$, $S^5$ $T^5$, and $S^6$ $T^6$, which correspond, respectively, to and lie severally within the inductive influences of the aforesaid coils $s'$, $s^2$, $s^3$, $s^4$, $s^5$, and $s^6$. The electrical undulations in the circuits $S'$ $T'$, $S^2$ $T^2$, $S^3$ $T^3$, $S^4$ $T^4$, $S^5$ $T^5$, and $S^6$ $T^6$ generate by induction electrical undulations of the same periodicity, but less harsh, in the closed circuits $t'$ $u'$, $t^2$ $u^2$, $t^3$ $u^3$, $t^4$ $u^4$, $t^5$ $u^5$, and $t^6$ $u^6$, which correspond, respectively, to and lie severally within the inductive influences of the several circuits $S'$ $T'$, $S^2$ $T^2$, $S^3$ $T^3$, &c. Thus the abrupt and harsh vibrations generated in the circuits of the coils $s'$, $s^2$, $s^3$, $s^4$, $s^5$, and $s^6$ by the current-interrupting action of the rheotome-cylinder become smooth and round vibrations in the circuits $t'$ $u'$, $t^2$ $u^2$, $t^3$ $u^3$, &c. The *modus operandi* of the tone-purifying process will be described later. From the circuits $t'$ $u'$, $t^2$ $u^2$, $t^3$ $u^3$, $t^4$ $u^4$, $t^5$ $u^5$, and $t^6$ $u^6$ the electrical undulations in such different circuits corresponding, respectively, to the first, second, third, fourth, fifth, and sixth partials of the tone desired are transferred by induction to the circuit formed of the coils $U'$, $U^2$, $U^3$, $U^4$, $U^5$, $U^6$, and V, so that composite electrical undulations answering to a clear, rich, and powerful musical tone are generated in the circuit last named.

Proximate to the coil V and in inductive relation to it is another coil V', one terminal of which is connected with the line-wire W and the other terminal of which is connected with the contact-piece $r^6$, belonging to the corresponding key $r$. The bar $r^3$ is connected by a wire $G^4$ with buried plates or an equivalent ground connection $G^3$. The line-wire W is connected with the coils $w\ w$, surrounding the magnet-cores $w'\ w'$, belonging to the vibration-translating devices, and through said coils $w\ w$ the line-wire W is connected with suitable buried plates or equivalent ground connections $G^2\ G^2$, so that the earth is made to serve as a return. Thus the circuit of any of the coils V', it will be seen, is completed when the corresponding key $r$ is depressed (a) through the line-wire W, (b) through the coils $w\ w$, surrounding the magnet-cores of the vibration-translating devices, (c) through the ground connections $G^2\ G^2$, belonging to the vibration-translating devices, (d) through the earth serving as a return-conductor, and (e) through the ground connection $G^3$, wire $G^4$, bar $r^3$, and the contractile spring $r^2$, sliding circuit-closer $r'$, and contact-piece $r^6$, corresponding to the key depressed.

A few rheotome-cylinders and keys only are illustrated in Fig. 14, which is merely a diagrammatic view; but it is to be understood that there is a key for every rheotome-cylinder and that every key and rheotome-cylinder have connections exactly similar to those illustrated in Figs. 13 and 14, subject to the qualification that in the highest octave served by the rheotome-cylinders marked 128 (and which rheotome-cylinders have, it will be remembered, only two sets of insulating and conducting sections $p'$ and $p^2$, answering to the ground-tone and the second partial) the coils $s^3$, $s^4$, $s^5$, and $s^6$, $S^3$, $S^4$, $S^5$, and $S^6$, $T^3$, $T^4$, $T^5$, and $T^6$, $t^3$, $t^4$, $t^5$, and $t^6$, $u^3$, $u^4$, $u^5$, and $u^6$, and $U^3$, $U^4$, $U^5$, and $U^6$ are of course omitted, and in the next to the highest octave served by the rheotome-cylinders 64 (which rheotome-cylinders have, it will be remembered, but four sets of insulating and conducting sections, to wit, $p'$, $p^2$, $p^3$, and $p^4$, answering to the first, second, third, and fourth partials) the coils $s^5$ and $s^6$, $S^5$ and $S^6$, $T^5$ and $T^6$, $t^5$ and $t^6$, $u^5$ and $u^6$, and $U^5$ and $U^6$ are of course omitted.

Each key, it will be seen, when depressed serves (a) to close the rheotome-interrupted circuits $s'\ s^2$, &c., corresponding to it and (b) to close the circuit of the coil V', in which the composite musical note corresponding to it is produced electrically, so that said coil discharges its vibrations into the line-wire W and receiving-coils $w\ w$ of the vibration-translating devices. Each of the keys serves also to control the amplitude of the vibrations thus transferred to the line by its coil V', so that the note is produced by the translating devices piano or forte, as desired. It remains to describe how this is done.

*Of the making of the tones, piano or forte, as desired.*—I vary the loudness of the tones in the apparatus shown in the drawings by varying the inductive action between vibration-transferring and vibration-receiving circuits. My preferred apparatus (illustrated in Fig. 15) consists, essentially, of two parts, the one electrical, the other mechanical, to-wit, (a) an arrangement of inductive bodies suitably mounted and serving by their relative movement to vary the strength of the vibratory currents, and (b) a hammer and a friction-driver action therefor, substantially similar to that illustrated and described in the specification of Letters Patent of the United States No. 520,667, granted to me on May 29, 1894, (to which specification reference is hereby had and made for a full description of such actions and the points to be taken into account in their construction,) whereby the hammer is caused to deliver a blow, when the key is depressed, with greater or less force, according to the pressure upon the key, on one of the movable inductive bodies before mentioned, thus moving said inductive body with relation to the other inductive body a greater or less distance, according to the pressure upon the key, so as to make the tone loud or soft, as desired. Fig. 15 illustrates the arrangement of parts for a single key only. There is a similar set of parts for each key, except that the friction-driver, rails, and framing hereinafter described (shown in section in Fig. 15) serve for all.

21 is a soft-iron core well laminated. Heads 22 22 are very firmly attached to this core; and the coil V before mentioned, whose electrical connections (illustrated in Figs. 13 and 14) have been already fully described, is wound tightly around the core 21 near its upper end and inside the heads 22 22. The core 21, carrying the coil V, slides up and down easily but closely in a guide-piece 23, which is screwed fast to the rail 24. The coil V', whose electrical connections (illustrated in Figs. 13 and 14) have been already fully described, is wound around a hollow bobbin 31, which is attached to the lower surface of the rail 33. The hollow bobbin 31 is concentric with the coil V and core 21 and is of sufficient diameter inside to admit the core 21 and coil V. A hole 34, cut in the rail 33, admits the core 21 when said core carries the coil V up into the center of the coil V'. To the foot of the core 21 is attached a cup-piece 26, containing a cushion 27, of rubber, felt, ivory, or other suitable resilient material. A metal hammer 35, having a weight about equal to the weight of the core 21 and coil V, serves, when the key is depressed, to strike upon the resilient material 27 attached to the core 21, and thus to throw the core 21 and coil V upward toward the coil V' a greater or less distance, according to the pressure with which the key is depressed. A check $R^{37}$ serves to hold the core 21 and core V so long as the key is depressed in whatever position they may be thrown into by the blow of the hammer 35. The core 21 lies normally with its lower head 22 resting on a cushion of felt 25, which cushion lies down upon the top surface of the guide-piece 23.

In its normal position, in which it appears in Fig. 15, the coil V lies remote from the coil V', and when the coil V thus lies remote from the coil V' the influence of the coil V on the coil V' is weak, weak currents only are generated in the coil V', and the tones given off by the vibration-translating devices are soft; but when the coil V is moved up into the center of the coil V' the influence of the core V on the coil V' is strong, strong currents are generated in the coil V', and the tones given off by the vibration-translating devices are loud. Thus every degree of loudness from pianissimo to fortissimo can be given to the tones given off by the vibration-translating devices simply by varying the mutual induction of the coil V and the coil V'. The core 21 and coil V are moved by the action of the key-controlled hammer 35 into different positions with relation to the coil V', according to the force with which the key is depressed. The whole arrangement is such that when the key is depressed the hammer 35 strikes the core 21 a blow more or less forcible, according to the pressure upon the key, thus moving the core 21 and coil V greater or less distances from their normal position toward the coil V', according to the pressure upon the key.

It remains to describe the action by which the key controls the hammer. We may consider the hammer 35 as in a certain sense the equivalent of a common pianoforte-hammer, the essential difference being in the way in which the blow is utilized to affect the loudness of the tone. Many actions have been invented and are known for controlling the pianoforte-hammers by the keys. Some of these are power-actions and others depend entirely on the force of the fingers. I prefer to use a power-action and of the friction-driver variety, because such actions are simple in construction, powerful in operation, and perfectly sympathetic; but any other suitable action whatever may be used. By saying that a friction-driver action is sympathetic I mean that the force which it exerts is always proportional to the force exerted upon it—a point of great importance. A convenient arrangement of friction-driver action is that illustrated in Fig. 15, and before mentioned. $r$ is the key, which controls the electrical connections illustrated in Figs. 13 and 14, and before fully described, as well as the mechanical action now about to be described. $R^8$ is a bell-crank lever which is fulcrumed by means of a flange $R^9$, screwed fast to the rail $R^{10}$. A push-rod $R^{11}$ connects the key $r$ with the horizontal arm of the bell-crank lever $R^8$. Said lever $R^8$ is connected by a tracker $R^{12}$ with the fly-carrying lever $R^{22}$, hereinafter described. The trackers $R^{12}$, belonging to the different keys, diverge as they run back from the bell-crank levers $R^8$ to the fly-carrying levers $R^{22}$. The office of the bell-cranks $R^8$ and trackers $R^{12}$ is to connect the keys, lying close together, with the expression-actions, which require much more space, and any of the well-known devices, such as roller-boards, fan-boards, &c., used in pipe-organs for similar purposes, may, of course, be used instead.

The hammer 35 is carried by a shank 37, which is fulcrumed by means of a flange 38, screwed fast to the rail 39.

$R^{13}$ is a hollow cylinder or drum mounted upon a shaft $R^{14}$, turned true and rotated in the direction of the arrow in any suitable manner, as, for example, by an electric motor. Said friction-driver $R^{13}$ serves as a friction-driver for all the actions, of which one only, it will be remembered, is seen in Fig. 15.

$R^{15}$ is the contact-piece, which is centered by means of a pin $R^{16}$, set in the contact-piece-carrying lever $R^{17}$. It is connected by a link $R^{18}$ with the hammer-shank 37. The surface of the contact-piece $R^{15}$, lying proximate to the friction-driver $R^{13}$, is curved on the center-pin $R^{16}$ as a center. The contact-piece-carrying lever $R^{17}$ serves to move the contact-piece toward and away from the friction-driver $R^{13}$. It is supported by a flange $R^{19}$, screwed fast to the rail 39. A light expansive spring $R^{20}$ holds the lever $R^{17}$ in the position illustrated in Fig. 15, with its lower end resting against the adjustable stop $R^{21}$, so that the contact-piece $R^{15}$ lies normally in close proximity to, but clear of, the friction-driver $R^{13}$.

The stop $R^{21}$ is made adjustable by making the hole, through which the bolt or screw $R^{50}$, attaching said stop to the rail $R^{51}$, passes, elliptical or elongated, so that when the screw $R^{50}$ is loosened the stop $R^{21}$ can be slipped into the position desired and locked in that position by tightening the screw $R^{50}$.

A lever $R^{22}$, fulcrumed by a flange $R^{23}$, screwed fast to the rail $R^{24}$ and held by the contractile spring $R^{45}$ normally against the adjustable stop $R^{46}$, has its lower end connected by the tracker $R^{12}$ with the vertical arm of the bell-crank lever $R^8$, so that said bell-crank lever, when rocked by the depressing of the key, rocks the lever $R^{22}$, moving its upper end to the left. The lever $R^{22}$ carries the fly-lever $R^{25}$, the front end of which lies normally in close proximity to the nose $R^{26}$ of the contact-piece-carrying lever $R^{17}$.

$R^{27}$ is the check-piece, pin-jointed to the contact-piece at its lower end and having its upper end lying intermediate the lever $R^{22}$ and the fixed check-rail $R^{28}$.

$R^{29}$ is the fly-releaser, which is pin-jointed below to the contact-piece $R^{15}$ and above to the bridle-lever $R^{30}$, which latter is fulcrumed by means of a flange $R^{31}$, screwed fast to the rail $R^{32}$. The fly-releaser $R^{29}$ carries a pin $R^{33}$, which serves, as hereinafter described, to knock the fly-lever R$^{25}$ out of engagement with the nose R$^{26}$ of the contact-piece-carrying lever R$^{17}$.

R$^{34}$ is a wrought-iron bell-crank lever fulcrumed by means of a flange R$^{35}$, attached to the rail R$^{36}$. The vertical arm of said bell-crank lever carries at its lower extremity a check-piece or clutch R$^{37}$. A light contractile spring R$^{38}$ holds the bell-crank lever R$^{34}$ normally in the position illustrated in Fig. 15, with its vertical arm resting against the adjustable stop R$^{39}$, so that the check-piece R$^{37}$ lies very close to, but not in contact with, the core 21, which core, it will be remembered, carries the coil V. The check-piece R$^{37}$ lies between the upper and the lower jaws of the guide-piece 23, almost filling the space between them, so that its up-and-down movement is negligible.

An electromagnet R$^{40}$ (screwed fast to the rail R$^{41}$ and having one terminal connected with the contact-spring R$^{42}$ and its other terminal connected through the generator P$^9$ N with the fly-releaser R$^{29}$) lies below the horizontal arm of the iron bell-crank lever R$^{34}$ in proximity to it. The fly-releaser R$^{29}$ has a projection R$^{43}$ overhanging the free end of the contact-spring R$^{42}$ before mentioned, so that when the fly-releaser R$^{29}$ is pulled down by the contact-piece R$^{15}$ it closes circuit with the spring R$^{42}$ through the magnet R$^{40}$ and generator P$^9$ N. The magnet R$^{40}$ thus energized pulls upon the bell-crank R$^{34}$ and presses the check-piece R$^{37}$ against the coil-carrying core 21 with considerable force whenever the key is depressed.

The operation is as follows: The key $r$, when depressed by the performer in front of the fulcrum, rises back of the fulcrum, raising the push-rod R$^{11}$, tilting the bell-crank lever R$^8$, and thus through the tracker R$^{12}$ tilting the lever R$^{22}$ and pressing the fly-lever R$^{25}$ against the nose R$^{26}$ of the contact-piece-carrying lever R$^{17}$, so that the contact-piece-carrying lever moves upon its center until its movement is arrested by the contact-piece R$^{15}$ coming in contact with the friction-driver R$^{13}$. Thus the contact-piece is pressed against the friction-driver with a force great or small, according to the pressure upon the key. Immediately the contact-piece R$^{15}$ comes in contact with the friction-driver R$^{13}$ the friction-driver exerts a traction upon the contact-piece great or small, according to the pressure upon the key, moving the contact-piece in the direction of the arrow, Fig. 15. The contact-piece R$^{15}$ when thus moved draws down the fly-releaser R$^{29}$, bringing the electrical contact-point carried by the projection R$^{43}$ in contact with the yielding contact-spring R$^{42}$, and thus early in its movement closes the circuit of the clutch-magnet R$^{40}$, so that said magnet becomes magnetized and, attracting its armature R$^{34}$, causes the clutch R$^{37}$ to press firmly upon the coil-carrying core 21. The contact-piece R$^{15}$ meanwhile continues its movement and through the link R$^{18}$ throws up the hammer-shank 37 and hammer 35. Thus the hammer rises with a force great or small, according to the pressure upon the key, until, when the hammer gets close to the resilient cushion 27, attached to the core 21, the pin R$^{33}$, carried by the fly-releaser R$^{29}$, comes in contact with the fly-lever R$^{25}$ and moves it down out of engagement with the nose R$^{26}$ of the contact-piece-carrying lever R$^{17}$. At this instant several operations take place practically simultaneously. ($a$) the hammer 35 strikes the resilient cushion 27, attached to the core 21, transferring its momentum to the core 21 and coil V, so that they start up toward the coil V$'$, while the hammer itself first comes to rest and then moves back a short distance toward its normal position without, however, returning the whole distance; ($b$) on the freeing of the fly-lever R$^{25}$ by the action of the fly-releaser R$^{29}$ the back end of the key moves upward a little, so raising the push-rod R$^{11}$ and tilting the levers R$^8$ and R$^{22}$ until the further movement of the parts is arrested by the lever R$^{22}$ coming in contact with the contact-piece-connected check-piece R$^{27}$, which is thus pressed firmly against the check-rail R$^{28}$, so that a check is opposed to the movement of the contact-piece R$^{15}$ and hammer 35 sufficient to prevent the hammer, when it rebounds on delivering its blow, from returning to its normal position or from moving so far in that direction as to break the circuit of the magnet R$^{40}$, and ($c$) the core 21 and coil V, having been set moving, as before described, by the blow of the hammer 35 upon the resilient cushion 27, attached to the core 21, move upward for an instant, when they come to rest under the opposing forces of gravity and the friction resulting from the application of the check R$^{37}$ in a position of proximity to or remoteness from the coil V$'$, dependent upon the force with which the key was depressed. If the key be depressed gently, the contact-piece is pressed against the friction-driver lightly, the friction-driver pulls upon it lightly, the hammer moves lightly and taps the resilient cushion 27 lightly, so that the core 21 and coil V move but a short distance toward the coil V$'$, when they come to rest; but if the key be depressed very forcibly the contact-piece is pressed hard against the friction-driver, so that the friction-driver pulls upon it strongly. The hammer, thus forcibly impelled, moves with great rapidity and delivers a vigorous blow upon the resilient cushion 27, which sends the core 21 and coil V instantly up into the center of the coil V$'$. If the key be depressed with any intermediate degree of force, the hammer delivers a proportional blow and the core 21 and coil V assume a position of proximity to the coil V$'$ correspondent with the pressure exerted upon the key. Thus by the touch upon the key any desired position can be given to the core 21 and coil V, and every different position of such core and coil gives, it will be remembered, a different degree of power to the vibrations received by the coil V' from the coil V and a different degree of loudness to the tones given off by the vibration-translating devices. Thus every degree of loudness from pianissimo to fortissimo can be made, and made instantly, for each note individually simply by the pressure upon the key, as in a common pianoforte. When the key is released, the various parts return to their normal positions.

In large instruments the return of the core 21 and coil V to their normal positions should be quickened by a suitable spring.

It remains to describe the vibration-translating devices. Any suitable form of receiving-telephone whatever might be used to some extent as a vibration-translating device in the carrying out of my invention. Receiving-telephones are made in a great variety of forms and upon principles somewhat different. In some the vibration-translating action is due to the development of heat, varying with the periods of the current, in a fine-strained wire of high resistance, which, as it periodically expands and contracts under the influence of the varying currents, sets a sound-board with which it is connected in vibration. In others, as in the well-known device of Professor Dolbear, the line-circuit is never closed, but the development of the aerial vibrations depends upon the changes in the electrostatic attraction between two small diaphragms placed in close proximity to each other, well insulated from each other, and connected one with the line-wire and the other with the ground or with a return-wire. In the forms of telephonic receiver which have come into practical use a magnet is wound with a coil near one of its poles, so that the attraction of this pole upon a small soft-iron diaphragm varies with the currents that vibrate through the coil. Any of these devices might no doubt be used to some extent in the carrying out of my invention, particularly the sort last named; but they all produce weak tones. In order to produce powerful tones, I have contrived a special form of vibration-translating device, which consists, essentially, of (a) a good wooden sound-board, well constructed and braced and furnished with a bridge—a sound-board, in short, very similar to the sound-board of a pianoforte; (b) a plurality of soft-iron armatures attached to the bridge; (c) a plurality of soft-iron cores lying each with one pole close to one of the bridge-carried armatures before mentioned; (d) coils magnetizing these cores, so that the necessary field is provided, which coils I sometimes term "sustaining-coils," and (e) coils of fine wire wound around the ends of the soft-iron cores that pull upon the bridge-carried armatures before mentioned. This device, when supplied with the necessary currents, produces tones of great power. The essential features of the construction are illustrated in Fig. 16, which is a sectional elevation.

41 is a sound-board, 42 the bridge, and 43 43 the armatures attached to the bridge.

44 is the bottom, and 45 45 are the sides, of the frame that supports the sound-board 41. $w'$ $w'$ are the soft-iron cores upon the ends of which the coils $w$ $w$, connected with the line-wire W, are wound. Sustaining-coils $w^2$ $w^2$, arranged in series and having a battery $w^3$ in circuit, serve to maintain the magnetism of the cores $w'$ $w'$. The alternate sustaining-coils $w^2$ $w^2$, &c., are oppositely wound, the first, third, &c., being wound in one direction and the second and fourth in the opposite direction, so that the proximate poles of the cores $w'$ $w'$ are always of opposite sign. The alternate coils $w$ $w$ are in like manner oppositely wound. Each of the coils $w$ $w$ has its outer end connected with the line-wire W. The inner end of each of said coils is connected with the core $w'$, upon which it is wound, and through the core $w'$ with the yoke $w^4$, and the several yokes $w^4$ $w^4$ are connected with the buried plates or equivalent ground connection $G^2$. The coils $w$ $w$ might of course be connected with the ground in any other suitable way. In some of the diagrammatic views they are shown otherwise connected. The particular manner of making the ground connection is not essential. A return-wire may be used instead of the ground connection with advantage. The disadvantage is the increased cost.

A few vibration-translating devices only are shown connected with the line-circuit wire W in the drawings; but obviously a much larger number may be connected with it, and obviously the line-circuit may have several branches, each having one or more vibration-translating devices connected with it.

When it is desired to produce a large volume of sound in a large room or hall by means of the apparatus herein described, I consider it better to use a plurality of vibration-translating devices of moderate size than to attempt to secure the whole volume of sound required from one large vibration-translating device.

*Suppressing of sparks at the brushes.*—As the various rheotome-controlled circuits $s'$ $s^2$ $s^3$ $s^4$, &c., are broken by the conducting-sections of the rheotome-cylinders moving away from the brushes $n$ $n$, &c., sparks are produced, which have an injurious effect upon the brushes and rheotome-cylinders. These sparks should be suppressed as far as possible. Several ways of suppressing sparks are known. I have tried a number, some of which serve fairly well and some very imperfectly. The combination, with each set of insulating and conducting sections, of a condenser having one set of plates connected with the brush or brushes belonging to such set of insulating and conducting sections, and having the other set of plates connected electrically with the rheotome-cylinder, and a high-resistance shunt-wire of negligible self-induction also connecting the brushes and the cylinder—in other words, a condenser and a high-resistance shunt across the break—I consider as good as any. The arrangement is illustrated in Fig. 13, in which 51 51 are the condensers and 52 52 the high-resistance shunts of negligible self-induction.

In Figs. 13 and 14 and 18 to 22 I have shown, for the sake of simplicity in illustrating the main principles of the invention, a single primary controlled by each of the rheotomes. A better construction, however, and the one which I have used, is to employ two primaries connected in such a way that the current is admitted into one as it is cut off from the other and circulates through the two coils in opposite directions. The arrangement is illustrated diagrammatically in the detail view, Fig. 11$^E$, in which two primary coils $s$ and $s'$ are connected with the key-controlled conducting-wire $r^7$, leading through the key, (see Fig. 13,) to one pole of the dynamo, whose other pole is connected with the rheotome-cylinder, one of said coils being connected with the brush or brushes $n$, lying on one side of the rheotome-cylinder, and the other coil being connected with the brush or brushes $n$, lying on the other side of said rheotome-cylinder, the two brushes or sets of brushes being arranged in such a manner that when one bears on a conducting-section of the rheotome-cylinder the other bears on an insulating-section thereof, and the connections being made in such a manner that the current circulates in opposite directions in the two coils $s$ and $s'$. The secondary coil S' is disposed in inductive relation to the two primaries $s$ and $s'$. This arrangement gives a much greater current output for the total weight of iron and copper used than the common form of inductorium having a single primary, and I consider it decidedly better for practical use.

A rheotome device is ordinarily so constructed that it interrupts the circuit completely, or at least as nearly completely as possible; but I do not understand that a device to be a rheotome must necessarily interrupt the circuit completely. Not all that I have constructed are of that sort, and I do not use the word "rheotome" in this specification as meaning only or necessarily a device which interrupts the current completely or totally, but simply as one which produces periodic current-vibrations therein by throwing resistance into the circuit and cutting it out of it. A device adapted to do this gradually and without any total interruption of the circuit, consisting, essentially, of conducting-pieces rotating with relation to other conducting-pieces in a vessel filled with a conducting fluid, is illustrated in the before-mentioned pending application, Serial No. 558,939, filed August 10, 1895, and is one sort of rheotome device. I consider the form of device herein illustrated, however, as more serviceable, and only refer here to the other so that it will be understood that by the words "rheotome" or "rheotome device" I refer, broadly, to a device for producing electrical vibrations by periodically throwing resistance into a circuit and cutting it out of it, and do not limit myself to a device in which the circuit is totally interrupted by the action of the rheotome.

Instead of generating the requisite electrical vibrations in the first instance by interrupting electrical circuits we might generate them by vibrating or rotating inductive bodies in the presence of circuits or circuits in the presence of inductive bodies. We might, for example, substitute for each of the rheotome-cylinders (or, indeed, for each of the sets of insulating and conducting sections $p'$ $p^2$ $p^3$, &c., belonging to a rheotome-cylinder) a suitable alternating-current generator so constructed and arranged that it makes a number of current-vibrations in a second equal to the number of vibrations per second of the note for which it stands. One such device is illustrated in one of the drawings of a prior application of mine for Letters Patent for an art of and apparatus for generating and distributing music electrically, filed in the United States Patent Office on August 10, 1895, Serial No. 558,939, and I have designed others. I wish it to be understood, therefore, that alternating-current generators, as above mentioned, might be used in carrying out much of my present invention instead of the arrangement of rheotomes herein described. The important point is the series of coils or circuits with the controlling devices and suitable means, whether rheotomes or alternating-current dynamos, for generating the requisite electrical vibrations in the coils. The arrangement of rheotome devices I consider most convenient and economical, at least for small installations; but in some situations and in some portions, at least, of the compass the arrangement of alternating-current dynamos, as above mentioned, might be used instead. It will be understood, therefore, that while I consider rheotomes the most convenient means of generating the electrical vibrations in the coils they are not the only means that may be used for that purpose in the carrying out of my invention.

I prefer to use rotatory rheotomes; but vibratory rheotomes are well known to electricians, and the better kinds of them might doubtless be used, at least in small installations and in the lower compass, in carrying out my invention, instead of the rotatory rheotomes, which I prefer; and I wish it to be understood that when I speak in the statement of claim of a "rheotome" or "rheotomes" or a "rheotome device" or "rheotome devices" or "rheotome mechanism," without limiting the words in the claim to any particular construction of rheotome, I use such words in the broad sense.

Obviously, instead of rotating the conducting and insulating sections of the rheotome and holding the brushes still we might rotate the brushes and hold the insulating and conducting sections at rest. In either case it would be a rotatory rheotome. I consider it more convenient to rotate the insulating and conducting sections and hold the brushes at rest, and have employed this mode in practice; but I wish it to be understood that I do not limit myself to it, since the reverse mode might be employed.

The principal advantages of my construction of rotatory rheotomes are (a) the goodness of the tones which they give in comparison with those ordinarily given by vibratory rheotomes, my arrangement of rheotome cylinder and brushes being free from the shock and resulting irregular vibrations which not infrequently attend the arresting of the vibrating spring by the fixed contact-screw in a vibratory-rheotome device; (b) the great power of these devices in comparison with a vibratory-rheotome device, which results from the large contact-surfaces of the rotating cylinder and brushes in comparison with the small contact-surface of the vibrating spring and fixed contact-screw of the vibratory rheotome, and (c) the perfect tuning of the rotatory rheotomes, resulting from and inherent in their construction, and (d) less difficulty from sparks and capacity to handle currents of much higher voltage.

The rotatory rheotomes, moving at a high velocity, "shear off" the sparks in a way which is impossible with a vibratory rheotome, and can thus handle easily currents which would establish destructive arcs with a vibratory rheotome. From the causes above mentioned and others it results that a suitable rotatory-rheotome device can handle currents enormously more powerful than can be handled by a vibratory rheotome. This is especially true in the higher part of the compass.

In the drawings I show a set of insulating and conducting sections, as $p'$, for the ground tone, and other sets, as $p^2 p^3$, &c., for the overtones. This construction has important advantages, but it is necessarily somewhat expensive. A different arrangement, which requires but a single set of rheotomes or a single set of rotatory rate-governors (whether these be rheotomes or not) answering to the ground tones for the whole compass of the instrument, and by which the same rheotome or the same rotatory rate-governor that serves for the ground tone of one note serves for the second partial of the note an octave below, for the third partial of the note a twelfth below, for the fourth partial of the note two octaves below, &c., is illustrated and fully described and claimed in the before-mentioned prior application, Serial No. 558,939, filed August 10, 1895. The arrangement is such that each rheotome or each rotatory rate-governor controls a plurality of circuits, one of which serves to give the ground tone of the note for which such rheotome or such rotatory rate-governor stands, another of which serves to give the second partial of the note an octave below, another to give the third partial of the note a twelfth below, another to give the fourth partial of the note two octaves below, &c. This is the general idea of the construction, which being fully described in the before-mentioned application of August 10, 1895, it would be a waste of time to describe at length here. It forms a part of the subject-matter of the prior application above mentioned, and I only refer to it here so that it will be understood that a plurality of rheotomes giving different partials of a tone, or a plurality of rotatory rate-governors (whether these be rheotomes or not) joining different partials of a tone, may be rheotomes or may be rotatory rate-governors each of which serves to give a different ground tone, and so that it will be clearly understood that when in the statement of claim at the end of this specification I speak of a "plurality of rheotomes," or of a "plurality of rheotome devices," or of a "plurality of rotatory rate-governors," serving to give or arranged so that they give different partial tones of a note, or use any other similar language, or any language of similar import, without narrowing it in the claim to the particular construction or arrangement of the rheotomes or of the rotatory rate-governors, I do not limit myself to the arrangement of rheotomes figured in the drawings, in which the rheotome or the rotatory rate-governor that serves to give a particular partial for any note serves for that partial of that note only.

By the construction illustrated in the drawings the difference in pitch of any two notes in the same octave, reckoning the octave from a C to the B above it, is made wholly by the different angular velocities given to the corresponding pitch-shafts. Thus, to illustrate by an example, any rheotome-cylinder standing for a G differs in pitch from the corresponding rheotome standing for the C below it, only because the pitch-shaft $g$ runs almost once and a half as fast as the pitch-shaft $c$. Obviously, however, the rheotomes carried by some of the pitch-shafts, as, for example, the pitch-shaft $g$, might be made with a larger number of insulating and conducting sections than the corresponding rheotome-cylinders carried by other pitch-shafts, as, for example, those carried by the pitch-shaft $c$, so that with smaller difference in the angular velocities of the pitch-shafts the requisite differences in the pitch of the rheotome-cylinders carried by them might be obtained. It is not important which mode is followed.

The rheotome-cylinders 2, 4, 8, 16, 32, 64, and 128, corresponding to different octaves, are illustrated in most of the drawings as of the same size. The views are to a great extent diagrammatic and on account of the multiplicity of the parts figured somewhat cramped, so that it is not practicable to illustrate the sizes of parts. In fact, however, as will be readily understood, the rheotome-cylinders, as 2 4 8, standing for the lower notes and having a small number of insulating and conducting sections only in comparison with the rheotome-cylinders which stand for high notes can be made much smaller than the rheotome-cylinders which stand for high notes. The higher rheotome-cylinders ought in fact to gradually increase in diameter, a fact which appears to some extent in Fig. 7. So, also, those portions of a rheotome-cylinder which stand for overtones, particularly the higher overtones, may be made larger, and, indeed, in the higher notes should, for convenience sake, be made larger than the portions which serve for the ground tone.

In the drawings I illustrate a set of rheotome-cylinders giving the notes of the scale through seven octaves, say from three octaves below middle C to four octaves, lacking one semitone, above it. Very obviously, it is not necessary to the producing of much of the very best music that the series should extend so far up. Organ music, for example, is seldom written above the F or the A two octaves and a fraction above middle C, and the same is true of violin music and of much music written for the pianoforte. On the other hand, organ-pipes are sometimes made to give tones four octaves below middle C. It will be understood, therefore, that instead of making the cylinder marked 16, carried by the pitch-shaft $c$, give middle C, the whole set of pitch-shafts may, if desired, be run so much slower that such cylinder 16, carried by said pitch-shaft $c$, will give the C an octave below middle C, or will give any other lower note desired. All this is obvious.

In the drawings the rheotome-cylinders 2, 4, 8, 16, 32, 64, and 128 are represented, for convenience sake, as having, respectively, two, four, eight, sixteen, thirty-two, sixty-four, and one hundred and twenty-eight conducting-sections (and of course an equal number of insulating-sections) in their ground-tone sets $p'$ $p'$, &c. Giving these numbers of insulating and conducting sections to the ground-tone sets of the different rheotome-cylinders 2, 4, 8, 16, 32, 64, and 128, it becomes necessary to rotate the pitch-shaft $c$, as before stated, with a velocity of about nine hundred and sixty revolutions per minute in order to get middle C from the rheotome-cylinder 16, carried by the pitch-shaft $c$, and the other pitch-shafts would require even higher velocities. At such high speeds the slip of the belts would be liable to be troublesome. Moreover, such high speeds would tend to wear all the parts. Practically, therefore, it will be understood that if it be desired to produce middle C from the rheotome-cylinder 16, carried by the pitch-shaft $c$, then the different rheotome-cylinders before mentioned (marked, respectively, 2, 4, 8, 16, 32, 64, and 128) should, to secure the most satisfactory results, have each a much larger number, as, say, for example, six, eight, or ten times as many, of insulating and conducting sections in their ground-tone sets $p'$ $p'$ than the numbers with which such cylinders are marked in the drawings, so that the pitch-shafts will have much lower angular velocities and the slip of the belts be made as small as possible, or so small, at least, as to be of no consequence. It is not, however, it should be understood, indispensable that the actual slip of any belt be negligible. It is only necessary that the differences in rate of slip of the different belts driving the different pitch-shafts should be practically negligible, for it is the differences in the rate of slip which tend to throw the notes out of tune. The fact that the pitch-shafts always all of them run light makes it easier to avoid trouble from differences in slip than it would be if the shafts carried loads, especially varying loads.

By a "rotatory rate-governor," as the term is used in this specification and in the statement of claim at the end hereof, I mean a rotating body which serves by its rotatory movement to govern the frequency of the vibrations. A rotatory rheotome is one sort of rotatory rate-governor. The armature or other rotating part or parts of an alternating-current generator is another sort of rotatory rate-governor. In each case the frequency of the vibrations produced depends upon and varies with the rapidity of rotation. In the before-mentioned prior application, Serial No. 558,939, filed August 10, 1895, rotatory rate-governors are shown which are in effect alternating-current generators, or rather the armatures thereof.

A feature of some importance in my present invention relates to the arrangement of the rotatory rate-governors in such a manner, as hereinbefore pointed out, that perfect tuning is readily secured and maintained. Thus by placing the sets of insulating and conducting sections $p'$ $p^2$ $p^3$ $p^4$, &c., which correspond to different partials of the same note upon the same shaft I insure that they shall always be in absolutely perfect accordance, even to the phase relations; and so, also, by putting the octaves of a note on the same shaft I insure that the octaves shall be always in absolutely perfect tune. Thus those intervals which most readily betray any want of truth are kept always perfectly true. They have, indeed, a degree of truth which it is not possible to maintain in any pianoforte or organ of the usual sort, and by giving different rate-governors different angular velocities I make it possible to produce the notes perfectly tuned, in equal temperament or in any other temperament, with a moderate number of insulating and conducting sections in each rate-governor; and my whole series of rotatory rate-governors are arranged in such a manner in the preferred construction, it will be observed, that by tuning twelve notes, to wit, one on each pitch-shaft, all the notes of the instrument, ground-tones and overtones alike, are at once brought into the most perfect tune which equal temperament admits. All these features in connection with the arrangement of rheotomes serving as rate-governors are equally applicable to armatures or to any other rotating bodies serving as rate-governors.

*Remarks as to the electrical circuits.*—The purifying of the electrical tones, the combining of them, and the governing of their power so as to give facility for correct musical expression are all important parts of my present invention, each of which may be further explained with advantage.

I purify the electrical tones, it will be remembered, in my preferred form of apparatus by successive inductive transfers, so that the abrupt and harsh electrical vibrations in the rheotome-interrupted circuits become smooth and round before they are communicated to the vibration-translating devices. It is not necessary, however, to use a great number of inductive transfers. A greater or less number may be employed than are made by the apparatus illustrated in Figs. 13 and 14. Each inductive transfer has a tendency to purify the tone transferred and by three or four successive inductive transfers a very harsh tone may be made to be quite round and smooth; but each inductive transfer has the effect of weakening the tone transferred, and for this reason it is not desirable to transfer the vibrations from circuit to circuit a great number of times. The tone-purifying action of the tone-purifying device depends upon the fact that where there is a sensible amount of self-induction in a circuit and a periodic electromotive force, not reducible to a single sine function, producing vibratory currents in such circuit, the self-induction of the circuit producing counter-electromotive force therein causes the vibratory currents therein to approximate more nearly to sine functions than the vibrations of electromotive force do from which the currents result. In other words, the self-induction of the circuit damps down the higher components of the vibrations much more than the fundamental or ground-tone component, and the greater the self-induction of the circuit, other things being equal, the more nearly do the current-vibrations approximate to sine functions—in other words, to pure tones; and when electrical vibrations are transferred by induction from circuit to circuit with each inductive transfer the ground-tone component and the overtone components of the vibrations are weakened different degrees, the overtones, particularly the high overtones, being weakened very much more than the ground-tone if a sufficient self-induction is given to the circuit, so that a few such inductive transfers have the effect of almost completely weeding out the high and disagreeable overtones, while weakening the ground-tone to a very much less extent.

As before said, a multiplicity or even a plurality of successive inductive transfers of the vibrations is not indispensable to the carrying out of important portions of my invention. We can omit, for example, the circuits $S'T'$, $S^2T^2$, &c., and cause the coils $s'$ $s^2$ $s^3$, &c., to act directly on the circuits $t'u'$, $t^2u^2$, &c., as illustrated diagrammatically in Fig. 18, or we may omit also the circuits $t'u'$, $t^2u^2$, &c., and cause the coils $s'$ $s^2$ $s^3$, &c., to act directly upon the coils $U'$ $U^2$ $U^3$, &c., as in Fig. 19; and so far as certain important portions of my invention are concerned not only the circuits $S'T'$, $S^2T^2$, &c., and $t'u'$, $t^2u^2$, &c., can be omitted, but the coils $U'$ $U^2$, &c., may be omitted also, the coil V being placed in circuit with the coils $s'$ $s^2$, &c., as illustrated diagrammatically in Fig. 21, so that whatever current pulses through any of the coils $s'$, $s^2$, $s^3$, $s^4$, $s^5$, or $s^6$ pulses also through the coil V; or, omitting the loudness-controlling device, the wires $s'$, $s^2$, $s^3$, $s^4$, $s^5$, and $s^6$ might be connected directly with the coil $V'$. Such an arrangement, however, would have the disadvantage of throwing less agreeable tones upon the line-wire W. For the same strength of current in the rheotome-interrupted circuits $s'$ $s^2$ $s^3$, &c., the devices of Fig. 21 produce louder sounds, and the devices of Figs. 13 and 18 more musical and agreeable tones.

Figure 22:
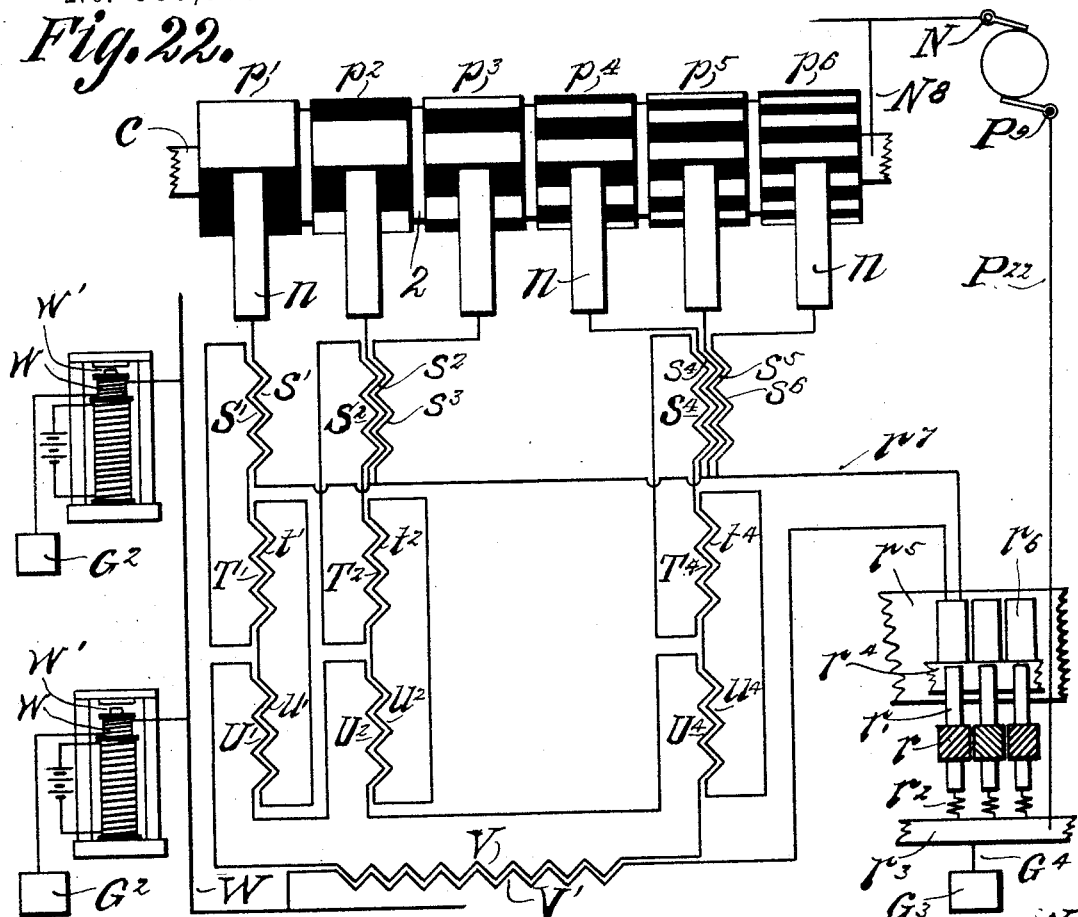
Figure 21:
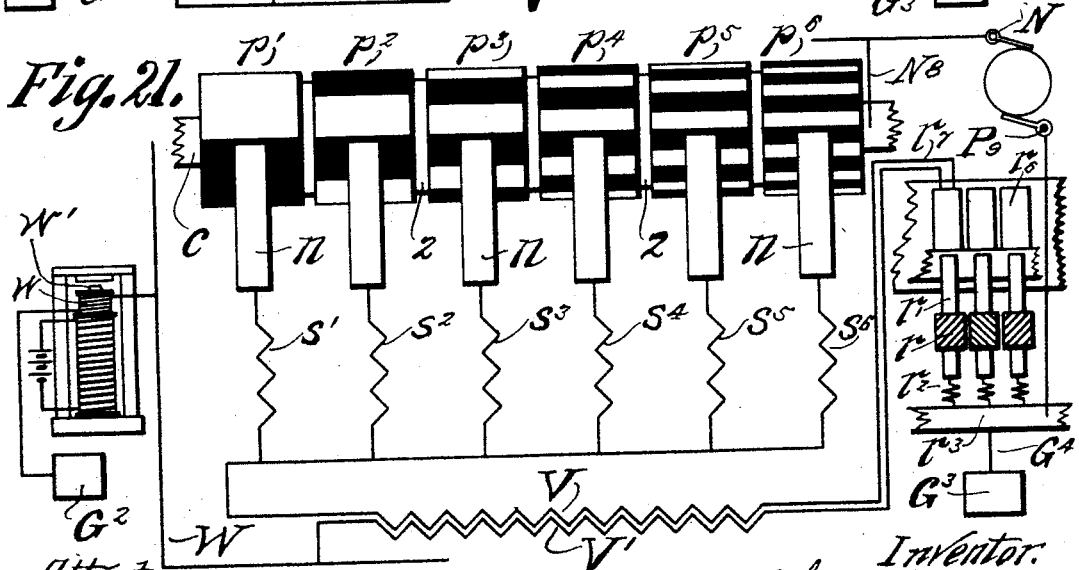

In purifying the tones it is very advantageous to employ different tone-purifying devices for different tones, for it is thus possible to adapt each tone-purifying device electrically in respect of its self-induction, &c., so that it purifies to the best advantage the tone or tones for which it serves. In Figs. 13, 14, 18, and 20 a separate tone-purifying device is illustrated for each separate tone. This I consider the best way; but at the same time it is somewhat expensive. It is not indispensable, however, to have as many tone-purifying devices as there are tones to be purified, nor is it necessary to employ a different tone-purifying device for every different tone. Tones which lie close together in pitch may be purified together and those which lie far apart in pitch may be purified separately, and one tone-purifying device may be made to serve for a plurality of tones and another tone-purifying device for another tone or plurality of tones, the different devices serving for tones of different pitches. A device of this sort is illustrated in Fig. 22, in which the first-partial is purified by itself alone, the second and third partials are purified together, but separate from the other partials, and the fourth, fifth, and sixth partials are purified together, but separate from the lower partials. The circuits $S'T'$ and $t'u'$ in said figure serve to purify the tone first generated in the rheotome-interrupted circuit $s'$, being first-partial vibrations. The circuits $S^2T^2$ and $t^2u^2$ purify the tones generated in the rheotome-interrupted circuits $s^2$ and $s^3$, being the second and third partials, and the circuits $S^4T^4$ and $t^4u^4$ serve to purify the tones generated in the rheotome-interrupted circuits $s^4$, $s^5$, and $s^6$, being the fourth, fifth, and sixth partials. This modification has the advantage of somewhat greater cheapness of construction, but it is less perfect in operation, especially if the same tone-purifying device be used to purify tones which stand far apart in pitch, for when the same tone-purifying device is used for partials or for other tones standing far apart in pitch the device tends to weaken the high tones too much in purifying the low tones sufficiently, or if it does not weaken the high tones it leaves the low tones insufficiently purified.

Obviously with such a modification as that illustrated in Fig. 22, instead of using a plurality of coiled wires $s^2$ and $s^3$ a single primary coil might be used, suitable resistances being interposed between such coil and the two brushes or sets of brushes $n$ $n$, controlling it and corresponding, respectively, with the sets of insulating and conducting sections $p^2$ and $p^3$, and in like manner a single primary coil, with the necessary resistances in the different branch circuits, might be used instead of the coils $s^4$, $s^5$, and $s^6$, Fig. 22.

The vibrations may be communicated from the different coils illustrated in the drawings to the line-circuit and to the vibration-translating devices in other ways than as herein described. I consider the arrangement herein described for communicating vibrations from the coils in which they are generated to the vibration-translating devices as good as any, but I do not limit myself to them. Other ways are known. Several other ways are described in the before-mentioned pending application, Serial No. 558,939, filed August 10, 1895. I shall refer to one or two modifications only out of many possible ones. Instead of connecting the coils $U'$, $U^2$, $U^3$, $U^4$, $U^5$, and $U^6$ in series with each other and with the coil V they may be arranged in parallel with each other and in series with the coil V, as illustrated diagrammatically in Fig. 20, in which case, to secure the best effects, the resistance and inductance of each of the coils $U'$, $U^2$, $U^3$, $U^4$, $U^5$, and $U^6$ should be much greater than that of the coil V. So, also, it will be obvious that, omitting the coil $V'$ and omitting or modifying the vibration-amplitude-governing device, the set of coils $U'$, $U^2$, $U^3$, $U^4$, $U^5$, and $U^6$ may be connected directly with the line, one terminal of such coils being connected, for example, with the contact-piece $r^6$, belonging to the corresponding key, and the other terminal of such coils being connected with the wire W.

An important feature of my invention relates to the generating of the different electrical tones in different closed circuits, each peculiarly adapted to the generating of that tone or those tones for which it stands. I have found that every coil is better adapted to generating tones of some particular pitch than it is to generating tones of a pitch much higher or much lower. A coil will serve well for generating tones several half-tones or even whole tones apart, but it will not serve to so good advantage for tones far apart in the scale. The exception is the case of a coil having a resistance very high in comparison with its self-induction. Such a coil is, however, ill adapted to use in an inductorium, its current output being cut down by the high resistance.

To obtain the best results I do as set forth in the paragraph following, to-wit: Taking the series of rheotome-interrupted circuits $s'$ $s'$ $s'$, answering to the ground-tones of notes, I give the coils in the lower part of the compass such a number of turns of wire and such sizes of laminated iron cores—in other words, such amounts of self-induction—as will for the current used give the maximum effect on the tone-purifying circuits $S'$ $T'$, arranged in inductive relation to said coils $s'$ $s'$, &c. Ascending the scale I decrease with each coil the amount of self-induction given to it, so as to keep the loudness of the tones constant. In ascending the scale I decrease the size of the iron cores. They may, indeed, be wholly omitted, especially in the higher parts of the compass. To each of the closed circuits, as $S'$ $T'$ $t'$ $u'$, used for tone-purifying, I give such an amount of self-induction as will have the effect of suppressing the higher overtones to a much greater extent than the fundamental is suppressed. A fair rule to follow to secure this result is to make the product of the angular velocity of the vibrations of the note for which the coil serves, (to wit, the quantity sometimes designated by electricians as "$\omega$" and sometimes as "$2\pi n$,") multiplied by the effective self-induction of the circuit to which said coil belongs, equal to the resistance of said circuit. It is well known that a circuit constituting the primary of an inductorium and having a given self-induction when no current flows in the secondary acts electrically as if it had a less amount of self-induction when currents flow in its secondary. The currents generated in the secondary have, it is well known, the effect of practically reducing or counteracting the self-induction of the primary circuit. By the term "effective self-induction," as above used, I refer to the net or practical self-induction of the circuit, the influence of neighboring circuits in inductive relation to it and in which currents flow in reducing or counteracting the self-induction of the circuit first mentioned being taken into account; but it is not necessary to follow the rule above given, nor, indeed, any other hard and fast rule, to obtain a substantial tone-purifying effect from tone-purifying devices of the kind illustrated in the drawings. The tone-purifying effect will be heightened, within certain limits, by increasing the effective self-induction with relation to the resistance. It will be heightened also by increasing the number of successive inductive transfers; but the current output is somewhat reduced by these means.

What applies to the sets of circuits $s'$, $S'$

T', t' u', serving for the ground-tones applies in like manner to the sets of circuits, as $s^2$, $S^2$ $T^2$, $t^2$ $u^2$, and $s^3$, $S^3$ $T^3$, $t^3$ $u^3$, &c., serving for the overtones. The lowest members of each set—that is, those serving for the lowest tones—should have the largest amounts of self-induction, and the self-induction should decrease as the pitch of the notes in the ascending scale increases, and the circuits $s'$, S' T', t' u' of the ground-tone set should of course have larger amounts of self-induction than the corresponding circuits of the overtone sets. The same general rule applies to the set of vibration-combining circuits, formed each of a group of coils $U'$, $U^2$, $U^3$, $U^4$, $U^5$, $U^6$, and V. They should be adapted each to the pitch of the note for which it serves. The necessary adjustments are readily made either by winding more or less wire in the various coils to produce the effect desired or by adding to the circuits of the various coils suitable self-inductions. It goes without saying that the coefficients of mutual induction subsisting between the various sets of circuits, which act directly upon each other inductively, as $s'$ and S' T', or S' T' and t' u', or t' u', and the circuit formed of the coils $U'$, $U^2$, $U^3$, $U^4$, $U^5$, $U^6$, and V should be made as large as may be consistent with not decreasing unduly the effective self-induction of the separate circuits; and, further, if iron cores be used they should not only be well laminated, but should also be made to form open-air magnetic circuits or air-return circuits, particularly in the expression devices and the tone-purifying devices, with the principal part of the magnetic reluctance in the air portion of the circuit, for closed-circuit cores tend, as is well known, to deform the vibrations from the sinusoidal form.

Whether the coil V in the device of Fig. 15 be moved or the coil V' is obviously not material. The relative movement of the two, on which the changes in inductive influence depend, is obviously the same whichever one be moved, nor is it indispensable that either one of the coils be moved. The important point with such a device as that of Fig. 15 is that the mutual induction between the vibration-transferring circuit and the vibration-receiving circuit be in some suitable manner varied at the will of the performer. I can produce this effect readily enough without moving a coil. One arrangement of this sort is illustrated in the detail drawing Fig. 17. The coil V and the coil V', both wound on hollow bobbins, are alike fixed. The core 21 lies inside the coil V, but is movable with relation to it. Said core 21 is moved in the manner already fully described a greater or less distance upward, according to the pressure with which the key is depressed. In so moving, the core 21 moves through the coil V up toward and into the coil V', carrying with it the field of the coil V. Thus, without moving either coil, the inductive influence of the one upon the other is varied at will. Such is one of many modifications that may be made.

The apparatus illustrated herein is the first current-regulator expression mechanism or current-regulator expression device, so far as I am aware, ever contrived as an expression device in an electrical musical instrument or electrical music-generating system in which music is synthesized electrically. Other forms of current-regulating devices may doubtless be used instead of it as general equivalents of it; and while the device described, consisting of inductive bodies moved into different positions with relation to each other, according to the loudness of the tones desired, is the best form of current-regulator expression device that I have contrived for the purposes of such an instrument as that herein described I wish it to be distinctly understood that I do not limit myself to it. Several other forms of current-regulator expression device have been invented by me, some of which are fully described in the before-mentioned pending application, filed August 10, 1895, Serial No. 558,939, and others, of which I intend to fully describe in future applications. These various devices and other devices well known to electricians might be used more or less perfectly with the other elements herein described in place of the current-regulator expression device herein described as general equivalents in many of the combinations hereinafter claimed of the current-regulator expression mechanism herein illustrated.

In the drawings I show the line-circuit W connected directly with the coils $w$ $w$ of the vibration-translating devices, and this I consider best, at least under ordinary circumstances, but obviously the electrical vibrations may be communicated or propagated from the line-circuit to the vibration-translating devices otherwise than by a conduction connection between them. They may be communicated or propagated from the line-circuit to the vibration-translating devices by induction, the line-circuit being connected, for example, with the primary of an inductorium whose secondary is connected with the coils $w$ $w$ of the vibration-translating devices.

Having now fully described the best mode and the best apparatus which I contemplate using in carrying out my invention of an electrical pianoforte, I wish it to be distinctly understood that a skilled electrician may vary from what has been illustrated and described in many particulars, while adhering to certain main features of the invention. The essentials of the invention once grasped, the means of carrying them out may be varied within wide limits. For every one or almost every one of the individual parts or subcombinations illustrated in the drawings electrical or mechanical equivalents may be substituted. Many such variations, substitu- tions, and modifications will be found illustrated in the other case before mentioned, Serial No. 558,939, filed August 10, 1895.

I use the terms "common receiver" and "common-receiver vibration-translating device" synonomously in this specification.

By a "common receiver" or a "common-receiver vibration-translating device" I mean a "device capable of translating electrical vibrations of different pitches into audible vibrations." I use the term "common receiver" or "common-receiver vibration-translating device" by way of contradistinction to tuned or monotone receivers, which are capable only of translating each the note to which it is tuned. Various forms of common-receiver vibration-translating devices are known to electricians. All receiving-telephones capable of translating electrical vibrations corresponding to speech into audible speech-vibrations are common receivers, and a device may be a common receiver so far as translating musical electrical vibrations is concerned, though it be not sufficiently sensitive to properly translate speech-vibrations.

In various places in this specification I speak of a "common supply-circuit" in a music-distributing system.

By a "common supply-circuit" I mean a "circuit which serves to supply vibrations to a plurality of vibration-translating devices disposed in different places." The common supply-circuit may be a line connected directly with the vibration-translating devices, as illustrated in the drawings, or it may be, as before pointed out, a circuit connected with the vibration-translating devices only through inductive apparatus.

In various places in this specification, and particularly in the statement of claim at the end hereof, I speak of "feeding-coils forming parallel branches to the common supply-circuit."

By "feeding-coils" I mean "coils which serve to supply or feed vibrations to the common supply-circuit."

In various places in this specification I speak of a "keyboard of pitch-keys."

By a "keyboard of pitch-keys" I mean a "keyboard whose keys serve to control the production of tones of different pitches belonging to a musical scale and to afford facility to the performer to produce a tune by their manipulation." I prefer to use a keyboard like that of a pianoforte, but any suitable form of keyboard whatever may be used.

In this specification I speak sometimes of "electrical vibrations" and sometimes of "electrical undulations." Electrical undulations accompany gradual changes of potential. Electrical pulsations accompany or are produced by violent changes of potential. The rheotomes illustrated in the drawings produce pulsations in the circuits $s'\ s^2\ s^3\ s^4$, &c., and these pulsations produce by induction electrical undulations in the circuits $S'\ T'$, $S^2\ T^2$, $S^3\ T^3$, $S^4\ T^4$, &c.

In this specification I use the word "vibrations" as a broad term, including both pulsations and undulations.

In various places in this specification, and particularly in the statement of claim at the end hereof, I speak of "electrical-vibration circuits" and in others of "electrical-undulation circuits" and in still others of "current-undulation circuits."

By an "electrical-vibration circuit" I mean a "circuit in which electrical vibrations are caused or produced," and by an "electrical-undulation circuit" or a "current-undulation circuit" I mean a "circuit in which electrical undulations are caused or produced."

By a "vibration-generating device," or a "vibration-generator," as the term is used in this specification, I mean a "device serving to produce or cause the production of electrical vibrations," and by an "undulation-generating device," or an "electrical-undulation-generating device," or a "current-undulation-generating device," and other similar terms, as the same are used in this specification, I mean a "device serving to produce or cause the production of electrical undulations," and by an "inductional undulation-generating device," or an "inductional undulation-generator," I mean a "device serving to produce or cause the production of electrical undulations by induction."

What I mean by a "rheotome" and what I mean by a "rotatory rate-governor" has already been explained.

In various places in this specification, and particularly in the statement of claim at the end hereof, I speak of "tone-purifying devices." By a "tone-purifying device" I mean a "device adapted and arranged to alter the wave forms of electrical vibrations, assimilating them more or less to the sine form by eliminating, suppressing, weakening, or excluding in a greater or less degree the higher harmonic components of the vibrations." The device which I have illustrated for this purpose in the drawings, acting to purify the vibrations by inductive transfers, I consider as good as any, but other forms of device known to electricians may doubtless be substituted for that shown in the drawings.

In various places in this specification, and particularly in the statement of claim at the end hereof, I speak of a "set" of parts, as a "set of circuits," a "set of coils," a "set of vibration-generating devices," a "set of rheotomes," a "set of rotatory rate-governors," a "set of composite-tone-generating devices," &c. I do not mean by the word "set" in such phrases to limit myself to the particular number of parts (whether circuits, coils, rheotomes, rate-governors, &c.) shown for each octave or for the whole instrument in the accompanying drawings, but by the word "set" in such phrases I mean a sufficient number to produce, with the other parts of the apparatus, a practical musical effect in generating a tune electrically.

In various places in this specification, and particularly in the statement of claim at the end hereof, I speak of "current-regulator expression mechanism." By "current-regulator expression mechanism" I mean "mechanism serving to govern the expression of a musical composition by regulating an electrical current or currents."

I have shown in the drawings the form of current-regulator expression mechanism which I consider best for an electrical music-generating instrument, assimilated to a pianoforte, but other electrical devices might, as before said, be substituted for that shown in the drawings as general equivalents thereof, in those of the combinations hereinafter claimed, which contain current-regulator expression mechanism as one element of the combination, without being limited to the particular kind of current-regulator expression mechanism illustrated in the drawings. Several such are fully described in connection with the apparatus of the other case before mentioned, No. 558,939, filed August 10, 1895.

In several places in this specification I speak in the same context of a "vibration-emitting circuit" and a "vibration-receiving circuit," forming parts of the expression mechanism. I mean by this language two circuits, one of which gives off vibrations inductively to the other, and the circuit which gives off the vibrations is the vibration-emitting circuit, and the circuit which receives vibrations inductively therefrom is the vibration-receiving circuit.

In many places in the statement of claim at the end hereof I speak in various forms of words of, in effect, "generating or producing simultaneously electrical vibrations or electrical undulations, having frequencies corresponding to different partials or components of the same composite tone," and in other places I speak, in effect, of "vibration-generating devices," or "undulation-generating devices," or "rheotomes," or "rotatory rate-governors," or "circuits," or "coils," or "means," or "devices," whatever the names employed may be, "serving simultaneously, or acting simultaneously, or operating simultaneously to produce vibrations or undulations having frequencies corresponding to different partials or components of the same composite tone." By the word "simultaneously," as thus used, I refer to practical or substantial simultaneousness rather than to mathematical simultaneousness, and in the sense in which I use the word "simultaneously" in the phrases above mentioned and in other similar phrases, undulations, vibrations, partial tones, or components of a tone are produced simultaneously when they are produced so close together in point of time that they appear to the ear to be produced simultaneously, and vibration-generating devices, undulation-generating devices, rheotomes, rotatory rate-governors, circuits, coils, or other parts act simultaneously to produce vibrations, undulations, or tones, or serve simultaneously to produce vibrations, undulations, or tones having frequencies corresponding to different partials or components of the same composite tone when they produce their respective vibrations so close together in point of time that they appear to the ear to be produced at the same time.

In various places in this specification, and particularly in the statement of claim at the end hereof, I speak of a "multiplicity" of parts, as a "multiplicity of circuits," a "multiplicity of electrical-vibration circuits," a "multiplicity of electrical-undulation circuits," a "multiplicity of vibration-generating devices," a "multiplicity of rheotomes, a "multiplicity of rotatory rate-governors," a "multiplicity of coils," &c. By the word "multiplicity" in such and all similar phrases I refer to a "number of parts of the kind mentioned more than a bare plurality," (that is, more than two,) but I do not limit or restrict myself by the word "multiplicity," I wish it to be understood, to a large number of parts. A number of circuits, or of coils, or of vibration-generating devices, or of rheotomes, or of rotatory rate-governors, &c., corresponding to the notes of the diatonic scale through a single octave, would be a "multiplicity" in the sense in which I use the word in this specification, and even a smaller number of parts, being more than a bare plurality, and being sufficient with the other parts of the apparatus to produce a practical musical effect in generating a tune electrically, would be a "multiplicity," in the sense in which I use that word in this specification.

In various places in this specification, and particularly in the statement of claim at the end hereof, I speak of "different rotatory rate-governors being rotated with different angular velocities," or of "different rate-governors having different angular velocities," or of "driving mechanism," "whereby different rate-governors are given different angular velocities." By such phrases and similar expressions, I wish it to be distinctly understood, I do not limit myself to giving to every different rate-governor a different angular velocity. An inspection of the drawings, indeed, will make this point clear. Four hundred and thirty-two rate-governors are shown in the drawings, which are driven at twelve different angular velocities, thirty-six rate-governors being driven at each of these twelve speeds; but so many as twelve different angular velocities are by no means indispensable. A much smaller number may in fact be used. The essential point is to employ different angular velocities, so as to obtain by the combination of the different angular velocities with the number of vibrations produced to a revolution by the different rate-governors the proper pitch for each note instead of attempting to produce the necessary differences in pitch wholly by the different numbers of insulating and conducting sections given to the different rheotomes, all revolved at the same angular velocity, as has been attempted heretofore in sostenuto devices. So when I speak in the statement of claim of "different tone-purifying devices, serving for the purifying of tones of different pitches," or of "different tone-purifying devices, serving for the purifying of different partial tones," or use other similar expressions or expressions of similar import, I do not mean to restrict or limit myself, I wish it to be understood, to a construction in which there is a different tone-purifying device for every different note, for, as has already been made clear, that is not necessary. The main point is to purify each tone by a device electrically adapted to purify such tone properly, and as tones differing widely in pitch require different adjustments of the tone-purifying devices to produce the proper effects of purification upon them it becomes important to use different devices for tones standing far apart in pitch, but tones lying close together in pitch can be purified by the same device. On the other hand, when in the statement of claim I speak of "separate tone-purifying devices for the separate notes" I mean, as the use of the article naturally indicates, a "different tone-purifying device for each different note."

In various places in this specification I speak of "a plurality of circuits corresponding to different partials of the same composite tone," and of "a plurality of circuits corresponding, respectively, to different partials of the same composite tone," and of "a plurality of coils corresponding, respectively, to different partials of the same composite tone," and of "producing (or producing by induction) in different circuits (or in different closed circuits) or in different coils electrical vibrations or electrical undulations corresponding to different partials or to different partial tones or to different partials of the same composite tone."

By the above expressions and all similar expressions, I wish it to be understood, I do not limit myself to employing a separate circuit or a separate coil for each different partial tone, for a plurality of circuits or of coils may be used, serving each for a different partial or for different partials, and a plurality of partials may be produced in one or more of the coils or of the circuits which serve for different partials, as illustrated, for example, in Fig. 22, in which, of the three different circuits $S' T'$, $S^2 T^2$, and $S^4 T^4$, which serve for different partial tones, the circuit $S' T'$ serves for the first partial vibration-generator only, while the circuit $S^2 T^2$ serves for the second and third partials, and the circuit $S^4 T^4$ serves for the fourth, fifth, and sixth partials. The three circuits, however, it will be observed, serve for and correspond to different partials, and different partials are produced in the different circuits.

In various places in this specification I speak of a "plurality of circuits," or of a "multiplicity of circuits," or of "producing different vibrations in different circuits." In the sense in which I use the language in this specification and in the statement of claim at the end hereof circuits are different which have a common return portion, or a common conducting portion, as well as those which have no portion in common. Thus, to illustrate what I mean, the rheotome-interrupted circuits $s'$, $s^2$, $s^3$, $s^4$, $s^5$, and $s^6$, serving for a note, (see, for example, Fig. 13,) are distinct and different circuits, although they have certain portions in common, and the coils $U'$, $U^2$, $U^3$, $U^4$, $U^5$, and $U^6$ in Fig. 20 constitute distinct and different circuits in the sense in which I use the language in this specification, although their currents have a common return-path through the coil V as much as the circuits $t' u'$, $t^2 u^2$, $t^3 u^3$, &c., which have no common return nor any other part in common. The chief benefits resulting from producing different tones in different circuits are, (a) that it thus becomes possible to adjust the different circuits electrically to the pitch of the tone or tones for which each circuit serves; (b) much better facilities are afforded for building up composite vibrations, and (c) with different circuits for different tones we can, by acting upon the different circuits separately, govern the tones produced in each circuit independently, and thus produce any ensemble of tones desired. All these advantages belong as well to the arrangement in which the different circuits have a common return or other conducting portion in common as to one in which each circuit is entirely unconnected with the others.

In various places in this specification I speak of "different" rate-governors having or being given different angular velocities; of "different" tone-purifying devices serving for different tones; of producing "different" tones in different circuits, &c. By the adjective "different" in such and similar phrases I mean to refer to being distinct, to not being the same, and I do not mean to imply dissimilarity. Thus in the drawings the different pitch-shafts which have with their rotatory rate-governors different angular velocities are preferably made to be exactly alike. They are only different, as illustrated in the drawings, by reason of being distinct, separate, not the same, though, of course, they might well be made dissimilar also. In like manner the different circuits in which different tones are produced may either be similar or dissimilar, but the difference which I refer to by the word "different" applied in the claims to such circuits is that difference which results from being distinct, from not being the same. So with the different tone-purifying devices. These may be similar or they may be dissimilar, but so long as they are distinct and not the same they are "different" in the sense in which I use the word.

By a "composite tone," as the term is used in this specification and in the statement of claim at the end hereof, I mean a "sound consisting of a plurality of partials," together constituting what musicians consider and designate as a "note" in contradistinction to a chord. A note is a simple note when its vibrations constitute a single sinusoidal series. It is a composite tone or a composite note when its vibrations consist, in effect, of a plurality of sinusoidal series bearing certain simple mathematical relations to each other. By a "partial," or a "partial tone," or a "tone-partial"—all which forms of expression are used synonomously in this specification—I understand to be meant in strictness a pure tone, (a tone, that is, corresponding to a single series of sinusoidal vibrations,) forming one of the constituents or elements of a composite tone—a tone element, in short, not capable of being reduced into simpler constituents. The terms "component tone" and "tone-component" or "component of a tone," on the other hand, (all of which I use synonomously,) in this specification, and particularly in the statement of claim at the end hereof, I use in a broader and looser sense as signifying any portion of a composite tone less than the whole. Thus a component of a composite tone may be either a single partial, such as is produced in the circuit $t'\, u'$, Fig. 22, or it may consist of two partials produced together, as, for example, in the circuit $t^2\, u^2$, Fig. 22, in which, it will be remembered, both the second and third partials are produced together; or it may consist of a greater number of partials produced in the same circuit, as, for example, in the circuit $t^4\, u^4$, Fig. 22, in which, it will be remembered, the fourth, fifth, and sixth partials are all produced together. A component of a composite tone, in short, may be anything less than the whole composite tone. It may be either a single partial or a plurality of partials.

In various places in this specification, and particularly in the statement of claim at the end hereof, I speak of a "composite tone" and a "composite sound," of a "component tone" and a "component sound."

By a "composite tone," as before said, I mean a "tone consisting of different partials," together constituting a single note; but "composite sound" is a broader term and refers alike to (a) a composite tone, in the sense above defined, (b) a chord or discord composed of elemental or non-composite notes, and (c) a chord or discord formed in whole or in part of composite notes. A component tone is one of the parts, constituents, components, or ingredients of a composite tone and may be any portion, as before said, of such composite tone less than the whole; but it is always a portion only of the composite tone of which it forms a part, a portion only, that is to say, (or something less than,) a single composite musical note. A component sound, on the other hand, is one of the parts or components of a composite sound and may be either (a) a composite tone, not being a chord, or (b) a chord or a discord, consisting either of composite or of non-composite notes.

In various places in this specification, and particularly in the statement of claim at the end hereof, I speak of "producing different series of vibrations or undulations in different circuits." The series of vibrations thus produced may be either simple or composite. In fact, the preferred device illustrated in the drawings produces harsh complex vibrations in the circuits $s'\, s^2\, s^3$, &c. It produces simple, or approximately simple, vibrations in the circuits $t'\, u'$, $t^2\, u^2$, $t^3\, u^3$, &c., and it produces composite vibrations in other closed circuits, such as those formed by the sets of coils $U'$, $U^2$, $U^3$, $U^4$, $U^5$, $U^6$, and $V$ or by the coils $V'\, V'$.

In various places in this specification, and particularly in the statement of claim at the end hereof, I speak, in effect, of "vibration-generators," or "vibration-generating devices," or "inductional undulation-generators," or "inductional undulation-generating devices," or "rotatory rate-governors," or "rheotomes," or "circuits," or "coils," or other similar parts adapted to produce the notes of a musical scale, or serving or acting or operating to produce the notes of a musical scale, or serving or acting or operating to produce electrical vibrations or undulations answering or corresponding to the notes of a musical scale. By such and all similar expressions I wish it to be very clearly understood I do not at all limit or restrict myself to a construction in which there is a different vibration-generating device or rheotome or rotatory rate-governor—whatever the thing named may be—for every different note of the scale, for, in fact, while it is very convenient to have a separate vibration-generating device for every different note, that is not at all indispensable, for one vibration-generator might obviously be made to serve, at least in the lowest part of the compass, for a plurality of notes; but where, on the other hand, I speak, as in many places I do in the statement of claim, of vibration-generating devices, or undulation-generating devices, or rotatory rate-governors, or rheotomes "corresponding to the notes of a musical scale," or having vibration frequencies "corresponding to the notes of a musical scale," I mean to refer to a construction or organization in which there is a different vibration-generating device, rheotome, rotatory rate-governor, or whatever the term used may be, for each different note of said musical scale. That is the construction illustrated in the drawings, and the one which I prefer.

In various places in the specification, and particularly in the statement of claim at the end hereof, I speak of a "key," or of "keys," or of "note-controllers," bringing vibration-generating devices, or undulation-generating devices, or circuits, or coils, or rheotomes, or rate-governors, or other similar parts into action or into operation upon the line or upon the vibration-translating apparatus.

I wish it to be understood that when I thus speak of "vibration-generating devices," "circuits," "coils," "rheotomes," "rate-governors," or other similar parts being brought into action or operation upon the line or upon the vibration-translating apparatus or devices I do not restrict, limit, or confine myself to a construction or arrangement in which the vibration-generating devices, circuits, coils, rheotomes, rotatory rate-governors, or other parts spoken of as being brought into action upon the line or the vibration-translating devices or apparatus are themselves directly acted upon in order thus to bring them into action upon the line, for it is not necessary that they be directly acted upon in order to bring them into action upon the line or the vibration-translating apparatus or devices. Thus, for example, in the drawings (see Figs. 13 and 15) the various parts belonging to a tone-synthesizing device (such as the rheotomes $p'$, $p^2$, $p^3$, $p^4$, $p^5$, and $p^6$, rheotome-interrupted circuits $s'$ $s^2$ $s^3$, &c., tone-purifying circuits $S'$ $T'$, $S^2$ $T^2$, $S^3$ $T^3$, &c., and $t'$ $u'$, $t^2$ $u^2$, $t^3$ $u^3$, &c., with the vibration-combining and vibration-emitting circuit formed of coils $U'$, $U^2$, $U^3$, $U^4$, $U^5$, $U^6$, and V and the vibration-receiving circuit $V'$) are brought into action upon the line and the vibration-translating devices in three different ways, any one of which would be of itself sufficient for producing a practical musical effect, although the three together make a more perfect, satisfactory, and enduring instrument. Thus, (a) the key $r$, by closing the circuits of the coils $s'$ $s^2$ $s^3$, &c., causes electrical pulsations to be produced in such coils, which in turn cause electrical undulations to be produced in the other circuits, as $S'$ $T'$, $S^2$ $T^2$, $t'$ $u'$, $t^2$ $u^2$, $U'$ $U^2$, $V'$ and the line W; and if the key were omitted from the circuit of the coil $V'$ and said circuit normally closed, as obviously it might readily be, the action of the key $r$, in closing the rheotome-interrupted circuits $s'$ $s^2$ $s^3$, &c., would be alone sufficient to bring all the various parts of the composite-tone-generating device into action upon the line and the vibration-translating devices. (b) On the other hand, we might retain the key $r$ in the circuit of the coil $V'$ and omit the key from the circuits $s'$ $s^2$ $s^3$, &c., leaving such last-mentioned circuits normally closed, in which case the closing of the circuit of the coil $V'$ would be of itself alone sufficient to bring the rheotome-interrupted circuits $s'$ $s^2$ $s^3$, &c., and all the other parts of the tone-synthesizing device into action upon the line—a construction which is in substance used in the apparatus of the other case before mentioned, Serial No. 558,939, filed August 10, 1895. (c) The mechanical action illustrated in Fig. 15 brings the vibration-emitting coil V (which we may well suppose, for the purpose of the present explanation, to lie normally so far remote from the vibration-receiving coil $V'$ that the influence of the one upon the other is negligible) into intimate inductive relation to the vibration-receiving coil V, so that if the rheotome-interrupted circuits $s'$ $s^2$ $s^3$, &c., and the circuit of the coil $V'$ were made to be normally closed the key-controlled movement of the coil V with relation to the coil $V'$ would be of itself sufficient to bring the various parts of the note-synthesizing device into action or operation upon the line and the vibration-translating devices. Practically, however, in such an instrument as that illustrated in the drawings of the present case it is very advantageous to employ all of these three methods. (a) It is advantageous to have the rheotome-interrupted circuits $s'$ $s^2$ $s^3$, &c., normally open, closing them only when their note is required, for thereby waste of current is avoided and the destructive action of the sparks upon the brushes corresponding to a note is avoided at all times except when such note is actually sounding. (b) It is also very advantageous to keep the circuits of the coils $V'$ $V'$ $V'$, &c., corresponding to different notes normally open, closing each only when its note is sounded, for thereby waste and dissipation of the current sent to line through the idle coils $V'$ $V'$ $V'$, (that is, the coils $V'$ $V'$, whose notes are not sounding,) forming parallel or shunt circuits to the line, are avoided; and (c) it is advantageous to vary the induction between the coils V and $V'$, in order to govern the expression thereby; but while the construction shown is that which I consider most advantageous for a practical music-generating apparatus, assimilated to a pianoforte, I wish it to be very clearly understood that so far as the meaning of the terms before mentioned is concerned, which refer to the bringing of the circuits, coils, vibration-generating devices, rotatory rate-governors, rheotomes, &c., into action or operation upon the line or the vibration-translating apparatus, and all similar expressions I do not at all limit or restrict myself to the particular construction shown in the drawings for bringing such parts into action upon the line and vibration-translating devices, for other constructions well known to electricians might be used instead of them.

In various places in this specification, and particularly in the statement of claim at the end hereof, I speak of a "note-controlling device, extra the line." By a "note-controlling device, extra the line," I mean a note-controlling device outside of (that is to say, not inserted in) the main line. Thus in the drawings the key $r$, considered as a note-controlling device, inserted in the circuits $s'$, $s^2$, $s^3$, $s^4$, $s^5$, and $s^6$, is extra the line; and in like manner said key $r$, considered as a key closing the circuit of the coil $V'$, which forms one of the branches of the line W, supplying vibrations thereto, is "extra the line" in the sense in which I use the words in this specification and in the statement of claim at the end hereof. An important advantage resulting from placing the different keys or other note-controlling devices extra the line is that each note-controlling device is then able to work independently of the others, and to throw its note upon the line and to shut it off from the line without rendering the line incapable of transmitting the notes controlled by other note-controlling devices; and when I speak in this specification, and particularly in the statement of claim at the end hereof, of "current-regulator expression mechanism, extra the line" I mean current-regulator expression mechanism which is outside of (that is to say, not inserted in) the main line. Thus in the drawings the expression device, including the two coils V and V', acting inductively upon each other, is "extra the line" in the sense in which I use the words in this specification in the statement of claims at the end hereof.

Important advantages resulting from placing the expression devices, extra the line, are (a) that the different expression devices, if a plurality of expression devices be employed, can thus be made to act independently of one another to produce their different tones with different degrees of power, and (b) that the electrical condition of the line, (whether a single expression device or a plurality of expression devices be employed,) considered with relation to its electrical characteristics, such as the coefficients of resistance, self-induction, and capacity, is undisturbed by the operations of the expression mechanism.

In various places in this specification, and particularly in the statement of claim at the end hereof, I speak in effect of "current-regulator expression mechanism operating inductively to govern the loudness of sounds given off by the vibration-translating apparatus." By this language and other language of the same general import I refer to expression mechanism acting to govern the loudness of sounds given off by the common receivers by varying or regulating the strength of the electrical vibrations employed in producing sound and which expression mechanism includes vibration-emitting and vibration-receiving circuits and means operating to vary the inductive relation subsisting therebetween.

In various places in this specification, and particularly in the statement of claim at the end hereof, I speak in effect of a "plurality of vibration-generating devices or undulation-generating devices, or rheotomes or rotatory rate-governors having vibration frequencies corresponding to different partials of the same composite tone, serving or acting or operating simultaneously to produce a composite tone or a composite note," or I speak of "vibration-generating devices, rheotomes, rotatory rate-governors, &c., serving or operating or acting simultaneously to produce vibrations having frequencies corresponding to different partials of the same composite tone or of the same composite note." What I mean by the word "simultaneously" as thus used has already been made clear, and, further, I wish it to be understood that I do not by the terms above mentioned and other similar expressions limit or restrict myself to a construction in which the different parts mentioned as serving or acting or operating simultaneously to produce electrical vibrations having frequencies corresponding to different partials of the same composite tone act always all of them together when any of them acts, but only to the parts corresponding to different partials of the same composite tone which act, as distinguished from those which remain idle or inactive, acting simultaneously to produce a composite tone, for that is all that is necessary to the carrying out of my invention, for it would be possible to arrange the parts in such a manner that the sets of coils, circuits, rotatory rate-governors, rheotomes, or other vibration-translating devices corresponding to certain partials would be at times entirely out of action, some of the partials being used and others being omitted, and in fact such a construction is fully illustrated and described in the other application before mentioned, Serial No. 558,939, filed August 10, 1895, in which the broad features of my invention are illustrated as applied to the special purpose of generating organ music.

I use the terms "note-controller" and "note-controlling device" in this specification and in the statement of claim at the end hereof synonymously. The arrangement of note-controlling devices illustrated, consisting of the keys r r with the circuit-controlling devices connected with them, is a convenient one and is as good as any that I am aware of; but it is only one out of several forms of note-controlling devices that may be used, and I wish it to be very distinctly understood that I do not at all limit myself to the particular form of note-controlling devices illustrated in the drawings, for they may be modified within wide limits and other forms of note-controlling device may be substituted for them.

In various places in the statement of claim I speak of "rheotomes," and in others of "rotatory rate-governors," and in still others of "vibration-generators" or "vibration-generating devices" or "undulation-generating devices."

By a "rheotome," as has already been made clear, I mean a device which serves to produce electrical vibrations by affecting the resistance of a circuit periodically, throwing in and cutting out resistance alternately. "Rotatory rate-governor" is in one aspect a narrower term than "rheotome," for a rotatory rate-governor must have a rotatory movement, while a rheotome may be either vibratory or rotatory; but "rotatory rate-governor" is a broader term than "rheotome," in that it refers as well to a rotatory body acting to produce periodic currents wholly by induction (such as the armature of an alternating-current dynamo or the special form of such device described in the other application before mentioned, Serial No. 558,939, and before referred to) as to one which produces its currents in the first instance by current interrupting. "Vibration-generating device" is a still broader term. It is indeed *nomen generalissimum*, referring alike to rheotomes, both rotatory and vibratory, and to rotatory rate-governors, whether of the current-interrupting or the induction-generating sort, and to all other devices acting to produce electrical vibrations periodically. "Undulation-generating device" is likewise a broad term, referring alike to the various sorts of devices which operate to produce electrical undulations periodically.

In various places in this specification, and particularly in the statement of claim at the end hereof, I speak of "translating composite electrical vibrations or composite electrical undulations into aerial vibrations of similar wave form."

What I mean to refer to by the language above recited and other similar expressions is a process of translating in which the wave form of the electrical vibrations controls or affects the wave form of the aerial vibrations—a process of translating in which the electrical vibrations produce aerial vibrations of similar timbre—as distinguished from those processes of translating by monotone-receivers in which the pitch of the electrical vibrations only is reproduced, the timbre of the sound communicated to the ear being that of the translating device itself unaffected by the timbre or the wave form of the electrical vibrations operating it; but very obviously the aerial vibrations, having wave forms similar to the wave forms of a given composite electrical tone, may coexist with or be superposed upon other aerial vibrations corresponding to other composite tones, the two sets or the plurality of sets of composite electrical vibrations corresponding to different composite tones together producing resultant aerial vibrations having as components aerial vibrations corresponding to the different sets of composite electrical vibrations translated. Thus, for example, I speak in some places of "producing a composite tone in some specified manner electrically" and then of "translating the composite electrical undulations into aerial vibrations of similar wave form." Such composite electrical vibrations or undulations corresponding to a composite tone may be translated by themselves alone, or they may be combined with other electrical vibrations before they are translated into aerial vibrations, and when translated into aerial vibrations they may coexist as aerial vibrations along with other sets of aerial vibrations corresponding to other composite tones; and yet so long as the essential characteristics of the electrical vibrations first mentioned are reproduced by the aerial vibrations the electrical vibrations will be translated into aerial vibrations of similar wave form in the sense in which I use that language in this specification. To further illustrate: When but one composite tone is produced, the aerial vibrations given by the common receivers correspond closely in wave form, in whatever way considered, with the composite electrical vibrations corresponding to the one composite tone produced; but when two composite tones are produced simultaneously, or a chord of composite tones, though the process is exactly the same, the aerial vibrations produced are resultants of the vibrations corresponding to the different composite notes sounding; but these resultant vibrations, corresponding to a plurality of simultaneously-sounded composite notes, contain as components the separate vibrations belonging to each composite note individually; and when two or three or a greater number of composite notes are thus simultaneously produced electrically and translated into audible aerial vibrations in the manner hereinbefore described each composite electrical tone is translated into aerial vibrations of similar wave form practically and to all intents and purposes so far as the ear can discern, and in the sense in which I use the language in this specification, just as truly as when a composite note is produced and translated by itself alone.

My invention embraces different parts, devices, and subcombinations, some or all of which may be used individually in a complete whole other than or different from the complete whole of the apparatus herein described. I desire full protection for every part of my invention and wish it to be distinctly understood that I have no desire or intention to dedicate or abandon any part of it to the public.

What I claim as my invention, and desire to secure by Letters Patent, is—

1. In an electrical music-generating system, the method of producing composite musical sounds electrically, which consists in ($a$) producing by induction, in different closed circuits, electric-current undulations corresponding to different component sounds of the composite musical sound desired; ($b$) synthesizing in a conductor resultant undulations out of the undulations produced, as above mentioned, in a plurality of closed circuits; and ($c$) translating the built-up electrical undulations into composite aerial vibrations of similar wave form.

2. In an electrical music-generating system, the method of producing composite musical sounds electrically, which consists in ($a$) producing by induction, in different circuits, electric undulations corresponding to different component sounds of the composite musical sound desired; ($b$) producing in a conductor resultant undulations out of the undulations produced, as above mentioned, in a plurality of circuits; and (c) translating the built-up electrical undulations into composite aerial vibrations of similar wave form.

3. In an electrical music-generating system, the method of producing composite musical sounds electrically, which consists in (a) producing, by induction, in different closed circuits, electric-current undulations, corresponding to different component sounds of the composite musical sound desired; (b) transferring undulations from such circuits by induction to a vibration-combining circuit, so that resultant electrical undulations, answering to the composite musical sound required, are produced in the vibration-combining circuit; and (c) translating the composite electrical undulations into aerial vibrations of similar wave form.

4. In an electrical music-generating system, the method of producing composite musical sounds electrically, which consists in (a) producing, by induction, in different circuits, electric undulations corresponding to different component sounds of the composite musical sound desired; (b) transferring undulations from such circuits by induction to a vibration-combining circuit, so that electrical undulations, answering to the composite musical sound required, are produced in the vibration-combining circuit; and (c) translating the composite electrical undulations into aerial vibrations of similar wave form.

5. The method of producing music electrically, which consists in (a) producing, in different circuits, different series of electrical vibrations, of frequencies corresponding to different tones; (b) purifying different series of vibrations separately and simultaneously; (c) synthesizing resultant electrical vibrations, corresponding to composite musical sounds, out of the separately-purified electrical vibrations above mentioned; and (d) translating the composite electrical vibrations into aerial vibrations of similar wave form.

6. The method of producing music electrically, which consists in (a) producing, in different circuits, different series of electric-current vibrations, of frequencies corresponding to different tones; (b) purifying different series of vibrations separately and simultaneously, by successive inductive transfers; (c) synthesizing resultant electrical vibrations, corresponding to composite musical sounds, out of the separately-purified electrical vibrations above mentioned; and (d) translating the composite electrical vibrations into aerial vibrations of similar wave form.

7. In an electrical music-generating system, the method of producing a composite musical tone electrically, which consists in (a) producing by induction, in different closed circuits, electric-current undulations corresponding in periodicity to different components of the composite tone required; (b) synthesizing in a conductor resultant electrical undulations, corresponding to the composite tone required, out of the undulations produced in the closed circuits before mentioned; and (c) translating the built-up electrical undulations into composite aerial vibrations, of similar wave form.

8. In an electrical music-generating system, the method of producing a composite musical tone electrically, which consists in (a) producing by induction, in different circuits, electric undulations corresponding in periodicity to different components of the composite tone required; (b) producing in a conductor resultant electrical undulations, corresponding to the composite tone required, out of the undulations produced in the circuits before mentioned; and (c) translating the built-up electrical undulations into composite aerial vibrations, of similar wave form.

9. In an electrical music-generating system, the method of producing a composite musical tone electrically, which consists in (a) producing by induction, in different closed circuits, electric-current undulations, corresponding in periodicity to different components of the composite tone required; (b) transferring undulations by induction from the circuits before mentioned to a vibration-combining circuit, so that resultant electrical undulations, corresponding to the composite tone required, are produced in the vibration-combining circuit; and (c) translating the composite electrical undulations thus produced into aerial vibrations of similar wave form.

10. In an electrical music-generating system, the method of producing a composite musical tone electrically, which consists in (a) producing by induction, in different circuits, electric undulations, corresponding in periodicity to different components of the composite tone required; (b) transferring undulations by induction from the circuits before mentioned to a vibration-combining circuit, so that resultant electrical undulations, corresponding to the composite tone required, are produced in the vibration-combining circuit; and (c) translating the composite electrical undulations thus produced into aerial vibrations of similar wave form.

11. In an electrical music-generating system, the method of producing a composite musical tone electrically, which consists in (a) producing, in different circuits, different series of electrical vibrations, of frequencies corresponding to different components of the composite tone desired; (b) purifying different series of vibrations separately and simultaneously; and (c) translating the purified electrical vibrations into audible aerial vibrations.

12. In an electrical music-generating system, the method of producing a composite musical tone electrically, which consists in (a) producing, in different circuits, different series of electrical vibrations, of frequencies corresponding to different components of the composite tone desired; (b) purifying different series of vibrations separately and simultaneously; (c) synthesizing resultant electrical vibrations, corresponding to the composite musical tone required, out of the separately-purified electrical vibrations above mentioned; and (d) translating the resultant electrical vibrations into aerial vibrations of similar wave form.

13. In an electrical music-generating system, the method of producing a composite musical tone electrically, which consists in (a) producing, in different circuits, different series of electrical vibrations, of frequencies corresponding to different components of the composite tone desired; (b) purifying different series of vibrations separately and simultaneously, by successive inductive transfers; (c) synthesizing resultant electrical vibrations out of the separately-purified electrical vibrations above mentioned; and (d) translating the resultant electrical vibrations into aerial vibrations of similar wave form.

14. The method of producing a musical composition electrically, which consists in (a) producing by induction, in different closed circuits, different series of electrical vibrations, corresponding in frequencies to the ground tones of different notes of the musical composition desired; (b) producing, also, at the same time, by induction, in other closed circuits, other series of electrical vibrations corresponding in frequencies to overtones of the ground tones before mentioned; and (c) producing, by means of the electrical vibrations aforesaid, audible aerial vibrations.

15. The method of producing a musical composition electrically, which consists in (a) producing by induction, in different circuits, different series of electrical vibrations, corresponding in frequencies to the ground tones of different tones of the musical composition desired; (b) producing, also, at the same time, by induction, in other circuits, other series of electrical vibrations corresponding in frequencies to overtones of the ground tones before mentioned; and (c) producing, by means of the electrical undulations aforesaid, audible aerial vibrations.

16. The method of producing a musical composition electrically, which consists in (a) producing, in different circuits, different series of electrical vibrations, corresponding in frequencies to ground tones of different notes of the musical composition desired; (b) producing, also, at the same time, in other circuits, other series of electrical vibrations, corresponding in frequencies to overtones of the ground tones before mentioned; (c) purifying different series of vibrations separately; and (d) producing from the purified electrical vibrations above mentioned audible aerial vibrations.

17. The method of producing a musical composition electrically, with composite tones, which consists in (a) producing by induction, in different closed circuits, different series of electrical undulations, corresponding to the ground tones of different notes of a musical composition; (b) producing, at the same time, by coöperating devices, and by induction, in other closed circuits, other series of electrical undulations, corresponding to overtones of the ground tones before mentioned; (c) synthesizing composite electrical undulations out of the ground-tone undulations and the overtone undulations before mentioned; and (d) translating the composite electrical undulations thus produced into aerial vibrations of similar wave form.

18. The method of producing a musical composition electrically, with composite tones, which consists in (a) producing by induction, in different circuits, different series of electrical undulations, corresponding to the ground tones of different notes of a musical composition; (b) producing, at the same time, by coöperating devices, and by induction, in other circuits, other series of electrical undulations, corresponding to overtones of the ground tones before mentioned; (c) producing composite electrical undulations out of the ground-tone undulations and the overtone undulations before mentioned; and (d) translating the composite electrical undulations thus produced into aerial vibrations of similar wave form.

19. The method of producing a musical composition electrically, with composite tones, which consists in (a) producing, in different circuits, different series of electrical vibrations, corresponding to the ground tones of different notes of a musical composition; (b) producing, also, at the same time, in other circuits, other series of electrical vibrations, corresponding to overtones of the ground tones before mentioned; (c) purifying different series of the vibrations before mentioned separately; (d) synthesizing composite electrical vibrations out of the ground-tone vibrations and the overtone vibrations before mentioned; and (e) translating the composite electrical vibrations into aerial vibrations of similar wave form.

20. The method of producing a musical composition electrically, with composite tones, which consists in (a) synthesizing, in different circuits, composite electrical vibrations corresponding to composite musical notes of different pitches; (b) transferring the composite electrical vibrations above mentioned as corresponding to notes of different pitches, from the circuits above mentioned, by induction, to a vibration-combining circuit, so that composite electrical vibrations, corresponding to chords of composite notes, are produced in said vibration-combining circuit; and (c) translating the composite electrical vibrations last above mentioned into aerial vibrations of similar wave form.

21. The method of producing a musical composition electrically, with composite tones, which consists in (a) synthesizing, by induction, in different coils, composite electrical vibrations corresponding to different notes;

(b) synthesizing out of the composite electrical vibrations, corresponding to notes, in a plurality of the coils before mentioned, composite electrical vibrations corresponding to chords of composite notes; and (c) translating the composite vibrations thus produced into composite aerial vibrations of similar wave forms.

22. In an electrical music-generating system, the method of producing notes of a musical composition with expression, which consists in (a) producing, in different circuits, electrical vibrations corresponding to different tones; (b) synthesizing out of the vibrations thus produced, resultant electrical vibrations; (c) transferring such resultant electrical vibrations by induction from one circuit to another; (d) varying the loudness of the sounds produced by varying the inductive relations subsisting between the two circuits last above mentioned; and (e) translating the electrical vibrations produced in manner above described into audible aerial vibrations.

23. In an electrical music-generating system, the method of producing musical sounds with expression, which consists in (a) producing, by induction, in different circuits, electrical undulations corresponding to different tones; (b) synthesizing, by means of the undulations generated in the circuits before mentioned, resultant electrical undulations; (c) transferring such resultant electrical undulations, by induction, from one circuit to another; (d) varying the loudness of the resultant sounds by varying the inductive relations subsisting between the two circuits last above mentioned; and (e) translating the electrical undulations into audible aerial vibrations.

24. In an electrical music-generating system, the method of producing music electrically, which consists in (a) producing, by induction, in different circuits, electrical undulations corresponding to different component sounds of the composite musical sound desired; (b) synthesizing resultant electrical undulations out of the undulations produced in the circuits before mentioned; (c) varying the amplitude of the component undulations entering into the resultant electrical undulations above mentioned independently of each other; and (d) translating the composite electrical undulations produced, into aerial vibrations of similar wave form.

25. In an electrical music-generating system, the method of producing music electrically, which consists in (a) producing by induction, in different circuits, electrical undulations corresponding to different component sounds of the composite musical sound desired; (b) synthesizing resultant electrical undulations out of the undulations produced in the circuit before mentioned; (c) varying the amplitude of component undulations entering into the resultant electrical undulations above mentioned, independently of each other, by varying the inductive relations subsisting between different vibration-emitting and vibration-receiving circuits; and (d) translating the composite electrical undulations produced in manner above described, into aerial vibrations of similar wave form.

26. The method of producing music electrically, which consists in (a) producing by induction, in different circuits, electrical undulations corresponding to different component sounds of the composite musical sound which it is desired to produce; (b) transferring undulations by induction from the different circuits before mentioned to a line, through one or more intermediate circuits; (c) varying the amplitude of the electrical undulations thrown upon the line, intermediate the line and the circuits in which the different corresponding series of electrical vibrations are first produced; and (d) translating the electrical vibrations thrown upon the line into audible aerial vibrations.

27. The method of producing music electrically, which consists in generating by induction, in different circuits, electrical undulations of different sorts, corresponding to different components of the sound which it is desired to produce; transferring electrical undulations from these different circuits to a common vibration-combining circuit, by induction; varying the amplitude of the different sets of undulations independently of each other by varying the inductive relations of different circuits independently of each other; and translating the composite electrical undulations, produced in manner above mentioned into audible aerial vibrations of similar wave form.

28. The method of producing music electrically, which consists in (a) producing in different circuits, different series of electrical vibrations, corresponding to different tones; (b) purifying different series of vibrations separately; (c) synthesizing resultant electrical undulations out of the separately-purified electrical vibrations; (d) varying the loudness of different component sounds of the composite musical sound produced, by varying the amplitude of the corresponding series of electrical vibrations; and (e) translating the composite electrical undulations, produced in manner above described, into aerial vibrations of similar wave form.

29. The method of producing music electrically, which consists in (a) producing, by induction, in different circuits, electrical undulations of frequencies corresponding to different tones; (b) purifying the different series of vibrations separately; (c) synthesizing resultant electrical undulations out of the purified electrical undulations above mentioned; (d) varying the loudness of different component sounds of the composite musical sound produced, by varying the amplitude of the corresponding series of electrical vibrations independently of each other; and (e) translating the composite electrical undulations, produced in manner above described, into aerial vibrations of similar wave form.

30. In an electrical music-generating system, the method of producing a composite musical tone, which consists in (a) producing, by induction, in different circuits, electrical undulations corresponding in periodicity to different partials of the composite tone required; (b) synthesizing out of the undulations generated in said circuits, composite electrical undulations corresponding to the composite tone required; (c) transferring such composite undulations by induction from one circuit to another, varying the loudness of the note produced by varying the inductive relation subsisting between the two circuits last above mentioned; and (d) translating the electrical undulations into aerial vibrations of similar wave form.

31. The method of producing music electrically, with agreeable tones and with proper expression, which consists in (a) producing, by induction, in different circuits, different series of electrical vibrations, answering to ground tones and overtones of the notes of a musical composition; (b) synthesizing out of the vibrations thus produced, composite electrical vibrations, corresponding to chords of composite tones; (c) translating such composite vibrations into audible aerial vibrations; and (d) varying the loudness of the sounds produced by varying the inductive relations subsisting between vibration-emitting and vibration-receiving circuits.

32. In an electrical music-generating system, the method of producing composite musical sounds electrically, which consists in (a) causing simultaneously, in different circuits, electrical vibrations of frequencies corresponding to different component tones of the composite musical sound desired; (b) generating from a plurality of groups or sets of such electrical vibrations, corresponding complex electrical vibrations of different sorts, simultaneously; (c) generating from the complex electrical vibrations last mentioned, resultant and more highly complex electrical vibrations; and (d) translating these complex electrical vibrations into complex aerial vibrations, of similar wave forms.

33. In an electrical music-generating system, the method of producing composite musical sounds electrically, which consists in (a) causing simultaneously, in different circuits, electrical vibrations of different frequencies, corresponding to different component tones of the composite musical sound desired; (b) transferring vibrations by induction, from different groups of these circuits to corresponding vibration-receiving circuits simultaneously; vibrations of each group of circuits aforementioned, being transferred to a vibration-receiving circuit proper to such group; (c) synthesizing resultant and more highly complex electrical vibrations out of the vibrations generated in the vibration-receiving circuits above mentioned; and (d) translating these complex electrical vibrations into complex aerial vibrations, of similar wave forms.

34. In an electrical music-generating system, the method of producing composite musical sounds electrically, which consists in (a) causing simultaneously, in different circuits, electrical vibrations of frequencies corresponding to different components of the composite musical sound desired; (b) transferring vibrations, by induction, from different groups of these circuits to corresponding vibration-receiving circuits, simultaneously, the vibrations of each group of circuits aforementioned being transferred to a vibration-receiving circuit proper to such group; (c) transferring vibrations by induction from group-vibration-receiving circuits last above mentioned to a common vibration-receiving circuit, so that resultant and more highly complex electrical vibrations are generated in said common vibration-receiving circuit; and (d) translating these complex electrical vibrations into complex aerial vibrations, of similar wave forms.

35. In an electrical music-generating system, and in combination, a multiplicity of rotatory rate-governors, serving for the production of the notes of a musical scale through one or more octaves electrically; and driving mechanism for said rate-governors, whereby different rate-governors are given different angular velocities.

36. In an electrical music-generating system, and in combination, an organization of rotatory rate-governors, serving for the production of the notes of a musical scale, different rate-governors being formed so that they produce different numbers of vibrations to a rotation; and driving mechanism for said rate-governors, serving to rotate different rate-governors with different angular velocities.

37. In an electrical music-generating system, and in combination, a multiplicity of rotatory rate-governors, serving by their rotations to govern the frequencies of electrical vibrations, said rotatory rate-governors being arranged in a plurality of groups; the members of each individual group being connected together, so that they rotate with the same angular velocity; different groups of rate-governors having different angular velocities, and serving for different notes.

38. In an electrical music-generating system, and in combination, a multiplicity of rotatory rate-governors, and a plurality of shafts, each impelling a plurality of the rate-governors before mentioned, having vibration frequencies standing to each other as different power of two; the different shafts serving for different notes.

39. In an electrical music-generating system, and in combination, a multiplicity of rotatory rate-governors; twelve pitch-shafts, corresponding to the twelve notes of the chromatic scale, and each impelling a plurality of the before-mentioned rate-governors, having vibration frequencies standing to each other as different powers of two, and serving to give different octaves of the note to which the pitch-shaft impelling them corresponds; and suitable driving mechanism, whereby the pitch-shafts are impelled.

40. In an electrical music-generating apparatus, and in combination, a shaft and a plurality of groups of rate-governors impelled by said shaft, the different groups of rate-governors serving to produce different octaves of a note, and the different rate-governors in a group serving to produce different partials of a note.

41. In an electrical music-generating system, a device for generating composite musical tones electrically, including a plurality of shafts each impelling a plurality of groups of rate-governors; different shafts serving for different notes; the different groups of rate-governors impelled by a shaft serving to produce different octaves of a note; and the different rate-governors in a group serving to produce different partials of a note; and suitable driving mechanism, whereby the shafts before mentioned are impelled.

42. In an electrical music-generating system, and in combination, (a) a plurality of common-receiver vibration-translating devices; (b) a multiplicity of electrical vibration-circuits; (c) a multiplicity of rotatory rate-governors, serving by their rotations to cause electrical vibrations, of different frequencies, to be produced in the circuits before mentioned; (d) driving mechanism for said rotatory rate-governors, whereby different rate-governors are given different angular velocities; and (e) a keyboard of pitch-keys, controlling the action of the vibration-generating devices upon the vibration-translating apparatus.

43. In an electrical music-generating system, and in combination, (a) an apparatus serving to generate electrical vibrations corresponding to the notes of a musical scale, through one or more octaves, and including a multiplicity of coils, a multiplicity of rotatory rate-governors, serving to cause electrical vibrations to be produced in said coils inductively and driving mechanism for said rate-governors whereby different rate-governors are given different angular velocities; (b) common-receiver vibration-translating devices; and (c) note-controllers, operating to bring the different vibration-generating devices into action, each as required, upon the vibration-translating apparatus.

44. In an electrical music-generating system, and in combination, a line; one or more common-receiver vibration-translating devices, supplied with vibrations by the line; and an apparatus serving to generate music in the line electrically, said apparatus including (a) an organization of rotatory rate-governors, adapted to produce the notes of a musical scale, through one or more octaves in the line aforesaid, by induction; (b) driving mechanism for said rotatory rate-governors; and (c) note-controllers, whereby the different rate-governors are made to act upon the line to produce their respective notes therein electrically, as required.

45. In an electrical music-generating system, and in combination, therein with a line and one or more common-receiver vibration-translating devices, an apparatus serving to generate music in the line electrically, said apparatus including (a) an organization of rotatory rate-governors, adapted to produce the notes of a musical scale, through one or more octaves; (b) driving mechanism for said rotatory rate-governors, whereby different rate-governors are given different angular velocities; and (c) note-controllers, whereby the different rate-governors are made to act upon the line to produce their respective notes therein electrically, as required.

46. In an electrical music-generating system, and in combination, therein with a line and one or more common-receiver vibration-translating devices, an apparatus serving to generate music in the line electrically, said apparatus including (a) an organization of rotatory rate-governors, adapted to produce the notes of a musical scale, through one or more octaves, in the line, by induction; (b) driving mechanism for said rotatory rate-governors, whereby different rate-governors are given different angular velocities; and (c) note-controllers, whereby the different rate-governors are made to act upon the line to produce their respective notes therein electrically, as required.

47. An electrical music-distributing system, having a plurality of common-receiver vibration-translating devices, disposed in different places, in combination with an electrical music-generating apparatus, serving to supply music electrically to the various common-receiver vibration-translating devices aforesaid, said electrical music-generating apparatus including (a) an organization of rotatory rate-governors, adapted to produce the notes of a musical scale electrically, by induction; (b) driving mechanism for said rotatory rate-governors; and (c) note-controllers, whereby the different rate-governors are made to act, each as required, upon the vibration-translating devices aforesaid.

48. An electrical music-distributing system, having a plurality of common-receiver vibration-translating devices, disposed in different places, in combination with an electrical music-generating apparatus, serving to supply music electrically to the various common-receiver vibration-translating devices aforesaid, said electrical music-generating apparatus including (a) electrical vibration-generators, serving to produce electrical vibrations answering to the notes of a musical scale, by induction, and each, in general including a rotatory rate-governor; (b) driving mechanism for said rotatory rate-governors; and (c) a keyboard of pitch-keys, controlling the action of the electrical vibration-generators upon the vibration-translating devices aforesaid.

49. An electrical music-distributing system, having a plurality of common-receiver vibration-translating devices, disposed in different places, in combination with an electrical music-generating apparatus, serving to supply music electrically to the various common-receiver vibration-translating devices aforesaid, said electrical music-generating apparatus including (a) electrical vibration-generators, serving to produce electrical vibrations answering to the notes of a musical scale, and each, in general including a rotatory rate-governor; (b) driving mechanism for said rotatory rate-governors, whereby different rate-governors are given different angular velocities; and (c) note-controllers, controlling the action of the electrical vibration-generators upon the vibration-translating devices aforesaid.

50. An electrical music-distributing system, having a plurality of common-receiver vibration-translating devices, disposed in different places, in combination with an electrical music-generating apparatus, serving to supply music electrically to the various common-receiver vibration-translating devices aforesaid, said electrical music-generating apparatus including (a) electrical vibration-generators, serving to produce electrical vibrations answering to the notes of a musical scale, by induction, and each, in general including a rotatory rate-governor; (b) driving mechanism for said rotatory rate-governors, whereby different rate-governors are given different angular velocities; and (c) note-controllers, controlling the action of the electrical vibration-generators upon the vibration-translating devices aforesaid.

51. In an electrical music-generating system, suitable vibration-translating apparatus, operating to translate electrical vibrations into audible aerial vibrations, in combination with an apparatus adapted to generate electrical vibrations answering to the notes of a musical scale, and including (a) a multiplicity of electrical undulation-circuits; (b) a multiplicity of inductional undulation-generating devices, whereby musical electrical undulations, of frequencies corresponding to different notes are produced inductively in the various electrical undulation-circuits before mentioned; and (c) a keyboard of pitch-keys, serving to bring the various undulation-generating devices above mentioned into action, each as required, upon the vibration-translating apparatus.

52. In an electrical music-generating system, suitable vibration-translating apparatus, operating to translate electrical vibrations into audible aerial vibrations, in combination with an apparatus adapted to generate electrical vibrations, answering to the notes of a musical scale, and including (a) a multiplicity of electrical undulation-circuits; (b) a multiplicity of inductional undulation-generating devices, whereby musical electrical undulations, of frequencies corresponding to different notes, are produced inductively in the various electrical undulation-circuits before mentioned, when said circuits are closed; and (c) keys, formed into a keyboard, serving to close the electrical undulation-circuits before mentioned, and adapted to afford facility to the performer to throw, by their manipulation, the notes of a musical composition, each as required, into the vibration-translating apparatus.

53. In an electrical music-generating system, and in combination, (A) suitable vibration-translating apparatus, operating to translate musical electrical vibrations into audible music; (B) an apparatus serving to generate the requisite electrical vibrations, including (a) a multiplicity of coils, and (b) a set of inductional undulation-generating devices, having vibration frequencies corresponding to the notes of a musical scale through one or more octaves, serving to cause vibrations inductively in the coils aforesaid; the different coils being acted upon by different undulation-generating devices; and (C) note-controllers, whereby the different undulation-generating devices are made to sound their respective notes, each as required, in the vibration-translating apparatus.

54. An electrical music-distributing system including a multiplicity of common-receiver vibration-translating devices, disposed in different places, in combination with an electrical music-undulation-generating apparatus, adapted to generate electrical undulations, corresponding to the notes of a musical composition, and operating to supply such undulations to the common-receiver vibration-translating devices, disposed at different places, as before mentioned; said electrical music-undulation-generating apparatus including (a) a multiplicity of electrical undulation-circuits; (b) inductional undulation-generating devices, serving to produce electrical undulations, of frequencies corresponding to different notes, in the different electrical undulation-circuits before mentioned, inductively; and (c) note-controllers, operating to bring the various electrical undulation-generating devices before mentioned into action, each as required, upon the common-receiver vibration-translating devices, and adapted to afford facility for the production of a tune by their manipulation.

55. An electrical music-distributing system, including a plurality of common-receiver vibration-translating devices, disposed in different places, in combination with an electrical music-undulation-generating apparatus, adapted to generate electrical undulations corresponding to the notes of a musical composition, and serving to supply such undulations to the various common-receiver vibration-translating devices before mentioned, such apparatus including (a) a multiplicity of coils; (b) inductional undulation-generating devices, whereby electrical undulations, of frequencies corresponding to different notes, are produced in the different coils before mentioned inductively; and (c) note-controllers, serving to bring said coils into action, each as required, upon the common-receiver vibration-translating devices, and adapted to afford facility for the production of a tune by their manipulation.

56. In an electrical music-generating system, and in combination therein with one or more common-receiver vibration-translating devices, an organization serving to produce electrical undulations corresponding to the notes of a musical scale and including a multiplicity of current-undulation circuits, serving for tones of different pitches; the current-undulation circuits serving for low tones having relatively large amounts of self-induction; the current-undulation circuits serving for tones of medium pitch having less amounts of self-induction; the current-undulation circuits serving for tones of high pitch, having relatively small amounts of self-induction; such varying amounts of self-induction being given to the different current-undulation circuits that in general each circuit tends strongly to suppress the higher overtones and harsher components of the electrical tone or tones for which it serves, without injuriously weakening the ground tone or ground tones thereof; and inductional undulation-generating mechanism, serving to produce the requisite electrical undulations in the various circuits before mentioned, such undulation-generating mechanism including an organization of rotatory rate-governors, with suitable driving mechanism therefor.

57. In an electrical music-generating system, and in combination therein with one or more common-receiver vibration-translating devices, an organization serving to produce electrical undulations, corresponding to the notes of a musical scale, and including a multiplicity of current-undulation circuits, serving for tones of different pitches; the current-undulation circuits serving for low tones, having relatively large amounts of self-induction; the current-undulation circuits serving for tones of medium pitch having less amounts of self-induction; the current-undulation circuits serving for tones of high pitch having relatively small amounts of self-induction; such varying amounts of self-induction being given to the different current-undulation circuits that, in general, each circuit tends strongly to suppress the higher overtones and harsher components of the electrical tone or tones for which it serves, without injuriously weakening the ground tone or ground tones thereof; and inductional undulation-generating mechanism, serving to produce the requisite electrical undulations in the various circuits before mentioned, such undulation-generating mechanism including (a) a multiplicity of rheotomes, having vibration frequencies corresponding to the notes of a musical scale, and (b) primary circuits, affected by said rheotomes and serving to cause the production of electrical undulations inductively in the circuits first in this paragraph mentioned.

58. In an electrical music-generating system, and in combination, therein with one or more common-receiver vibration-translating devices, a set of current-undulation circuits, corresponding with the notes of a musical scale through one or more octaves; inductional vibration-generating devices, whereby current-undulations of the requisite frequencies are caused in the different current-undulation circuits, as required; different amounts of self-induction being given to different current-undulation circuits; the current-undulation circuits serving for low notes having relatively large amounts of self-induction; the current-undulation circuits serving for notes of medium pitch having less amounts of self-induction; and the current-undulation circuits serving for notes of high pitch having relatively small amounts of self-induction; such varying amounts of self-induction being, in the result, given to the different current-undulation circuits that in general each tends strongly to suppress the higher overtones and harsher components of the note for which it stands, without injuriously weakening the ground tone thereof.

59. In an electrical music-generating system, and in combination, suitable vibration-translating apparatus, and an apparatus for generating the requisite electrical vibrations, including a multiplicity of electrical undulation-circuits; and inductional undulation-generating devices, whereby current-undulations of the requisite frequencies are generated inductively in the various electrical undulation-circuits before mentioned; the different current-undulation circuits before mentioned serving for tones of different pitches; the current-undulation circuits serving for low tones having relatively large amounts of self-induction; the current-undulation circuits serving for notes of medium pitch having less amounts of self-induction; the current-undulation circuits serving for tones of high pitch having relatively small amounts of self-induction; such varying amounts of self-induction being, in the result, given to the different current-undulation circuits before mentioned, that in general each tends strongly to suppress the higher overtones and harsher component of the electrical tone or tones for which it serves, without injuriously weakening the ground tone or ground tones thereof; and a keyboard of pitch-keys, controlling the action of the vibration-generating apparatus upon the vibration-translating apparatus.

60. An electrical music-distributing system, including a multiplicity of common-receiver vibration-translating devices, in combination with a central-station electrical music-vibration-generating apparatus, including (a) a multiplicity of current-undulation circuits; (b) inductional undulation-generating devices, whereby current-undulations of the requisite frequencies are produced inductively in the different current-undulation circuits before mentioned; the different current-undulation circuits before mentioned serving for tones of different pitches; the current-undulation circuits serving for low tones having relatively large amounts of self-induction; the current-undulation circuits serving for notes of medium pitch having less amounts of self-induction; the current-undulation circuits serving for tones of high pitch having relatively small amounts of self-induction; such varying amounts of self-induction being, in the result, given to the different current-undulation circuits before mentioned, that in general each tends strongly to suppress the higher overtones and harsher components of the electrical tone or tones for which it serves, without injuriously weakening the ground tone or ground tones thereof; and (c) note-controllers controlling the action of the vibration-generating apparatus upon the vibration-translating devices.

61. In an apparatus for generating music electrically, and in combination, a multiplicity of rheotomes, having vibration frequencies corresponding with the notes of a musical scale through one or more octaves; a plurality of inductoriums; some serving for notes of high pitch, and others serving for notes of low pitch; each inductorium having at least one rheotome-controlled primary circuit and at least one secondary; a keyboard of pitch-keys, and circuit-controlling devices operated thereby.

62. In an electrical music-distributing system, a plurality of common-receiver vibration-translating devices, located at different points, in combination with a central-station vibration-generating apparatus, including a multiplicity of rheotomes, having vibration frequencies corresponding with the notes of a musical scale through one or more octaves; a plurality of inductoriums, some serving for notes of high pitch and others serving for notes of low pitch; each inductorium having at least one rheotome-controlled primary circuit and at least one secondary; and a keyboard of pitch-keys, controlling the action of the other parts before mentioned upon the vibration-translating devices.

63. In an electrical music-generating system, and in combination therein with one or more common-receiver vibration-translating devices, an apparatus serving to generate electrical vibrations, corresponding to the notes of a musical composition, said apparatus including (a) a plurality of inductoriums some serving for low notes, some serving for high notes, and some for notes of medium pitch; (b) vibration-generating devices having vibration frequencies corresponding to the notes of a musical scale, serving to produce vibrations in the primaries of the inductoriums before mentioned; and (c) note-controllers, whereby the various vibration-generating devices are made to sound their respective notes, each as required, in the vibration-translating apparatus.

64. In an electrical music-generating system, and in combination therein with one or more common-receiver vibration-translating devices, an apparatus serving to generate electrical vibrations corresponding to the notes of a musical composition, said apparatus including (a) a set of inductoriums, corresponding to the notes of a musical scale, through one or more octaves; (b) a set of vibration-generating devices, having vibration frequencies corresponding to the notes of a musical scale, serving to produce vibrations in the primaries of the different inductoriums before mentioned; and (c) note-controllers, whereby the various vibration-generating devices aforesaid are made to sound their respective notes, each as required, in the vibration-translating apparatus.

65. In an electrical music-generating system, and in combination therein with one or more common-receiver vibration-translating devices, an apparatus for generating musical electrical undulations, including a multiplicity of inductoriums; means whereby electrical vibrations, of frequencies corresponding to different notes, are produced in the primaries of different inductoriums; and a keyboard of pitch-keys, operating to close secondary circuits of the aforesaid inductoriums.

66. In an electrical music-generating system, and in combination therein with one or more common-receiver vibration-translating devices, an apparatus for generating the requisite electrical undulations including (a) a rheotome, (b) a rheotome-interrupted circuit, and (c) a circuit in which current-undulations are produced inductively as a consequence of the current-vibrations in the rheotome-interrupted circuit; and a single key, serving to close both of the circuits before mentioned.

67. In an electrical music-distributing system, and in combination, a plurality of common-receiver vibration-translating devices; a common supply-circuit, from or by which electrical vibrations are supplied to the common-receiver vibration-translating devices; a plurality of feeding-coils, forming parallel branches to the common supply-circuit, and serving to supply different tones thereto; inductional undulation-generating devices, whereby the requisite electrical undulations are produced in the feeding-coils before mentioned, when their circuits are closed; and suitable circuit-controlling devices, whereby the branch circuits of the various feeding-coils before mentioned are closed at will.

68. In an electrical music-distributing system, and in combination, a plurality of common-receiver vibration-translating devices; a common supply-circuit, from or by which electrical undulations are supplied to the common-receiver vibration-translating devices;

and a plurality of feeding-coils, forming parallel branches to the common supply-circuit, and serving to supply different tones thereto; inductional undulation-generating devices, whereby the requisite electrical undulations are produced in the feeding-coils before mentioned when their circuits are closed; and a keyboard of pitch-keys, controlling the branch circuits of the feeding-coils before mentioned.

69. In an electrical music-generating system, one or more common-receiver vibration-translating devices, serving to translate musical electrical vibrations into audible music, in combination with an apparatus serving to generate the requisite electrical vibrations, said apparatus including (a) vibration-generating devices, adapted to produce the notes of a musical scale electrically; (b) a plurality of tone-purifying devices, whereby different tones are purified separately; and (c) note-controllers, whereby the different vibration-generating devices are made to sound their respective notes, each as required, in the vibration-translating apparatus.

70. In an electrical music-generating system, one or more common-receiver vibration-translating devices, serving to translate musical electrical vibrations into audible music, in combination with an apparatus serving to generate the requisite electrical vibrations, said apparatus including (a) vibration-generating devices, adapted to produce the notes of a musical scale electrically; (b) a plurality of tone-purifying devices, serving for the purifying of tones of different pitches, and operating to purify their respective tones by successive inductive transfers; and (c) note-controllers, whereby the different vibration-generating devices are made to sound their respective notes, each as required, in the vibration-translating apparatus.

71. In an electrical music-generating system, suitable vibration-translating apparatus, serving to translate musical electrical vibrations into audible music, in combination with an apparatus serving to generate the requisite electrical vibrations, said apparatus including (a) vibration-generating devices, adapted to produce the notes of a musical scale electrically; (b) a plurality of tone-purifying devices, different tone-purifying devices serving for the purifying of tones of different pitches; and (c) a keyboard of pitch-keys, whereby the different vibration-generating devices are made to sound their respective notes, each as required, in the vibration-translating apparatus.

72. In an electrical music-generating system, one or more common-receiver vibration-translating devices, serving to translate musical electrical vibrations into audible music, in combination with an apparatus serving to generate the requisite electrical vibrations; said apparatus including (a) an organization of rotatory rate-governors, adapted to produce electrical vibrations corresponding to the notes of a musical scale; (b) a plurality of tone-purifying devices, whereby different tones are purified separately; and (c) note-controllers, whereby the different vibration-generating devices are made to sound their respective notes, each as required, in the vibration-translating apparatus.

73. In an electrical music-generating system, one or more common-receiver vibration-translating devices, operating to translate electrical vibrations into audible vibrations, in combination with a device serving to synthesize a composite musical sound electrically, including (a) a plurality of vibration-generating devices, whereby musical tones of different pitches are produced; (b) a circuit to which vibrations are propagated inductively from the vibration-generating devices before mentioned; and (c) a plurality of tone-purifying devices, interposed between the vibration-generating devices before mentioned and the circuit before mentioned; different tone-purifying devices operating to purify different tones.

74. In an electrical music-generating system, and in combination therein with one or more common-receiver vibration-translating devices, a device serving to generate a composite musical sound electrically, including (a) a plurality of circuits; (b) means whereby current-vibrations, corresponding to different tones, are produced in said circuits; (c) a circuit to which vibrations are propagated inductively from the vibration-generating devices before mentioned; and (d) a plurality of tone-purifying devices, inductively intermediate the circuits first in this paragraph mentioned and the circuit last above mentioned; said tone-purifying devices including each one or more closed circuits, serving to receive vibrations by induction from one of the circuits first in this paragraph mentioned and to transfer such vibrations by induction to the other circuit above mentioned.

75. In an electrical music-generating system, a composite-tone-generating device including, in combination, a circuit, and a plurality of vibration-generating devices, having vibration frequencies corresponding to different partials of the same composite tone, serving to produce vibrations in the circuit before mentioned; and a key, controlling the vibration-generating devices before mentioned.

76. In an electrical music-generating system, and in combination therein with a line and one or more common-receiver vibration-translating devices, a composite-tone-generating device, acting to generate electrical vibrations corresponding to different components of the same composite tone; and a note-controlling device, extra the line, operating to bring said composite-tone-generating device into action upon the line.

77. In an electrical music-generating system, and in combination therein with a line and one or more common-receiver vibration-translating devices, a composite-tone-generating device acting to produce electrical vibrations corresponding to different components of the same composite tone; and a note-controlling device intermediate the composite-tone-generating device aforesaid and the line, whereby the different components aforesaid are thrown upon the line.

78. In an electrical music-generating system, and in combination, a circuit; one or more common-receiver vibration-translating devices, supplied with vibrations by said circuit; and a plurality of normally-coacting electrical vibration-generating devices, having vibration frequencies corresponding to different partials of the same composite tone, acting simultaneously to produce a composite musical tone from the vibration-translating devices before mentioned.

79. In an electrical music-generating system, and in combination, a plurality of common-receiver vibration-translating devices; a plurality of circuits, corresponding respectively to different components of the same composite tone; means whereby electrical vibrations, of frequencies corresponding to different components of the same composite tone, are produced in the different circuits before mentioned; and a key, controlling said circuits.

80. In an electrical music-generating system, and in combination therein with a line and one or more common-receiver vibration-translating devices, a composite-tone-generating device, including (a) a plurality of circuits, corresponding respectively to different components of the same composite tone; (b) means whereby electrical vibrations corresponding to different components of the same composite tone are produced in the different circuits before mentioned; and a note-controlling device, extra the line, operating to bring the circuits before mentioned into operation upon the line so that a composite tone is produced therein.

81. In an electrical music-generating system, and in combination, a line; one or more vibration-translating devices, supplied with vibrations by the line, and operating to translate musical electrical vibrations into audible music; a plurality of circuits, corresponding to different components of the same composite tone, and arranged in such a manner that they act, when closed, upon the line inductively; means whereby electrical vibrations, of frequencies corresponding to different components of the same composite tone, are produced in the circuit before mentioned; and a note-controlling device, serving to close the circuits before mentioned as acting upon the line inductively.

82. In an electrical music-generating system and in combination, a plurality of coils, corresponding respectively to different components of the same composite tone; inductional undulation-generating devices, whereby electrical undulations of frequencies corresponding to the different component tones aforesaid are produced simultaneously in the different coils aforesaid; suitable vibration-translating apparatus; and a key, governing the action of said coils upon said vibration-translating apparatus, and serving to afford facility to the performer to produce at will, by its manipulation, a composite tone from the vibration-translating apparatus aforesaid.

83. In an electrical music-generating system, and in combination, a plurality of coils, corresponding respectively to different components of the same composite tone; means whereby electrical vibrations, of frequencies corresponding to the different component tones aforesaid are produced in the different coils aforesaid; a vibration-combining circuit, to which vibrations are transferred by induction from the various coils before mentioned; and a key, controlling the action of the coils before mentioned upon the vibration-combining circuit aforesaid, and serving to afford facility to the performer to produce a composite tone at will, by its manipulation.

84. In an electrical music-generating system and in combination, (a) suitable vibration-translating devices, operating to translate musical electrical vibrations into audible music; (b) a composite-tone-generating device, serving to produce a musical note by synthesis and including for this purpose a plurality of coils and a plurality of normally-coacting inductional undulation-generating devices, serving simultaneously to produce in the coils before mentioned, electrical undulations having vibration frequencies corresponding to different components of the composite tone which they coact to produce.

85. In an electrical music-generating system, and in combination, a line; one or more vibration-translating devices, supplied with vibrations by the line; and a vibration-generating apparatus, serving to supply electrical vibrations to the line, and including (a) a plurality of coils, (b) inductional undulation-generating mechanism, serving to produce simultaneously in the coils before mentioned, electrical vibrations, of frequencies corresponding to different components of the same composite tone, and (c) a key, operating to bring the coils before mentioned into action upon the line, and serving to afford facility to the performer to throw a composite tone upon the line by its manipulation.

86. In an electrical music-generating system, and in combination, a circuit; a device for generating in said circuit electrical undulations, corresponding to a composite tone, including a plurality of rheotomes, having vibration frequencies, corresponding to different partials of the same composite tone; and a key, controlling the rheotomes aforesaid.

87. In an electrical music-generating system, and in combination therein with a line and one or more common-receiver vibration-translating devices, a composite-tone-generating device, including rheotomes, operating to produce different components of the same composite tone, and a note-controlling device, extra the line, serving to bring said rheotomes into action upon the line.

88. In an electrical music-generating system, and in combination therein with a line and one or more common-receiver vibration-translating devices, a composite-tone-generating device, including (a) a plurality of circuits; (b) rheotomes operating to produce different components of the same composite tone in the different circuits aforesaid; said circuits acting upon the line aforesaid inductively; and (c) a note-controlling device, extra the line, controlling the action upon said line of the vibration-generating devices aforesaid.

89. In an electrical music-generating system, means serving to produce a composite musical note, including in combination, a plurality of common-receiver vibration-translating devices; a plurality of rheotomes, having vibration frequencies corresponding to different partials of the same composite tone; circuits acted on by said rheotomes; and a key, serving to bring said rheotomes into action upon said circuits.

90. In an electrical music-generating system, a device serving to produce a composite musical note electrically, including, in combination, a plurality of primary circuits; rheotomes having vibration frequencies corresponding to different partials of the same composite tone, serving to produce vibrations in said primary circuits; a vibration-combining circuit, to which vibrations are propagated by induction from the primary circuits before mentioned; and a key controlling said primary circuits.

91. In an electrical music-generating system, means for producing a composite musical note electrically, including a plurality of inductoriums, having each a secondary circuit of its own, in combination with a plurality of normally-coacting vibration-generating devices, having vibration frequencies, corresponding to different partials of the same composite tone, acting together to produce electrical vibrations in primary circuits of the inductoriums before mentioned.

92. In an electrical music-generating system, and in combination, a plurality of inductoriums; a plurality of vibration-generating devices, serving to produce electrical vibrations in the primaries of the different inductoriums before mentioned, and having vibration frequencies corresponding to different partials of the same composite tone; and a key, controlling the production of vibrations in the primaries of the different inductoriums before mentioned.

93. In an electrical music-generating system, and in combination, a line; one or more vibration-translating devices, supplied with vibrations by the line; a circuit, serving to supply electrical vibrations to the line; vibration-generating devices, having vibration frequencies corresponding to different partials of the same composite tone, acting upon the circuit last above mentioned to produce vibrations therein; and a note-controlling device inserted in said circuit.

94. In an electrical music-generating system, and in combination therein with a line and one or more common-receiver vibration-translating devices, a composite-tone-generating device, including (a) a circuit, acting inductively upon the line aforesaid to supply electrical vibrations thereto; (b) means acting to produce electrical vibrations, corresponding to different partials of the same composite tone, in the circuit last aforesaid; and (c) a note-controlling device, extra the line, whereby the composite-tone-generating device aforesaid is brought into action upon the line.

95. In an electrical music-generating system, and in combination therein with a line and one or more common-receiver vibration-translating devices, a composite-tone-generating device, including (a) a plurality of circuits; (b) means whereby different components of the same composite tone are produced in said circuits; (c) a circuit to which vibrations are communicated by induction from the circuits aforesaid, said circuit operating upon the line inductively to transfer its vibrations thereto; and (d) a note-controlling device, whereby the composite tone produced by the means aforesaid is thrown upon the line, when required.

96. In an electrical music-generating system, and in combination therein with a line and one or more common-receiver vibration-translating devices, a composite-tone-generating device, including, (a) a plurality of circuits; (b) means whereby different components of the same composite tone are produced in said circuits; (c) a circuit to which vibrations are communicated by induction from the circuits aforesaid, said circuit operating upon the line inductively to produce vibrations therein; and (d) a note-controlling device inserted in the circuits first above mentioned.

97. In an electrical music-generating system, and in combination therein with a line and one or more common-receiver vibration-translating devices, a composite-tone-generating device, including (a) a plurality of circuits; (b) means whereby different components of the same composite tone are produced in said circuits; (c) a circuit to which vibrations are communicated by induction from the circuits aforesaid, said circuit operating upon the line to produce vibrations therein; and (d) a note-controlling device, serving to close both the circuits first in this paragraph mentioned and also the other circuit before mentioned as operating upon the line to produce the vibrations therein.

98. In an electrical music-generating system, and in combination, a plurality of circuits; vibration-generating devices, having vibration frequencies corresponding to different partials of the same composite tone, serving to produce electrical vibrations in the circuits before mentioned; a circuit to which vibrations are propagated inductively from the circuits before mentioned; and a key, serving to close both the circuit last above mentioned and also the other circuits, first in this paragraph mentioned.

99. In an electrical music-generating system, suitable vibration-translating apparatus, operating to translate electrical vibrations into audible aerial vibrations, in combination with a device serving to synthesize a composite musical tone electrically, including (a) a plurality of vibration-generating devices, having vibration frequencies corresponding to different partials of the same composite tone, and (b) a plurality of tone-purifying devices; different tone-purifying devices serving for the purifying of different components of the tone.

100. In an electrical music-generating system, suitable vibration-translating apparatus, operating to translate electrical vibrations into audible aerial vibrations, in combination with a device, serving to synthesize a composite musical tone electrically, and including (a) a plurality of vibration-generating devices, having vibration frequencies corresponding to different partials of the same composite tone; (b) a vibration-combining circuit, to which vibrations are propagated inductively from the various vibration-generating devices before mentioned; and (c) a plurality of tone-purifying devices, interposed between the vibration-generating devices before mentioned and the vibration-combining circuit before mentioned; different tone-purifying devices serving for the purifying of different components of the tone.

101. In an electrical music-generating system, a composite-tone-generating device, including in combination, (a) a plurality of circuits; (b) means whereby current-vibrations, corresponding in frequencies to different components of the same composite tone, are produced in said circuits; (c) a vibration-combining circuit, serving to combine the vibrations corresponding to different components of the same composite tone into one series of composite vibrations and (d) a plurality of tone-purifying devices, inductively intermediate the circuits first in this paragraph mentioned and the vibration-combining circuit above mentioned; said tone-purifying devices including each one or more closed circuits, serving to receive vibrations by induction from one of the circuits first in this paragraph mentioned and to transfer such vibrations by induction to the vibration-combining circuit above mentioned.

102. In an electrical music-generating system, and in combination therein with one or more common-receiver vibration-translating devices, a device for generating a composite musical tone electrically, including a circuit and a plurality of rotatory rate-governors, having vibration frequencies corresponding to different partials of the same composite tone, acting simultaneously to produce electrical vibrations in the circuit before mentioned, by induction.

103. In an electrical music-generating system, and in combination therein with common-receiver vibration-translating devices, a plurality of rotatory rate-governors, having vibration frequencies corresponding to different partials of the same composite tone acting by induction simultaneously to produce a composite musical note from the common-receiver vibration-translating devices before mentioned; and a key, serving to bring said rotatory rate-governors into action upon the common-receiver vibration-translating devices before mentioned.

104. In an electrical music-generating system, a device serving to generate a composite musical tone electrically, including a plurality of circuits; a plurality of rotatory rate-governors, having vibration frequencies corresponding to different partials of the same composite tone, serving by their rotation to cause electrical vibrations to be produced simultaneously in the circuits before mentioned; and a vibration-combining circuit, to which electrical vibrations are propagated by induction from the circuits before mentioned, so that resultant electrical undulations, corresponding to the composite tone required are formed in said vibration-combining circuit.

105. In an electrical music-generating system, and in combination therein with one or more common-receiver vibration-translating devices, a composite-tone-generating device, including (a) a plurality of circuits; (b) rotatory rate-governors, serving by their rotation to cause electrical vibrations to be produced in the circuits before mentioned, said rotatory rate-governors having vibration frequencies corresponding to different partials of the same composite tone; and (c) a note-controlling device, controlling the circuits before mentioned.

106. In an electrical music-generating system, and in combination therein with a line and one or more common-receiver vibration-translating devices, a composite-tone-generating device, including (a) a plurality of circuits; (b) rotatory rate-governors, acting to produce electrical vibrations, corresponding to different components of the same composite tone, in the different circuits aforesaid; and (c) a note-controlling device, extra the line, controlling the action upon the line of the rotatory rate-governors aforesaid.

107. In an electrical music-generating system, and in combination therein with a line and one or more common-receiver vibration-translating devices, a composite-tone-generating device, including (a) a plurality of circuits; (b) rotatory rate-governors, acting to produce electrical vibrations, corresponding to different components of the same composite tone, in the different circuits aforesaid; and (c) a note-controlling device intermediate the rotatory rate-governors aforesaid and the line.

108. In an electrical music-generating system, means for generating a composite musical tone electrically, including, in combination, (a) suitable common-receiver vibration-translating devices; (b) a plurality of coils; (c) a plurality of rotatory rate-governors, having vibration frequencies corresponding to different partials of the same composite tone, serving by their rotations to cause electrical vibrations to be produced inductively in the coils before mentioned simultaneously.

109. In an electrical music-generating system, means for generating a composite musical tone, including, in combination, suitable vibration-translating apparatus operating to translate electrical vibrations into audible aerial vibrations; a plurality of coils; a plurality of rotatory rate-governors, having vibration frequencies corresponding to different partials of the same composite tone, serving by their rotations to cause electrical vibrations to be produced inductively in the coils before mentioned simultaneously; and a note-controlling device, controlling the action upon the vibration-translating devices of the other parts before mentioned.

110. In an electrical music-generating system, and in combination therein with a line and one or more common-receiver vibration-translating devices, a composite-tone-generating device, including (a) a plurality of coils; (b) rotatory rate-governors, corresponding to different components of the same composite tone, serving by their rotations to cause electrical vibrations to be produced inductively in the coils before mentioned; and (c) a note-controlling device, extra the line aforesaid, controlling the action upon the line of the rotatory rate-governors aforesaid.

111. In an electrical music-generating system, and in combination therein with a line and one or more common-receiver vibration-translating devices, a composite-tone-generating device, including (a) a plurality of coils; (b) rotatory rate-governors, corresponding to different components of the same composite tone, serving by their rotations to cause electrical vibrations to be produced inductively in the coils before mentioned; and (c) a note-controlling device, intermediate the coils aforesaid and the line, controlling the action of said coils upon the line.

112. In an electrical music-generating system, and in combination therein with suitable common-receiver vibration-translating devices, a composite-tone-synthesizing device, including a plurality of circuits, a plurality of rotatory rheotomes, having vibration frequencies corresponding to different partials of the same composite tone acting simultaneously to produce electrical vibrations in the circuits aforesaid; and a vibration-combining circuit, subjected to inductive influences resulting from the current-variations in the rheotome-affected circuits before mentioned, so that electrical undulations, corresponding to a composite musical note, are generated in the vibration-combining circuit aforesaid.

113. In an electrical music-generating system, and in combination therein with suitable vibration-translating apparatus, a composite-tone-generating device, including a plurality of circuits, a plurality of rotatory rheotomes, having vibration frequencies corresponding to different partials of the same composite tone; acting simultaneously to produce electrical vibrations in the circuits aforesaid; a vibration-combining circuit, subjected to inductive influences resulting from the current-variations in the rheotome-affected circuits before mentioned; and a note-controlling device, serving to bring the vibration-generating devices before mentioned into action upon the vibration-translating apparatus.

114. In an electrical music-generating system, and in combination therein with a line and one or more common-receiver vibration-translating devices, a composite-tone-generating device, including (a) a plurality of circuits; (b) rotatory rheotomes, whereby electrical vibrations corresponding to different components of the same composite tone are produced in the different circuits aforesaid; and (c) a note-controlling device, extra the line aforesaid, controlling the action upon the line of the rotatory rheotomes aforesaid.

115. In an electrical music-generating system, and in combination therein with a line and one or more common-receiver vibration-translating devices, a composite-tone-generating device, including (a) a plurality of circuits; (b) rotatory rheotomes, whereby electrical vibrations corresponding to different components of the same composite tone are produced in the different circuits aforesaid; and (c) a note-controlling device, intermediate the rheotomes aforesaid and the line.

116. In an electrical music-generating system, and in combination, a plurality of common-receiver vibration-translating devices, and a multiplicity of groups of electrical vibration-generators; different vibration-generators of a group serving for the production of different components of the same composite tone, and the different groups of vibration-generators serving for the production of the notes of a musical scale through one or more octaves.

117. In an electrical music-generating system, and in combination, a plurality of common-receiver vibration-translating devices, and a multiplicity of groups of electrical vibration-generators; different vibration-generators of a group serving for the production of different components of the same composite tone, and the different groups of vibration-generators serving for the production of the notes of a musical scale through one or more octaves; and note-controlling devices, each controlling the action of one of the groups of electrical vibration-generators before mentioned upon the common-receiver vibration-translating devices.

118. In an electrical music-generating system and in combination, a plurality of common-receiver vibration-translating devices, and a set of composite-tone-synthesizing devices, each including a group of circuits and vibration-generating devices whereby electrical vibrations corresponding in periodicity to different partials of a composite tone are generated in the different circuits of a group, as required; the different circuits of a group serving for the development of different components of the same musical note, and the different groups of circuits serving for the production of the notes of a musical scale through one or more octaves.

119. In an electrical music-generating system, and in combination, a plurality of common-receiver vibration-translating devices; a set of composite-tone-generating devices, each including a group of circuits, and vibration-generating devices, whereby electrical vibrations corresponding in periodicity to different partials of a composite tone are produced in different circuits of a group, as required; the different circuits of a group serving for the development of different components of the same musical note; and the different groups of circuits serving for the production of the notes of a musical scale through one or more octaves; and note-controlling devices, each controlling the action of one of the groups of circuits above mentioned upon the vibration-translating devices.

120. In an electrical music-generating system, a set of composite-tone-synthesizing devices, each including a group of coils, in combination with inductional vibration-generating devices, whereby electrical vibrations corresponding to different partials of a note are generated in the different coils of a group, as required; the different coils of a group serving for the development of different components of a tone for which such group serves, and the different groups of coils serving for the production of the notes of a musical scale through one or more octaves.

121. In an electrical music-generating system, and in combination, a plurality of common-receiver vibration-translating devices; a set of composite-tone-generating devices each including a group of coils, and inductional vibration-generating devices, whereby electrical vibrations corresponding to different partials of a tone are generated in different coils of a group, as required; the different coils of a group serving for the development of different components of the tone for which such group serves, and the different groups of coils serving for the production of the notes of a musical scale through one or more octaves; and note-controlling devices, each controlling the action of one of the groups of coils above mentioned upon the vibration-translating devices.

122. In an electrical music system and in combinaton, a plurality of common-receiver vibration-translating devices, and means for generating the requisite electrical undulations, including a multiplicity of groups of rheotomes, each group, in general, including a rheotome, serving to produce the ground tone of a note and one or more other rheotomes serving to produce one or more overtones of such ground tone; the different ground-tone rheotomes having vibration frequencies corresponding to the notes of a musical scale through one or more octaves.

123. In an electrical music system, and in combination, a plurality of common-receiver vibration-translating devices, and means for generating the requisite electrical undulations including a multiplicity of groups of rheotomes, each group in general including a rheotome serving to produce the ground tone of a note, and one or more other rheotomes serving to produce one or more overtones of such ground tone, the different ground-tone rheotomes having vibration frequencies corresponding to the notes of a musical scale through one or more octaves; and a keyboard of pitch-keys, each key, in general, controlling the action of a ground-tone rheotome and one or more overtone-rheotomes upon the vibration-translating devices.

124. In an electrical music-generating system, and in combination, a plurality of common-receiver vibration-translating devices, and an apparatus serving to generate the requisite electrical vibrations, including a set of rotatory rate-governors, serving for the production of ground tones of notes; and one or more supplemental sets of rotatory rate-governors, acting simultaneously for the production of overtones for the notes.

125. In an electrical music-generating system, and in combination, a plurality of common-receiver vibration-translating devices, and an apparatus serving to generate the requisite electrical vibrations, including a set of circuits serving for the production of ground tones of notes; and one or more supplemental sets of circuits, serving simultaneously for the production of overtones of notes; and rotatory rate-governors, serving to cause electrical vibrations of the requisite frequencies in the circuits before mentioned.

126. In an electrical music-generating system, and in combination, a plurality of common-receiver vibration-translating devices, and an apparatus serving to generate the requisite electrical vibrations including a set of coils serving for the production of ground tones of notes; one or more supplemental sets of coils serving simultaneously for the production of overtones of notes; and rotatory rate-governors serving to cause electrical vibrations of the requisite frequencies in the coils before mentioned.

127. In an electrical music-distributing system, and in combination, a common supply-circuit; suitable vibration-translating devices, fed from or by said common supply-circuit; and an apparatus serving to produce in the common supply-circuit the notes of a musical composition electrically with suitable composite tones, including a set of rotatory rate-governors serving for the production of ground tones of notes; and one or more supplemental sets of rotatory rate-governors serving for the production of overtones for the notes; corresponding members of the different sets of rate-governors above mentioned acting simultaneously to produce composite electrical vibrations in the circuit first in this paragraph mentioned.

128. In an electrical music-distributing system, and in combination, a common supply-circuit; suitable vibration-translating devices, fed from or by said common supply-circuit; and an apparatus serving to produce in the common supply-circuit the notes of a musical composition electrically, with suitable composite tones, including a set of circuits serving for the production of ground tones of notes; one or more supplemental sets of circuits, serving for the production of overtones for the notes; rotatory rate-governors serving to produce electrical vibrations of the requisite frequencies in the circuits before mentioned; corresponding circuits of the different sets above mentioned acting simultaneously to produce composite electrical vibrations in the circuits first in this paragraph mentioned.

129. In an electrical music-distributing system, and in combination, a common supply-circuit; suitable vibration-translating devices fed from or by said common supply-circuit; and an apparatus serving to produce in said common supply-circuit the notes of a musical composition electrically, with suitable composite tones, including a set of coils serving for the production of ground tones of notes; one or more supplemental sets of coils serving for the production of overtones for the notes; and rotatory rate-governors serving to produce electrical vibrations of the requisite frequencies in the coils before mentioned; corresponding coils of the different sets before mentioned acting simultaneously to produce composite electrical vibrations in the circuit first in this paragraph mentioned.

130. In an electrical music-generating system, and in combination, (a) electrical vibration-generating devices, corresponding to the notes of a musical scale through one or more octaves (b) one or more common-receiver vibration-translating devices; (c) note-controllers, whereby the different vibration-generating devices are made to produce their respective notes, each as required, in the vibration-translating apparatus; and (d) current-regulator expression mechanism, operating inductively to govern the loudness of the sounds given off by the vibration-translating apparatus.

131. In an electrical music-generating system, and in combination, (a) a line; (b) one or more common-receiver vibration-translating devices; (c) electrical vibration-generating devices, acting to produce the notes of a musical scale in said line; (d) note-controllers, whereby the different notes are thrown upon the line, each as required; and (e) current-regulator expression mechanism, extra the line, operating to govern the loudness of sounds given off by the vibration-translating apparatus.

132. In an electrical music-generating system, and in combination, (a) a line; (b) one or more common-receiver vibration-translating devices; (c) electrical vibration-generating devices, acting to produce the notes of a musical scale in said line; (d) note-controllers, whereby the different notes are thrown upon the line, each as required; and (e) current-regulator expression mechanism, operating to govern the loudness of sounds produced by the vibration-translating apparatus by governing the voltage of the vibrations thrown upon the line.

133. In an electrical music-generating system, and in combination, (a) a line; (b) one or more common-receiver vibration-translating devices; (c) vibration-generating devices, whereby the notes of a musical scale are produced in said line electrically; (d) note-controllers, whereby different notes are thrown upon the line, each as required; and (e) suitable current-regulator expression mechanism, interposed between the vibration-generating devices aforesaid and the line, operating to govern the loudness of sounds produced by the vibration-translating apparatus.

134. In an electrical music-generating system, and in combination, (a) a line; (b) one or more common-receiver vibration-translating devices, supplied with electrical vibration by the line, and operating to translate said electrical vibrations into audible vibrations; (c) electrical vibration-generating devices, corresponding to the notes of a musical scale through one or more octaves and serving to produce electrical vibrations by induction in the line; (d) note-controllers, whereby the vibration-generating devices are made to produce their respective notes in the line electrically, as required; and (e) suitable current-regulator expression mechanism, whereby the loudness of the sounds given off by the vibration-translating devices is governed.

135. In an electrical music-generating system, and in combination, (a) electrical vibration-generating devices, serving to generate electrical vibrations corresponding to notes of a musical composition; (b) one or more common-receiver vibration-translating devices; (c) note-controllers, whereby the different vibration-translating devices are made to sound their respective notes, in the vibration-translating apparatus; and (*d*) current-regulator expression mechanism, operating simultaneously with the note-controllers, and serving to govern the loudness of the sounds given off by the vibration-translating apparatus.

136. In an electrical music-generating system, and in combination, (*a*) a line; (*b*) vibration-translating apparatus, supplied with electrical vibrations by the line, and operating to translate such vibrations into audible aerial vibrations; (*c*) vibration-generating devices, adapted to produce the notes of a musical scale, and operating to produce electrical vibrations by induction in the line; (*d*) keys, whereby the vibration-generating devices are made to produce their respective notes electrically in the line, each as required; and (*e*) current-regulator expression mechanism, controlled by said keys, and serving to vary the loudness of the tones given off by the vibration-translating apparatus.

137. In an electrical music-generating system, and in combination, (*a*) suitable vibration-translating apparatus, operating to translate electrical vibrations into audible aerial vibrations; (*b*) electrical vibration-generating devices, adapted to produce the notes of a musical scale electrically; (*c*) note-controllers, whereby the different vibration-generating devices are made to sound their respective notes in the vibration-translating apparatus, as required; and (*d*) one or more inductional expression devices, interposed between the vibration-generating devices and the vibration-translating apparatus, and operating to govern the loudness of the sounds produced in the vibration-translating apparatus, by varying the inductive relation subsisting between vibration-emitting and vibration-receiving circuits, belonging to said expression device or devices.

138. An electrical music-distributing system, including a plurality of common-receiver vibration-translating devices, located in different places, in combination with a central electrical music vibration-generating apparatus, having (*a*) means for generating the notes of a musical scale through one or more octaves electrically; and (*b*) one or more expression devices, each including a vibration-emitting circuit, a vibration-receiving circuit, and means whereby the inductive relation subsisting between the vibration-emitting circuit and the vibration-receiving circuit is varied at will; so that the loudness of the notes produced by the vibration-translating devices, located as before mentioned, in different places, is governed at will from the central instrument.

139. An electrical music-distributing system, including a plurality of common-receiver vibration-translating devices, located in different places, in combination with a central electrical music vibration-generating apparatus, having (*a*) means for generating the notes of a musical scale through one or more octaves, electrically; and (*b*) one or more expression devices, each including a vibration-emitting circuit, and a vibration-receiving circuit, one of said circuits being mounted for movement with relation to the other, so that the loudness of the notes produced by the vibration-translating devices, located as before mentioned at different places, is varied at will from the central instrument, by varying the relative positions of the two circuits above mentioned.

140. In an electrical music-generating system, suitable vibration-translating apparatus, operating to translate electrical vibrations into audible aerial vibrations, in combination with an apparatus serving to produce the requisite electrical undulations, including (*a*) a vibration-emitting circuit; (*b*) means whereby the requisite electrical vibrations are produced in the vibration-emitting circuit; (*c*) a vibration-receiving circuit, in inductive relation to the vibration-emitting circuit; and a key, varying the inductive relation subsisting between the two circuits named, so that the loudness of sounds produced by the vibration-translating devices is governed at will by means of the key.

141. In an electrical music-distributing system, and in combination, a line; one or more vibration-translating devices, supplied with electrical vibrations by said line, and operating to translate such vibrations into audible aerial vibrations electrical vibration-generating devices, adapted to produce the notes of a musical scale electrically and operating to produce vibrations in the line aforesaid; note-controllers, whereby the different vibration-generating devices are made to throw their respective notes upon the line, as required; a current-regulator expression device; and a power device, controlling said current-regulator expression device.

142. In an electrical music-generating system, and in combination, suitable vibration-translating apparatus; vibration-generating devices, operating to produce musical electrical vibrations in said vibration-translating apparatus; a current-regulator expression device, serving to vary the loudness of sounds produced by the vibration-translating apparatus; a power device, controlling said current-regulator expression device; and a key, controlling the action of the power device upon the current-regulator expression device.

143. In an electrical music-generating system, and in combination, suitable vibration-translating apparatus; vibration-generating devices, operating to produce musical electrical vibrations in said vibration-translating apparatus; a current-regulator expression device, serving to vary the loudness of sounds produced by the vibration-translating apparatus; a power device, controlling said expression device, said power device consisting essentially of a friction-driver and a contact-piece moved thereby; and a key controlling the action of the friction-driver upon the contact-piece.

144. In an electrical music-generating system, and in combination, common-receiver vibration-translating devices, and an apparatus serving to produce electrical vibrations, including (*a*) a circuit; (*b*) one or more inductional vibration-generating devices, serving to produce the requisite electrical vibrations in the circuit; (*c*) a current-regulator expression device, serving to govern the amplitude of the electrical vibrations produced in the circuit before mentioned; and (*d*) a key, controlling both the vibration-generating device, and the expression device.

145. In an electrical music-generating system, and in combination, suitable vibration-translating apparatus; a vibration-emitting circuit; one or more vibration-generating devices, serving to produce the requisite electrical vibrations in the vibration-emitting circuit; a vibration-receiving circuit, to which electrical vibrations are propagated inductively from the vibration-emitting circuit; and a key, controlling the action of the vibration-generating devices upon the vibration-emitting circuit; said key controlling also the inductive relation subsisting between the vibration-emitting and vibration-receiving circuits before mentioned; so that the loudness of the sounds produced by the vibration-translating apparatus is governed at will by means of the key.

146. In an electrical music-generating system, and in combination, suitable vibration-translating apparatus; a vibration-emitting circuit; one or more vibration-generating devices, serving to produce the requisite electrical vibrations in the vibration-emitting circuit; a vibration-receiving circuit; to which electrical vibrations are propagated inductively from the vibration-emitting circuit; and a key, serving to close the vibration-receiving circuit before mentioned; said key serving also to control the inductive relation subsisting between the vibration-emitting and vibration-receiving circuits before mentioned; so that the loudness of sounds produced by the vibration-translating apparatus is governed at will by means of the key.

147. In an electrical music-generating system, and in combination, (*a*) suitable common-receiver vibration-translating devices; (*b*) suitable vibration-generating devices, adapted to produce the notes of a musical scale electrically; (*c*) keys, serving to bring the various vibration-generating devices into action, each as required, upon the vibration-translating devices; and (*d*) suitable current-regulator expression mechanism, also controlled by the keys before mentioned, and operating to govern the loudness of sounds given off by the vibration-translating devices.

148. In an electrical music-generating system, and in combination, a line; one or more vibration-translating devices, supplied with electrical vibrations by said line; a composite-tone-generating device, serving to produce electrical vibrations corresponding to different partials of the same composite tone in the line aforesaid, by induction simultaneously; a key, operating to bring such composite-tone-generating device into action upon the line; and current-regulator expression mechanism, operating to govern the loudness of the sounds given off by the vibration-translating apparatus.

149. In an electrical music-generating system, and in combination therein with a line and one or more common-receiver vibration-translating devices, a composite-tone-generating device, serving to produce electrical vibrations corresponding to different partials of the same composite tone in the line aforesaid; a note-controlling device, extra the line, operating to bring the composite-tone-generating device aforesaid into action upon the line; and current-regulator expression mechanism, operating to govern the loudness of the sounds produced.

150. In an electrical music-generating system, and in combination therein with a line and one or more common-receiver vibration-translating devices, a composite-tone-generating device, serving to produce electrical vibrations corresponding to different partials of the same composite tone in the line aforesaid; a note-controlling device, operating to bring the composite-tone-generating device aforesaid into action upon the line; and current-regulator expression mechanism, extra the line, operating to govern the loudness of sounds given off by the vibration-translating apparatus.

151. In an electrical music-generating system, and in combination therein with a line and one or more common-receiver vibration-translating devices, a composite-tone-generating device serving to produce electrical vibrations corresponding to different partials of the same composite tone in the line aforesaid; a note-controlling device, operating to bring the composite-tone-generating device aforesaid into action upon the line; and current-regulator expression mechanism, operating to govern the loudness of sounds produced by governing the voltage of the vibrations thrown upon the line.

152. In an electrical music-generating system, and in combination, one or more common-receiver vibration-translating devices; a composite-tone-generating device, serving to produce electrical vibrations having frequencies corresponding to different partials of the same composite tone; a key, operating to bring the composite-tone-generating device aforesaid into action upon the common-receiver vibration-translating devices; current-regulator expression mechanism, operating to govern the loudness of the sounds produced by the composite-tone-generating device aforesaid, in the common receivers; the key before mentioned serving to control said expression mechanism, and thereby to govern the loudness of the sounds produced.

153. In an electrical music-generating system, and in combination therein, with a line and one or more common-receiver vibration-translation devices, (*a*) vibration-generating devices, adapted to produce ground tones of notes in the line aforesaid, by induction; (*b*) other devices operating to produce one or more overtones to the ground tones aforesaid; (*c*) different note-controllers, whereby the various tones are thrown upon the line, as required; and (*d*) current-regulator expression mechanism governing the loudness of the sounds given off by the vibration-translating apparatus.

154. In an electrical music-generating system, and in combination therein with a line and one or more common-receiver vibration-translating devices, an electrical music-generating apparatus, including (*a*) means operating to produce ground tones or notes in the line aforesaid; (*b*) other devices operating to produce one or more overtones of the ground tones aforesaid; (*c*) note-controlling devices, extra the line, each operating to throw upon the line a ground tone and one or more overtones thereof; and (*d*) current-regulator expression mechanism, governing the loudness of sounds given off by the vibration-translating apparatus.

155. In an electrical music-generating system, and in combination therein with a line and one or more common-receiver vibration-translating devices, an electrical music-generating apparatus, including (*a*) means operating to produce ground tones of notes in the line aforesaid; (*b*) other devices operating to produce one or more overtones of the ground tones aforesaid; (*c*) suitable note-controlling devices; and (*d*) current-regulator expression mechanism, extra the line, operating to govern the loudness of sounds given off by the vibration-translating apparatus.

156. In an electrical music-generating system, and in combination therein with a line and one or more common-receiver vibration-translating devices, an electrical music-generating apparatus, including (*a*) means operating to produce ground tones of notes in the line aforesaid; (*b*) other devices operating to produce one or more overtones of the ground tones aforesaid; (*c*) suitable note-controlling devices; and (*d*) current-regulator expression mechanism, operating to govern the loudness of sounds produced by governing the voltage of the vibrations thrown upon the line.

157. In an electrical music generating or distributing system, the combination, with one or more common-receiver vibration-translating devices, of a multiplicity of composite-tone-generating devices, each including a plurality of vibration-generating devices, acting simultaneously to produce in a circuit electrical vibrations having frequencies corresponding to different partials of the same composite tone; keys, controlling the action of said composite-tone-generating devices upon the vibration-translating devices aforesaid; and suitable current-regulator expression mechanism, controlled by said keys, and operating to govern the loudness of the tones given off by the vibration-translating apparatus.

158. In an electrical music-generating system, and in combination, an organization of electrical-vibration generators, serving for the production of electrical vibrations, corresponding to the notes of a musical scale; one or more common-receiver vibration-translating devices, serving to translate electrical vibrations into audible aerial vibrations; separate tone-purifying devices for the separate notes; note-controllers, whereby the different vibration-generating devices are made to act upon the vibration-translating apparatus, for the sounding of their respective notes, as required in the production of a musical composition; and current-regulator expression mechanism, whereby the loudness of the sounds given off by the vibration-translating apparatus is governed at will.

159. In an electrical music-generating system, and in combination, an organization of electrical-vibration generators, serving for the production of electrical vibrations corresponding to the notes of a musical scale; one or more common-receiver vibration-translating devices, serving to translate electrical vibrations into audible aerial vibrations; a plurality of tone-purifying devices, interposed between the vibration-generating devices and the vibration-translating devices above mentioned, and operating to purify electrical vibrations by one or more inductive transfers; said tone-purifying devices serving, some for the purifying of low tones, some for the purifying of high tones, and some for the purifying of tones of medium pitch; note-controllers, whereby the different vibration-generating devices are made to act upon the vibration-translating apparatus for the sounding of their respective notes, as required in the production of a musical composition; and current-regulator expression mechanism, whereby the loudness of the sounds given off by the vibration-translating apparatus is governed at will.

160. In an electrical music-generating system, and in combination therein with one or more common-receiver vibration-translating devices; electrical vibration-generating devices, serving to produce ground tones of notes electrically; other vibration-generating devices, serving simultaneously to produce overtones for said ground tones; suitable tone-purifying devices; note-controllers, whereby the various vibration-generating devices aforesaid are made to act upon the vibration-translating apparatus, for the sounding of their respective notes, as required; and current-regulator expression mechanism, whereby the loudness of the sounds given off by the vibration-translating devices is governed.

161. In an electrical music-generating system, and in combination, (a) suitable vibration-translating apparatus; (b) vibration-generating devices, serving to produce ground tones of notes; (c) vibration-generating devices, serving simultaneously to produce overtones for the notes; (d) suitable tone-purifying devices; (e) keys, each, in general, serving to bring into action upon the vibration-translating apparatus a ground-tone vibration-generating device and one or more overtone-vibration-generating devices; and (f) suitable current-regulator expression mechanism, whereby the loudness of the sounds given off by the vibration-translating apparatus is governed.

162. In an electrical music-generating system, and in combination, (a) suitable vibration-translating apparatus; (b) vibration-generating devices, serving to produce ground tones of notes; (c) vibration-generating devices, serving to produce overtones for the notes; (d) suitable tone-purifying devices; (e) keys, controlling the action of the vibration-generating devices upon the vibration-translating apparatus; and (f) suitable current-regulator expression mechanism, controlled by the keys before mentioned, and serving to govern the loudness of the sounds given off by the vibration-translating apparatus.

163. An electrical music-generating system including, in combination, (a) a plurality of common-receiver vibration-translating devices; (b) a multiplicity of electrical-vibration circuits; (c) a multiplicity of rotatory rate-governors; serving by their rotations to cause electrical vibrations to be produced in the electrical-vibration circuits before mentioned; (d) driving mechanism for said rate-governors, whereby different rate-governors are given different angular velocities; (e) keys controlling the action of the vibration-generating devices upon the vibration-translating devices; and (f) suitable current-regulator expression mechanism, whereby the loudness of the sounds given off by the vibration-translating devices is governed at will.

164. In an electrical music-generating system, and in combination, (a) a line; (b) one or more common-receiver vibration-translating devices; (c) rotatory rate-governors, corresponding to the notes of a musical scale through one or more octaves, operating to produce electrical vibrations in the line, by induction; (d) note-controllers, whereby the different rotatory rate-governors are made to throw their respective notes upon the line, as required; and (e) suitable current-regulator expression mechanism, whereby the loudness of the sounds given off by the vibration-translating apparatus is governed.

165. In an electrical music-generating system, and in combination, (a) a line; (b) one or more common-receiver vibration-translating devices; (c) an organization of rotatory rate-governors, adapted to produce the notes of a musical scale through one or more octaves, operating to produce electrical vibrations in the line; (d) note-controllers, whereby the different notes are thrown upon the line, each as required; and (e) current-regulator expression mechanism, extra the line, operating to govern the loudness of the sounds produced.

166. In an electrical music-generating system, and in combination, (a) a line; (b) one or more common-receiver vibration-translating devices; (c) an organization of rotatory rate-governors, adapted to produce the notes of a musical scale through one or more octaves, operating to produce electrical vibrations in the line; (d) note-controllers, whereby the different notes are thrown upon a line, each as required; and (e) current-regulator expression mechanism, interposed between the rotatory rate-governors aforesaid and the line, operating to govern the loudness of the sounds given off by the vibration-translating apparatus.

167. In an electrical music-generating system, and in combination, (a) a line; (b) one or more common-receiver vibration-translating devices; (c) an organization of rotatory rate-governors, adapted to produce the notes of a musical scale through one or more octaves, operating to produce electrical vibrations in the line; (d) note-controllers, whereby the different notes are thrown upon the line, each as required; and (e) current-regulator expression mechanism, operating inductively to govern the loudness of the sounds produced by the vibration-translating apparatus.

168. In an electrical music-generating system, and in combination, (a) a line; (b) one or more common-receiver vibration-translating devices; (c) an organization of rotatory rate-governors, adapted to produce the notes of a musical scale through one or more octaves, operating to produce electrical vibrations in the line; (d) note-controllers, whereby the different notes are thrown upon the line, each as required; and (e) current-regulator expression mechanism, operating to govern the loudness of the sounds produced by governing the voltage of the vibrations thrown upon the line.

169. In an electrical music-generating system, and in combination, (a) means for generating electrical vibrations corresponding to the notes of a tune, including a multiplicity of rotatory rate-governors, and driving mechanism, whereby different rate-governors are given different angular velocities; (b) one or more common-receiver vibration-translating devices; (c) note-controllers, whereby the different rate-governors are made to sound their respective notes, as required, in the vibration-translating apparatus; and (d) current-regulator expression mechanism, whereby the loudness of the sounds given off by the vibration-translating apparatus is governed.

170. In an electrical music-generating system, and in combination, (a) a line; (b) one or more vibration-translating devices, supplied with electrical vibrations by said line, and operating to translate such vibrations into audible vibrations; (c) means for generating in the line electrical vibrations corresponding to notes of a tune, including a plurality of rotatory rate-governors, and driving mechanism, whereby different rate-governors are given different angular velocities; (d) note-controllers, whereby the different rate-governors aforesaid are made to sound their notes, as required, in the vibration-translating apparatus; and (e) current-regulator expression mechanism, whereby the loudness of the sounds given off by the vibration-translating apparatus is governed.

171. In an electrical music-generating system, and in combination, (a) one or more common-receiver vibration-translating devices; (b) inductional undulation-generating devices, corresponding to the notes of a musical scale through one or more octaves; (c) note-controllers, whereby the different inductional undulation-generating devices are made to sound their respective notes, as required, in the vibration-translating apparatus; and (d) suitable current-regulator expression mechanism, whereby the loudness of the sound given off by the vibration-translating apparatus is governed.

172. In an electrical music-generating system and in combination, (a) a line; (b) one or more common-receiver vibration-translating devices, supplied with electrical vibrations by the line, and serving to translate said vibrations into audible vibrations; (c) inductional undulation-generating devices, corresponding to the notes of a musical scale through one or more octaves; (d) note-controllers, whereby the different inductional undulation-generating devices aforesaid are made to throw their respective notes upon the line, as required; and (e) suitable current-regulator expression mechanism, whereby the loudness of the sounds given off by the vibration-translating apparatus is governed.

173. In an electrical music-generating system, and in combination, (a) electrical vibration-generating devices, corresponding to the notes of a musical scale through one or more octaves; (b) one or more common-receiver vibration-translating devices; (c) note-controllers, whereby the different vibration-generating devices are made to produce their respective notes, each as required, in the vibration-translating apparatus; and (d) a plurality of independently-acting current-regulator expression devices, whereby different notes are made to sound with different degrees of loudness.

174. In an electrical music-generating system, and in combination, (a) a line; (b) one or more vibration-translating devices, supplied with electrical vibrations by said line, and operating to translate such vibrations into audible vibrations; (c) electrical vibration-generating devices, corresponding to the notes of a musical scale through one or more octaves; (d) note-controllers, whereby the different vibration-generating devices aforesaid are made to throw their respective notes upon the line, as required; and (e) a plurality of independently-acting current-regulator expression devices, whereby different notes are made to sound with different degrees of loudness.

175. In an electrical music-generating system, and in combination, (a) means for generating electrical vibrations corresponding to the notes of a tune, including rotatory rate-governors, and driving mechanism whereby different rate-governors are given different angular velocities; (b) one or more common-receiver vibration-translating devices; (c) note-controllers, whereby the different rate-governors are made to sound their respective notes, as required, in the vibration-translating apparatus; and (d) a plurality of independently-acting current-regulator expression devices, whereby different notes are made to sound with different degrees of loudness.

Signed at Washington this 4th day of February, 1896.

THADDEUS CAHILL.

Attest:
  M. H. CAHILL,
  ARTHUR T. CAHILL.